(12) United States Patent
Okamoto et al.

(10) Patent No.: US 7,161,616 B1
(45) Date of Patent: Jan. 9, 2007

(54) IMAGE PROCESSING DEVICE AND MONITORING SYSTEM

(75) Inventors: Shusaku Okamoto, Osaka (JP); Masamichi Nakagawa, Osaka (JP); Kunio Nobori, Osaka (JP); Atsushi Morimura, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/807,654

(22) PCT Filed: Apr. 17, 2000

(86) PCT No.: PCT/JP00/02474

§ 371 (c)(1),
(2), (4) Date: Apr. 13, 2001

(87) PCT Pub. No.: WO00/64175

PCT Pub. Date: Oct. 26, 2000

(30) Foreign Application Priority Data

Apr. 16, 1999 (JP) .................................. 11-109946

(51) Int. Cl.
*A47G 23/02* (2006.01)

(52) U.S. Cl. ..................................................... 348/148

(58) Field of Classification Search ........ 348/143–170, 348/47, 48, 19, 37, 38, 39; 342/30; 345/418, 345/629; H04N 7/18; A47G 23/02
See application file for complete search history.

(56) References Cited

U.S. PATENT DOCUMENTS

| | | | | |
|---|---|---|---|---|
| 3,750,166 | A * | 7/1973 | Dearth | 342/30 |
| 5,525,882 | A * | 6/1996 | Asaka et al. | 318/568.16 |
| 5,796,991 | A * | 8/1998 | Shimizu | 703/1 |
| 5,973,726 | A * | 10/1999 | Iijima et al. | 348/38 |
| 6,271,847 | B1 * | 8/2001 | Shum et al. | 345/418 |
| 6,317,127 | B1 * | 11/2001 | Daily et al. | 345/629 |
| 6,326,994 | B1 * | 12/2001 | Yoshimatsu | 348/46 |
| 6,335,754 | B1 * | 1/2002 | Endo et al. | 348/37 |
| 6,396,535 | B1 * | 5/2002 | Waters | 348/159 |
| 6,424,273 | B1 * | 7/2002 | Gutta et al. | 340/937 |
| 6,490,364 | B1 * | 12/2002 | Hanna et al. | 382/107 |
| 6,498,620 | B1 * | 12/2002 | Schofield et al. | 348/148 |
| 6,522,787 | B1 * | 2/2003 | Kumar et al. | 382/268 |
| 6,573,912 | B1 * | 6/2003 | Suzuki et al. | 345/757 |
| 6,665,003 | B1 * | 12/2003 | Peleg et al. | 348/36 |
| 6,785,404 | B1 * | 8/2004 | Shimazaki et al. | 382/104 |

FOREIGN PATENT DOCUMENTS

JP         58-110334 A       6/1983

(Continued)

OTHER PUBLICATIONS

International Search Report for Application No. PCT/JP00/02474; Japanese Patent Office; mailed Jul. 25, 2000.

*Primary Examiner*—Tung Vo
(74) *Attorney, Agent, or Firm*—Harness, Dickey & Pierce, P.L.C.

(57) ABSTRACT

A synthetic image viewed from a virtual point of view above a vehicle is generated, using images captured by a plurality of cameras shooting surroundings of the vehicle. In the synthetic image, an illustration image or an actual image of the vehicle is displayed in a vehicle region in which the vehicle is present. The area around the vehicle that is not shot by any of the cameras is displayed as a blind spot region.

33 Claims, 47 Drawing Sheets

FOREIGN PATENT DOCUMENTS

| | | |
|---|---|---|
| JP | 01-123587 | 5/1989 |
| JP | 1-123587 A | 5/1989 |
| JP | 5-238311 A | 9/1993 |
| JP | 08048198 A | 2/1996 |
| JP | 9-114979 A | 5/1997 |
| JP | 9-180088 A | 7/1997 |
| JP | 9-305796 A | 11/1997 |
| JP | 10-257482 * | 9/1998 |
| JP | 11-078692 | 3/1999 |
| JP | 11151975 A | 6/1999 |

* cited by examiner

FIG. 3
Camera 1
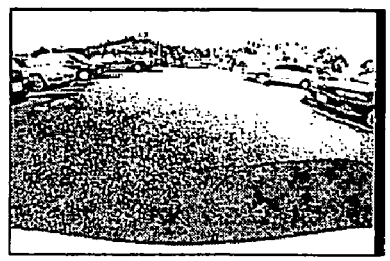
Camera 3
Camera 2
Camera 5
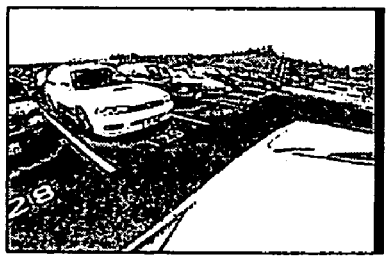
Camera 4
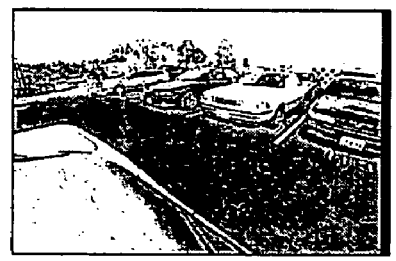

| Camera number | X coordinate | | Y coordinate | Rate of necessity |
|---|---|---|---|---|
| | R | G | B | |
| 2 | 10 | | 350 | 0. 2 |
| 99 | 0 | 0 | 255 | 0. 8 |

Virtual point of view height : 2.75m

Virtual point of view height : 3m

Virtual point of view height : 3.25m

Virtual point of view height : 3.5m

Virtual point of view height : 3.75m

Virtual point of view height : 4m

Zoom-down ⇐⇒ Zoom-up

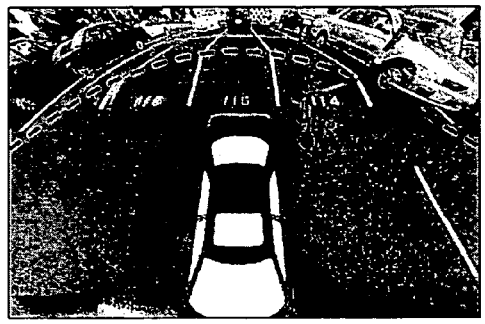
FIG. 20A
Orientation: 22° backward
(Model: Road surface plane +
quasi-cylindrical surface)
FIG. 20B
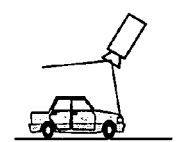
Orientation: 17° backward
(Model: Road surface plane +
quasi-cylindrical surface)
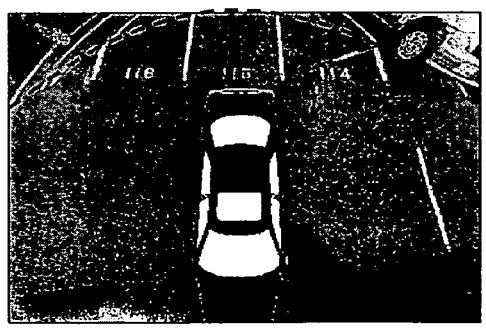
FIG. 20C
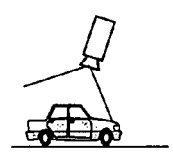
Orientation: 11° backward
(Model: Road surface plane +
quasi-cylindrical surface)
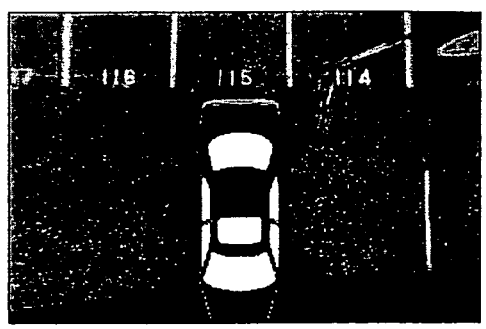
FIG. 20D
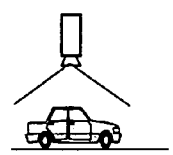
Orientation:
straight downward
(Model : road surface plane)

Region occupied by an automobile when the automobile is moved.

Virtual point of view

Region occupied by an automobile when the automobile is moved.

Object detecting sensor

Region where an obstacle is present

FIG. 26A
FIG. 26B
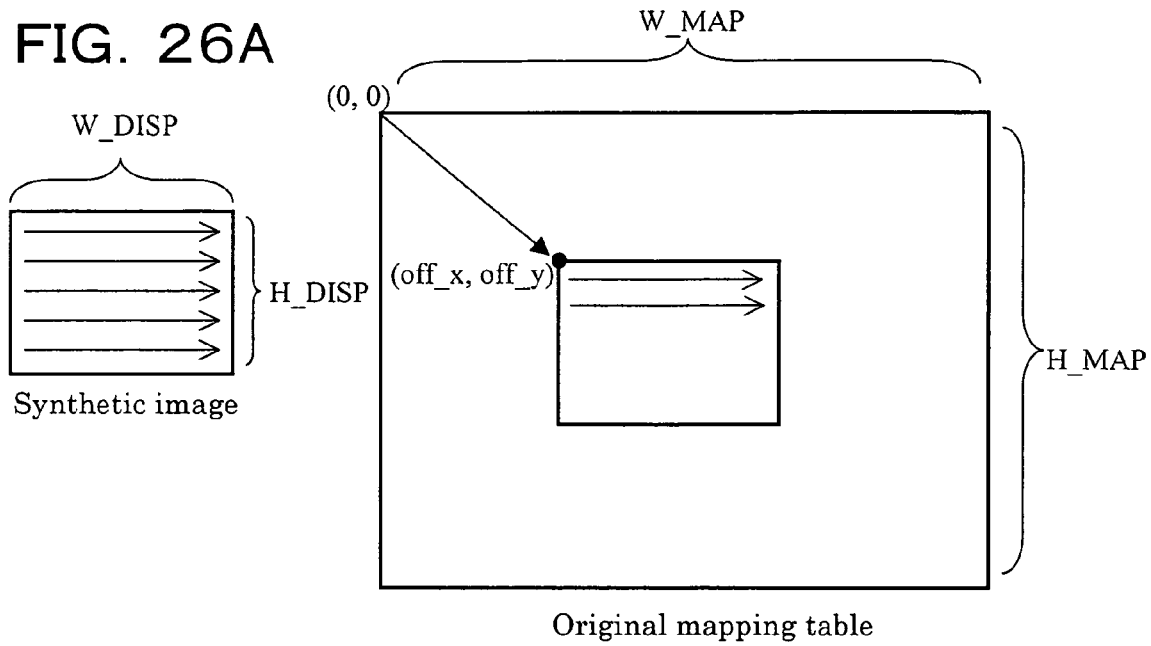
Synthetic image
Original mapping table
FIG. 26C
FIG. 26D
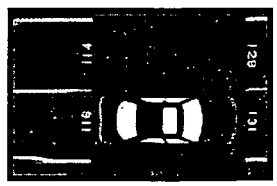
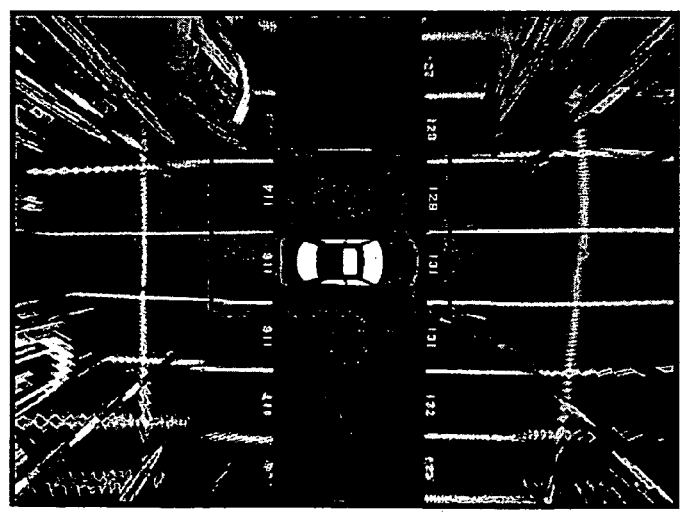

FIG. 27A
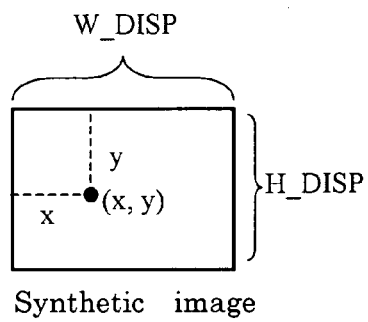
Synthetic image
FIG. 27B
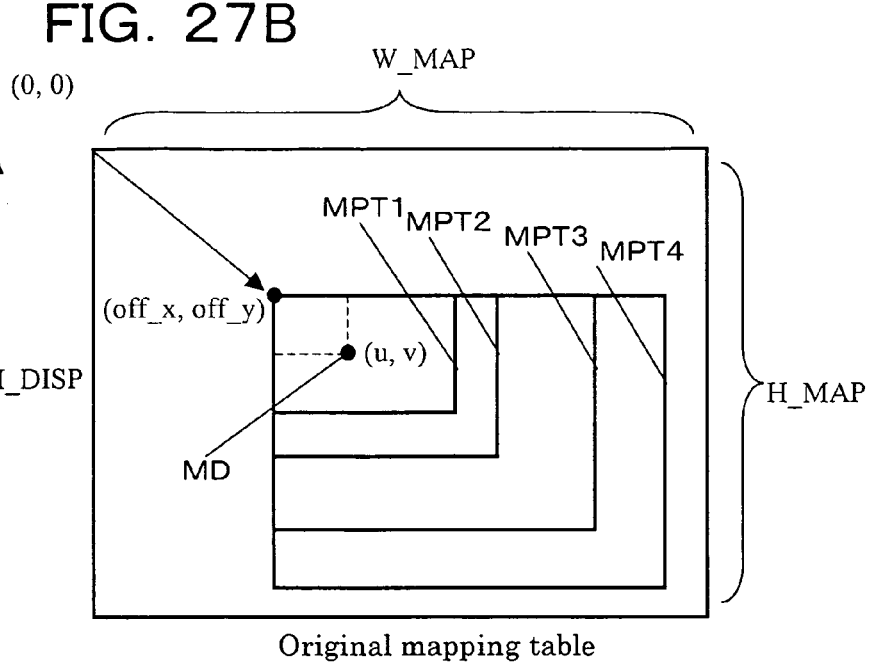
Original mapping table
FIG. 27C
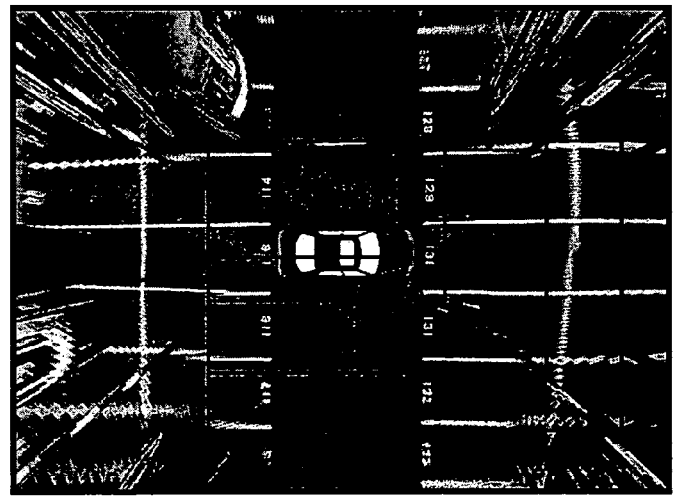
FIG. 27D  FIG. 27E  FIG. 27F  FIG. 27G
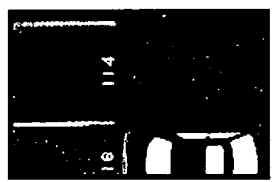 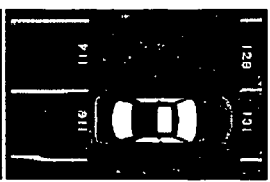 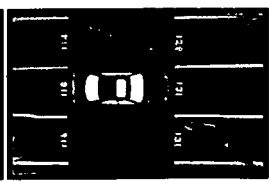 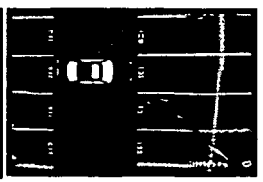

FIG. 28
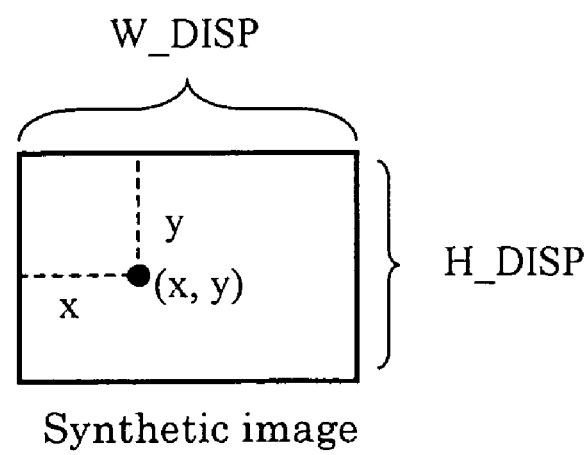
Synthetic image
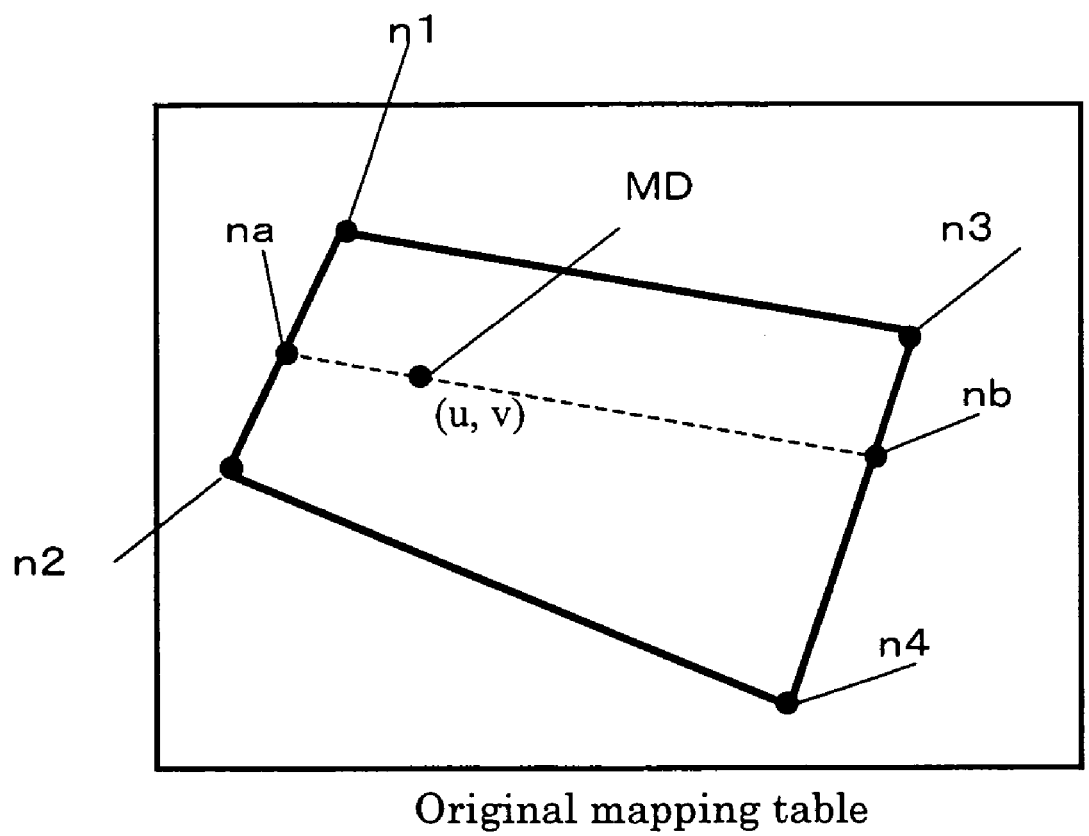
Original mapping table

Downward view image in a narrow range

Downward view image in a wide range

FIG. 34
Panorama image on the left
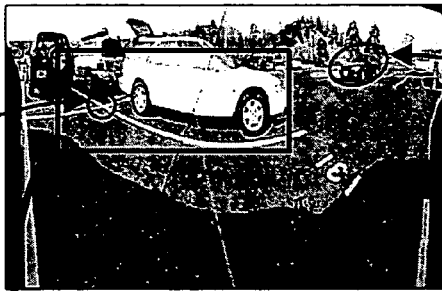
Panorama image behind the automobile
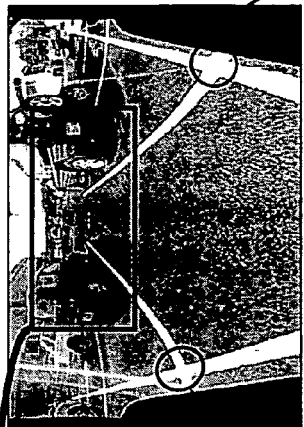
Panorama in front of the automobile
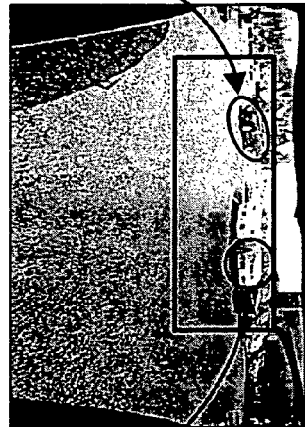
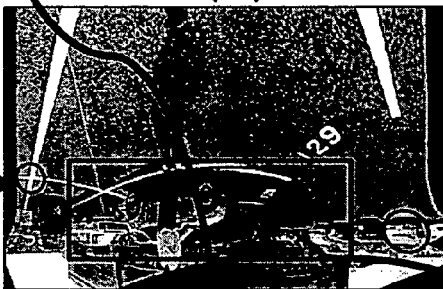
Panorama image on the right
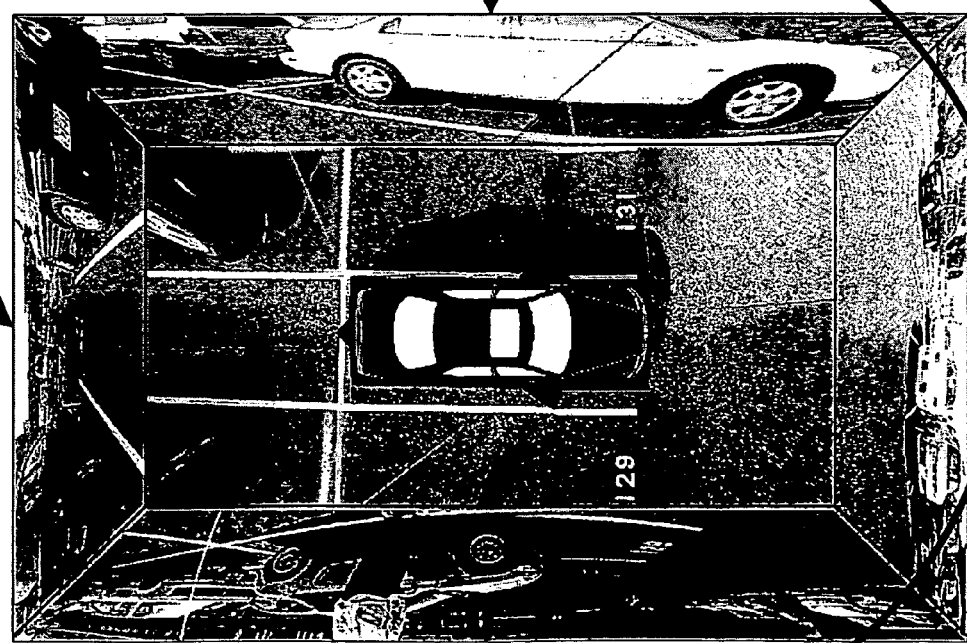

Left door mirror camera

Downward view vertically from 5m above (expressed in a bird's eye view)

Right door mirror camera

Projection of the automobile of a user

Black the projection of the automobile

Superimpose an image of the automobile

Correspond to PT4 (660, 290)

Mask data of Camera 2

Correspond to PT2 (150, 280)

Mask data of Camera 4

Correspond to PT2 (480, 280)

Mask data of Camera 5

Correspond to PT1 (450, 200)
Correspond to PT3 (110, 250)

Mask data of Camera 6

IMAGE PROCESSING DEVICE AND MONITORING SYSTEM

TECHNICAL FIELD

The present invention relates to an image processing technique for generating synthetic images with images captured by a plurality of cameras. In particular, the present invention relates to an effective technique for a monitoring system that can be utilized as an aid to confirm safety when driving a vehicle.

BACKGROUND ART

In conventional monitoring systems in general, one or a plurality of monitoring cameras capture an image of an object to be monitored, and the image is displayed on a monitor. In this case, generally, monitors are prepared in the number corresponding to the number of the cameras installed for monitoring.

For example, a conventional safety monitoring system for vehicles is as follows. A camera for capturing images is installed around the vehicle, and the images captured by the camera are displayed on a monitor installed near the driving seat. This system allows the driver to confirm safety of places of which safety confirmation is difficult with eyes or a mirror, such as an area behind the vehicle, through the monitor.

Japanese Patent Publication No. 2696516 discloses a structure that displays images on a divided monitoring screen, depending on the gear or the car speed. More specifically, when it is determined that the vehicle is in the halt state or in the low speed state, the monitoring screen is divided into three sections, and images captured by three cameras installed on the right side, the left side and in a lower portion of the vehicle are synthesized and reproduced. When it is determined that the vehicle is in the forward running state, the monitoring screen is divided into two sections, and images captured by two cameras installed on the right side and the left side of the vehicle are synthesized and reproduced.

Japanese Laid-Open Patent Publication No. 11-78692 discloses a video presenting apparatus for vehicles having a structure in which precise videos for each encountered scene are synthesized and displayed. More specifically, camera images are transformed and synthesized depending on the driving state of the vehicle such as backward parking, forward parking, parallel parking or a state where the vehicle goes into an intersection with an obstructed view.

However, such conventional structures are not necessarily convenient systems for users such as drivers of vehicles.

DISCLOSURE OF INVENTION

It is an object of the present invention to provide an improved image processing apparatus or an improved monitoring system in the convenience of users such as drivers of vehicles.

More specifically, an image processing apparatus of the present invention includes an image processing part for receiving images captured by a plurality of cameras shooting surroundings of a vehicle to generate a synthetic image viewed from a virtual point of view from these camera images, wherein the image processing part changes at least one selected from the position, the direction of the line of sight, and the focal length of the virtual point of view in accordance with a running state of the vehicle.

It is preferable that the image processing part changes at least one selected from the position of the virtual point of view, the direction of the line of sight, and the focal length in accordance with a running speed of the vehicle.

It is preferable that the image processing part changes at least one selected from the position, the direction of the line of sight, and the focal length of the virtual point of view, and controls capturing of an image outside a view range of the changed virtual point of view.

It is preferable that the image processing part controls the capturing of an image outside a view range of the changed virtual point of view by changing a model for image synthesis.

It is preferable that the image processing part changes at least one selected from the position, the direction of the line of sight, and the focal length of the virtual point of view in accordance with a steering angle of the vehicle.

It is preferable that the image processing part changes at least one selected from the position, the direction of the line of sight, and the focal length of the virtual point of view in accordance with results of detection by an object detecting sensor that is provided in the vehicle.

It is preferable that the image processing part includes an original mapping table and generates a synthetic image using a mapping table that is cut out from the original mapping table, and the image processing part changes at least one selected from the position, the direction of the line of sight, and the focal length of the virtual point of view by changing the mapping table to be cut out from the original mapping table.

According to another aspect of the present invention, an image processing apparatus includes an image processing part for receiving images captured by a plurality of cameras shooting surroundings of a vehicle to generate a synthetic image viewed from a virtual point of view from these camera images, wherein the image processing part controls capturing of an image outside a view range of the virtual point of view in accordance with a running state of the vehicle.

According to another aspect of the present invention, a monitoring system includes a plurality of cameras shooting surroundings of a vehicle; an image processing part for receiving images captured by the plurality of cameras to generate a synthetic image viewed from a virtual point of view from these camera images; and a display part for displaying the synthetic image, wherein the image processing part changes at least one selected from the position, the direction of the line of sight, and the focal length of the virtual point of view in accordance with a running state of the vehicle.

More specifically, an image processing apparatus of the present invention includes an image processing part for receiving images captured by a plurality of cameras shooting surroundings of a vehicle to generate a synthetic image from these camera images, wherein the image processing part generates an image including a first image and a second image as the synthetic image, the first image being viewed from a virtual point of view, the second image being viewed from a viewpoint that is different from the virtual point of view of the first image in at least one selected from the position, the direction of the line of sight and the focal length, or the second image being different from the first image in the model.

It is preferable that the second image is at least one of the camera images.

It is preferable that the first image is a close view image showing the vehicle and surroundings thereof, and the second image is a distant view image showing an area distant from the surrounding area of the vehicle that is shown by the close view image. It is preferable that the image processing part arranges the distant view image around the close view image in the synthetic image. It is preferable that the distant view image is an image having continuity with the close view image.

It is preferable that the first image shows at least a part of the vehicle and at least a part of the surroundings of the vehicle, and the second image is obtained by enlarging at least a part of the area shown by the first image.

According to another aspect of the present invention, a monitoring system includes a plurality of cameras shooting surroundings of a vehicle; an image processing part for receiving images captured by the plurality of cameras to generate a synthetic image from these camera images; and a display part for displaying the synthetic image, wherein the image processing part generates an image including a first image and a second image as the synthetic image, the first image being viewed from a virtual point of view, the second image being viewed from a viewpoint that is different from the virtual point of view of the first image in at least one selected from the position, the direction of the line of sight and the focal length, or the second image being different from the first image in the model.

More specifically, an image processing apparatus of the present invention includes an image processing part for receiving images captured by a plurality of cameras shooting surroundings of a vehicle to generate a synthetic image from these camera images, wherein in the synthetic image, the image processing part displays at least a part of a vehicle region where the vehicle is present, and an attention drawing region for drawing attention in which at least a part of the surroundings of the vehicle is shown.

It is preferable that the synthetic image is an image viewed from a virtual point of view that is set above the vehicle.

It is preferable that the image processing part displays an illustration image or an actual image of the vehicle on the vehicle region.

It is preferable that the attention drawing region includes at least a part of a blind spot region around the vehicle that is not shot by any of the cameras. Alternatively, it is preferable that the attention drawing region corresponds to the blind spot region around the vehicle that is not shot by any of the cameras. It is preferable that the image processing part determines a range of a region obtained by combining the blind spot region and the vehicle region, using region data showing a projection region of the vehicle in each camera image.

According to another aspect of the present invention, a monitoring system includes a plurality of cameras shooting surroundings of a vehicle; an image processing part for receiving images captured by the plurality of cameras to generate a synthetic image from these camera images; and a display part for displaying the synthetic image, wherein in the synthetic image, the image processing part displays at least a part of a vehicle region where the vehicle is present, and an attention drawing region for drawing attention in which at least a part of the surroundings of the vehicle is shown.

More specifically, an image processing apparatus of the present invention includes an image processing part for receiving images captured by a plurality of cameras shooting surroundings of a vehicle to generate a synthetic image from these camera images, wherein the image processing part generates the synthetic image, using a mapping table including first mapping data describing a correspondence relationship between pixels of the synthetic image and pixels of the camera images, and second mapping data describing an identifier showing that a pixel of the synthetic image corresponds to pixel data other than the camera images.

It is preferable that the pixel data other than the camera images shows the vehicle or a blind spot region that is present in at least a part of the surroundings of the vehicle.

It is preferable that the image processing part stores a predetermined image other than the camera images, and with respect to the pixel of the synthetic image, the second mapping data describes coordinate values in the stored predetermined image corresponding to the pixel.

It is preferable that the second mapping data describes pixel data corresponding to the pixel of the synthetic image.

According to another aspect of the present invention, an image processing apparatus includes an image processing part for receiving images captured by a plurality of cameras shooting surroundings of a vehicle to generate a synthetic image from these camera images, wherein the image processing part uses mapping data describing a correspondence relationship between pixels of the synthetic image and a plurality of pixel data including one or both of pixel data of the camera images and pixel data other than the camera images, and describing the rate of necessity with respect to each of the pixel data, and weights each pixel data in accordance with the rate of necessity, thereby generating the pixel data of the pixels of the synthetic image.

According to another aspect of the present invention, an image processing apparatus includes an image processing part for receiving images captured by a plurality of cameras shooting surroundings of a vehicle to generate a synthetic image from these camera images, wherein the image processing part includes an original mapping table, cuts out a mapping table describing a correspondence relationship between pixels of the synthetic image and pixels of the camera images, and generates the synthetic image, using the cut-out mapping table.

BRIEF DESCRIPTION OF DRAWINGS

FIG. 3 is an example of images captured by the cameras of FIGS. 2(a) and 2(b).

FIG. 11 is an example of mapping data that describe pixel data other than the camera images.

FIGS. 20(a) to 20(d) show an example of synthetic images when the direction of the line of sight of the virtual point of view is changed in accordance with the running state of the vehicle.

FIGS. 26(a) to 26(d) are views showing cutting-out of a mapping table for parallel displacement of an image.

FIGS. 27(a) to 27(g) are views showing cutting-out of a mapping table for enlargement or contraction of an image.

FIG. 28 is a view showing cutting-out of a mapping table in the shape of a quadrangle other than a square.

FIG. 34 is an example where panorama images are attached around the downward view image.

BEST MODE FOR CARRYING OUT THE INVENTION

Figure 1:
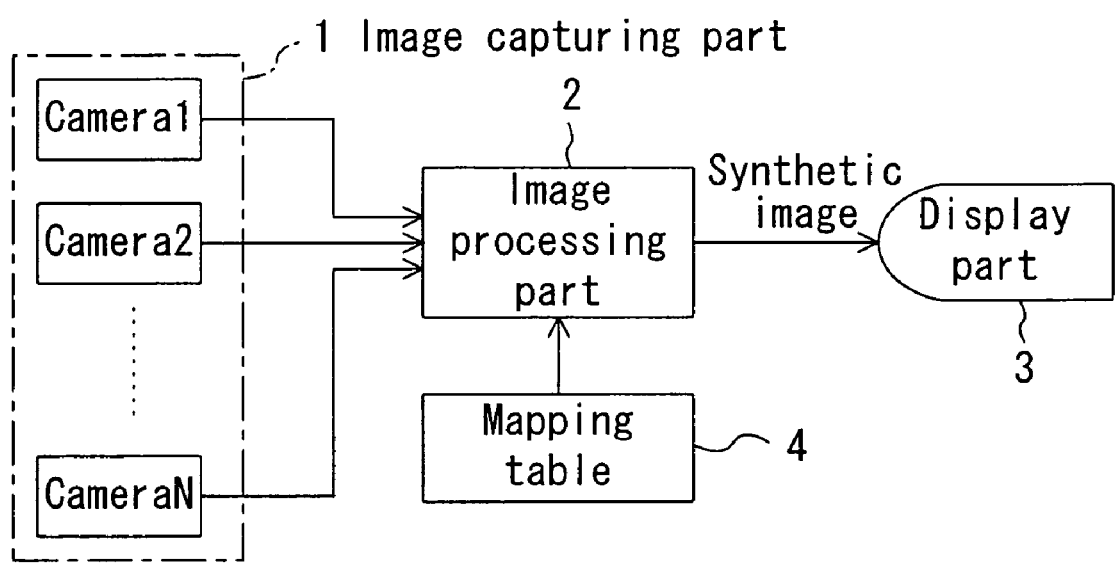
FIG. 1 is a conceptual diagram of a monitoring system of the present invention.

FIG. 1 is a conceptual diagram of a monitoring system of the present invention. In the monitoring system of FIG. 1, an image processing part 2 receives a plurality of camera images output from an image capturing part 1, and synthesizes the images to generate a synthesis image viewed from a virtual point of view. This synthetic image is displayed by a displaying part 3 such as a liquid crystal display. The image processing part 2 constitutes an image processing apparatus of the present invention.

In the description herein, a monitoring system of the present invention is mounted on a vehicle to assist parking or the like.

Figure 2A:
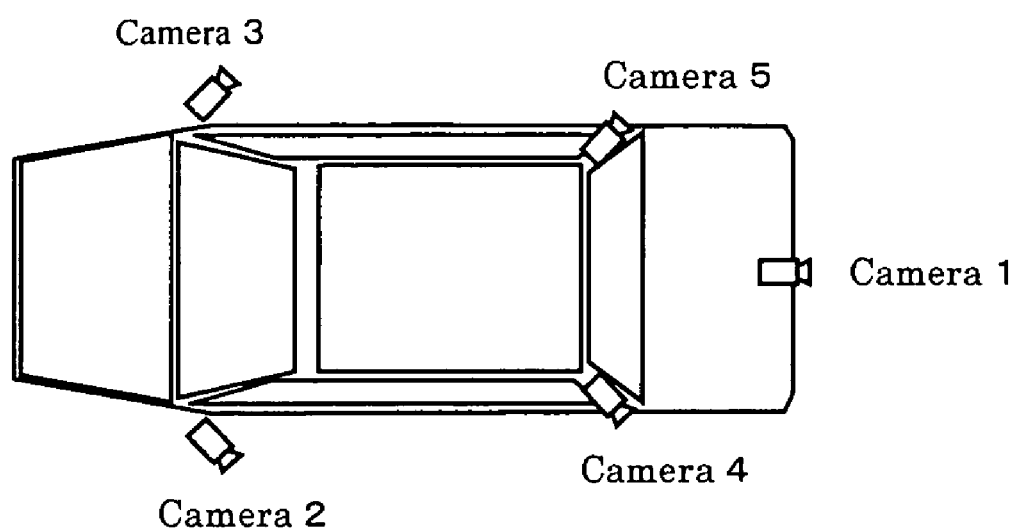
FIGS. 2(a) and 2(b) are views showing an example of camera arrangement.
Figure 2B:
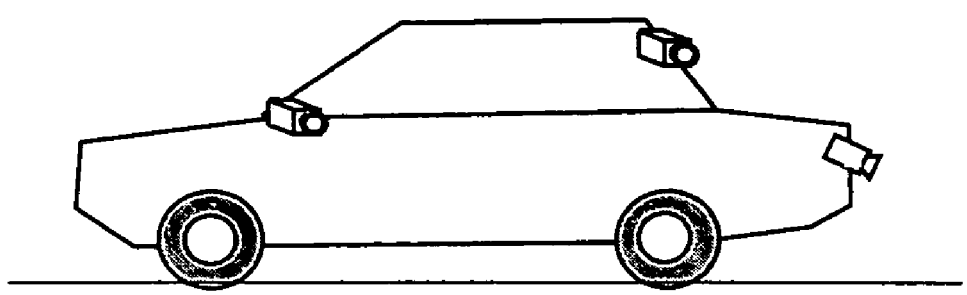

FIGS. 2(a) and 2(b) show an example of camera arrangement. FIG. 3 is an example of images captured by the cameras arranged in FIGS. 2(a) and 2(b). As shown in FIGS. 2(a) to 2(b), five cameras are provided in the vicinity of the door mirror, in the vicinity of the rear pillar and on the rear trunk. The image processing part 2 generates a synthetic image from five camera images when viewed from a virtual point of view.

The virtual point of view can be set to be oriented to an arbitrary direction in an arbitrary position in a three-dimensional space as in the case of a camera arrangement in video generation of computer graphics. The parameters that determine the virtual point of view are coordinates (X-axis, Y-axis, Z-axis) representing the position of the virtual point of view in a three-dimensional space, three angles representing the direction, namely, an azimuth (horizontal rotation), an elevation angle (gradient) and a twist (rotation about the optical axis), and a focal length defining the view range. The focal length is a distance between the virtual point of view and a projection plane on which a synthetic image is generated. When the focal length is small, an image with a wide angle is generated. When the focal length is large, a telescopic image is generated. In actual cameras, the focal length is often represented by a distance (mm) with respect to the size (35 mm) of a film that is the projection plane. In this specification, since the size of a synthetic image is represented by pixels, the focal length is also represented by pixels.

An appropriate synthetic image can be generated by selecting the position, the direction and the focal length of the virtual point of view depending on the situation.

Figure 4:
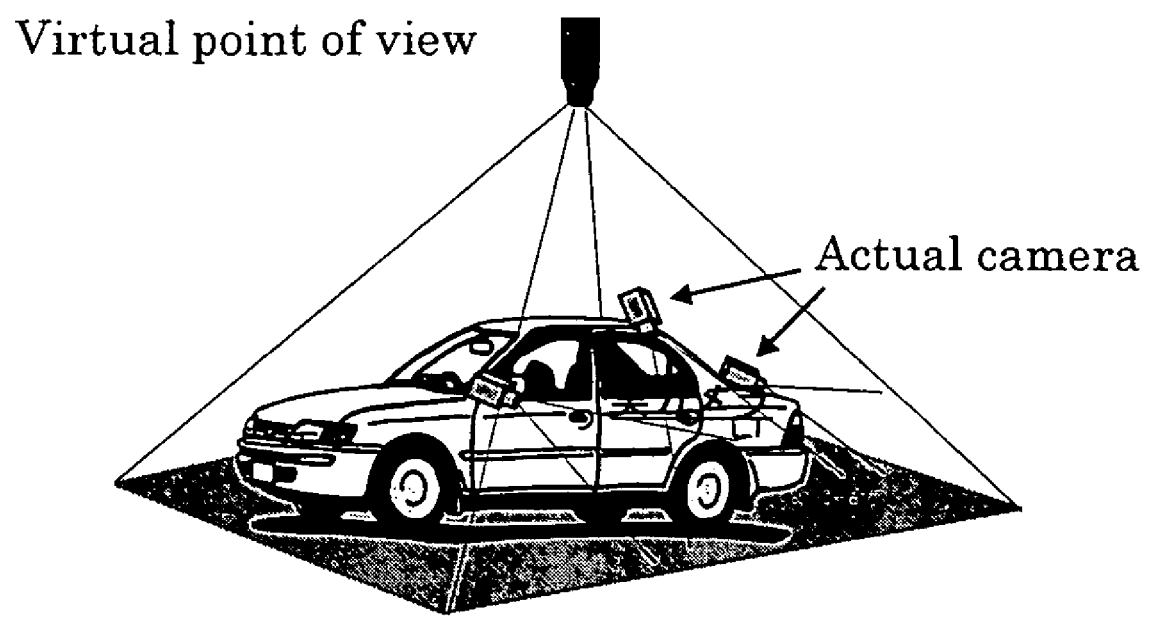
FIG. 4 is a view conceptually showing the relationship between a virtual point of view and actual cameras.
Figure 5:
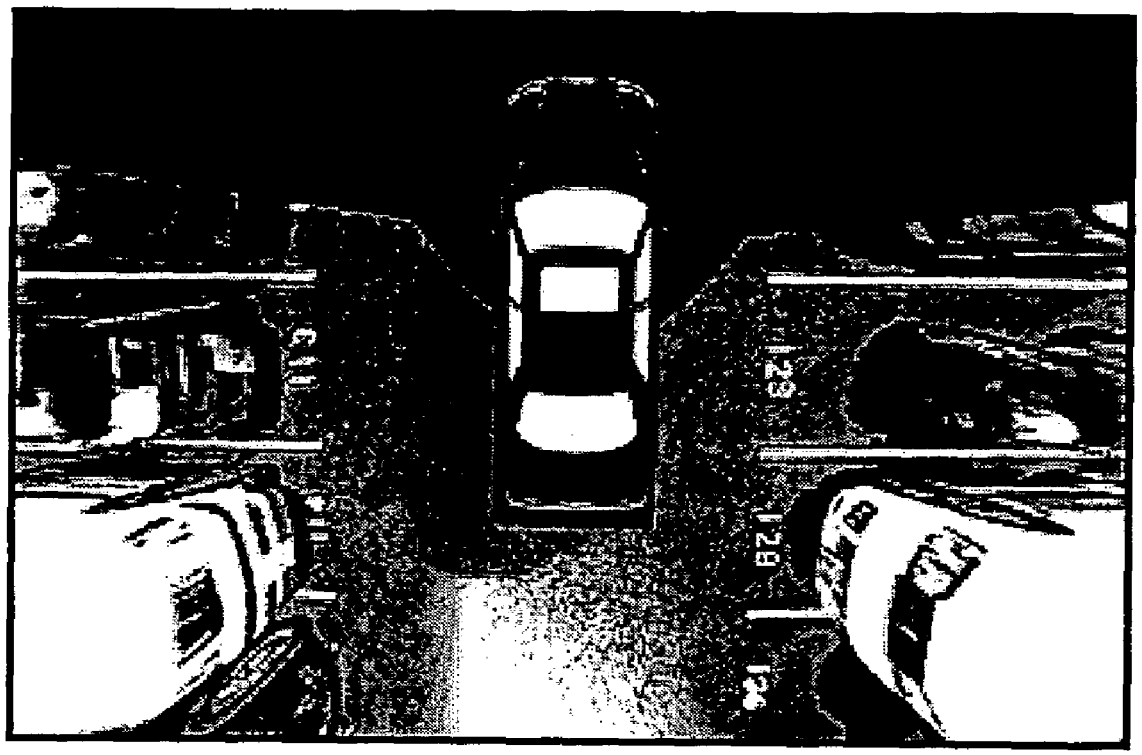
FIG. 5 is an example of a generated synthetic image.

FIG. 4 is a view conceptually showing the relationship between a virtual point of view and actual cameras. In FIG. 4, the virtual point of view is set above the vehicle. FIG. 5 is an example of a generated synthetic image, which is an image showing the vehicle and the scene around the vehicle viewed from the virtual point of view shown in FIG. 4.

In this embodiment, the image processing part 2 uses a mapping table 4 to generate a synthetic image from a plurality of camera images. Herein, a "mapping table" refers to a table that describes the correspondence relationship between pixels for a synthetic image and pixel data of each camera image. As described later, in the mapping table, a correspondence relationship between pixels for a synthetic image and pixel data other than the camera images can be described.

Principle of the Mapping Table

Hereinafter, an operation for generating a synthetic image from a plurality of camera images using the mapping table will be described.

Figure 6:
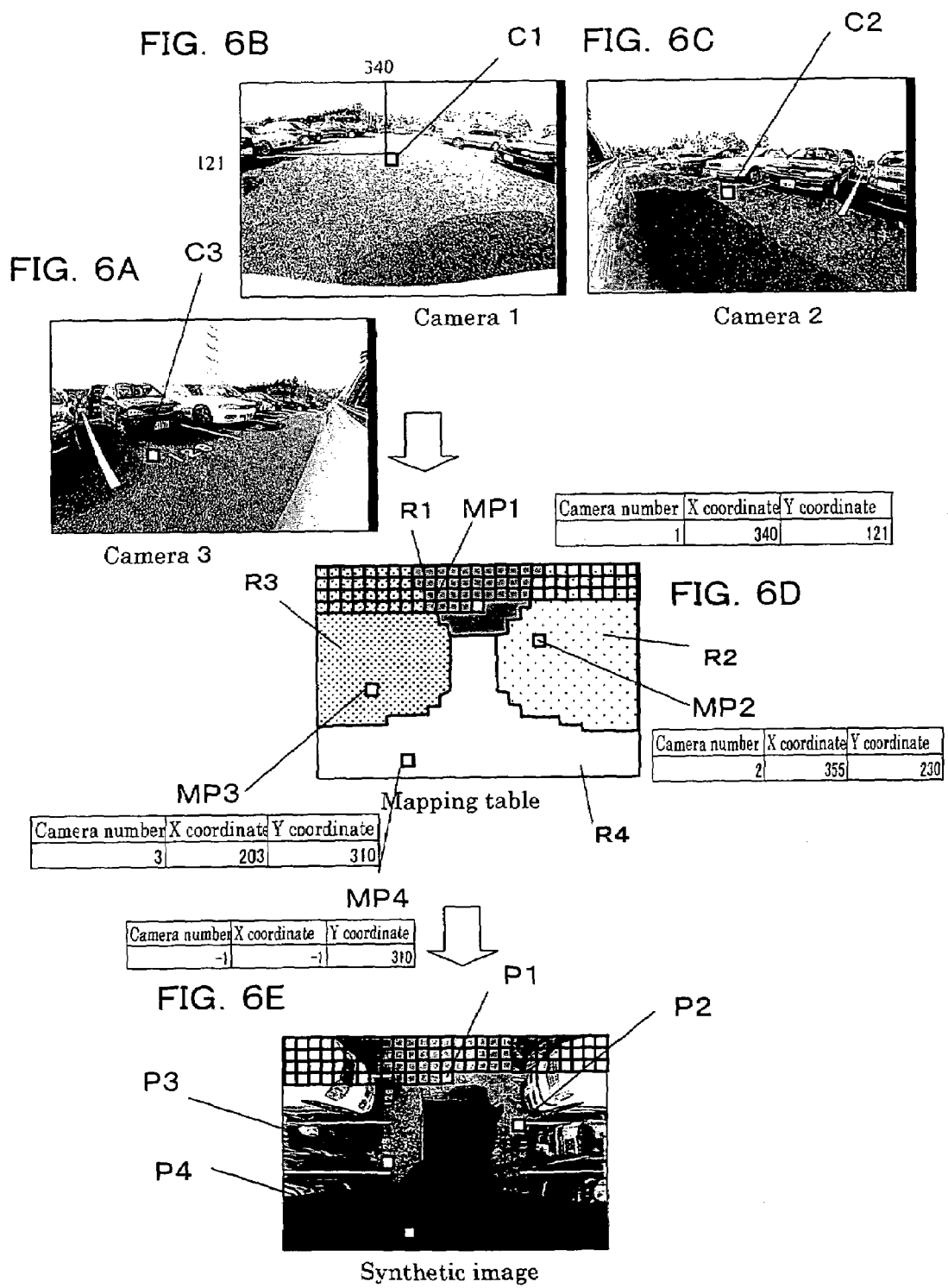
FIGS. 6(a) to 6(e) are views showing an image synthesis operation using a mapping table.

FIGS. 6(a) to 6(e) are views for illustrating the outline of this operation. FIGS. 6(a) to 6(c) are images captured by three cameras (corresponding to camera 3, camera 1 and camera 2 in FIG. 2(a), respectively. FIG. 6(d) is a mapping table used for generating a synthetic image from the camera images of FIGS. 6(a) to 6(c). The image processing part 2 generates a synthetic image shown in FIG. 6(e) from the three camera images of FIGS. 6(a) to 6(c), based on information of the mapping table of FIG. 6(d).

The mapping table shown in FIG. 6(d) has mapping data about each pixel of the synthetic image shown in FIG. 6(e). Each mapping datum describes information about a pixel of a camera image by which the corresponding pixel of the synthetic image is generated.

"Generating a synthetic image" means to determine values of all the pixels of the synthetic image. Herein, the image processing part 2 determines values of pixels of the synthetic images in the order of the raster sequentially from the upper left, and the operation will be described by taking an example of the case of determining a value of a pixel P1 in the middle of the raster.

First, mapping data MP1 corresponding to the pixel P1 of the synthetic image is referred to. In the mapping data MP1, the corresponding camera number and the coordinates of the corresponding pixel of the camera image. In this example, in the mapping data MP1, "1" is described as the camera number and "340" as the X coordinate and "121" as the Y coordinate are described.

The image processing part 2 refers to pixel data C1 of the coordinates (340, 121) of the image captured by the camera 1 shown in FIG. 6(b), according to the description of the mapping data MP1 so as to determine the value of the pixel P1 of a synthetic image. Herein, the simplest method for determination is to use the value C1 of the pixel data as the value of the pixel P1. The synthetic image as shown in FIG. 6(e) is generated by determining the value of each pixel of the synthetic image by the same method.

For example, the mapping data MP2 corresponding to the pixel P2 of the synthetic image shows the pixel data C2 of the image captured by the camera 2 shown in FIG. 6(c), and therefore the value of the pixel data C2 is assigned as the value of the pixel P2. Similarly, the mapping data MP3 corresponding to the pixel P3 of the synthetic image shows the pixel data C3 of the image captured by the camera 3 shown in FIG. 6(a), and therefore the value of the pixel data C3 is assigned as the value of the pixel P3. In the mapping table of FIG. 6(d), a region R1 corresponds to the camera 1, and a region R2 corresponds to the camera 2, and a region R3 corresponds to the camera 3.

A region R4 other than the three regions R1 to R3 corresponding to the cameras is not covered by the cameras, or a blind spot that is hidden by the vehicle so that no corresponding camera images are present. For example, a pixel P4 of the synthetic image is a pixel of the region R4. In this case, as the camera number of the mapping data MP4 corresponding to the pixel P4, a specific camera number ("−1" in this example) that indicates that there is no corresponding camera image is used. When the camera number is "−1", predetermined pixel data indicating that this is outside the camera coverage or a blind spot are set for the corresponding pixel P4. Herein, black is set as the predetermined pixel data.

In the example of FIGS. 6(a) to 6(e), the mapping table is constituted so that a synthetic image overlooking the surroundings of the vehicle from the virtual point of view above the vehicle can be generated. This kind of mapping table can be prepared using geometric transformation that utilizes a so-called road surface plane model as described later. Alternatively, the mapping table can be prepared in the trial and error manner while watching the synthetic image.

In fact, the correspondence relationship between the synthetic image and the pixel data of the camera images can be set freely depending on the purpose. For example, an arbitrary region of the camera image can be enlarged or contracted to synthesize the region in a part of the camera image, or a plurality of camera images can be aligned and synthesized. Thus, an arbitrary synthetic image can be generated.

For any mapping tables for generating a synthetic image, the image processing part 2 only has to perform the steps of referring to mapping data, referring to the pixel data of the designated camera image, and setting a pixel value of the synthetic image with respect to each pixel of the synthetic image. Therefore, the processing amount thereof can be significantly smaller than in the case where image synthesis is performed by an operation for each image synthesis. Therefore, in this method, the processing amount is constant, regardless of the type of the synthetic image, and high speed processing can be achieved, so that this method is most advantageous when used for monitoring that is required to be completed real-time in a predetermined period of time or for driving aid.

(First Example of an Operation for Generating a Synthetic Image)

Figure 7:
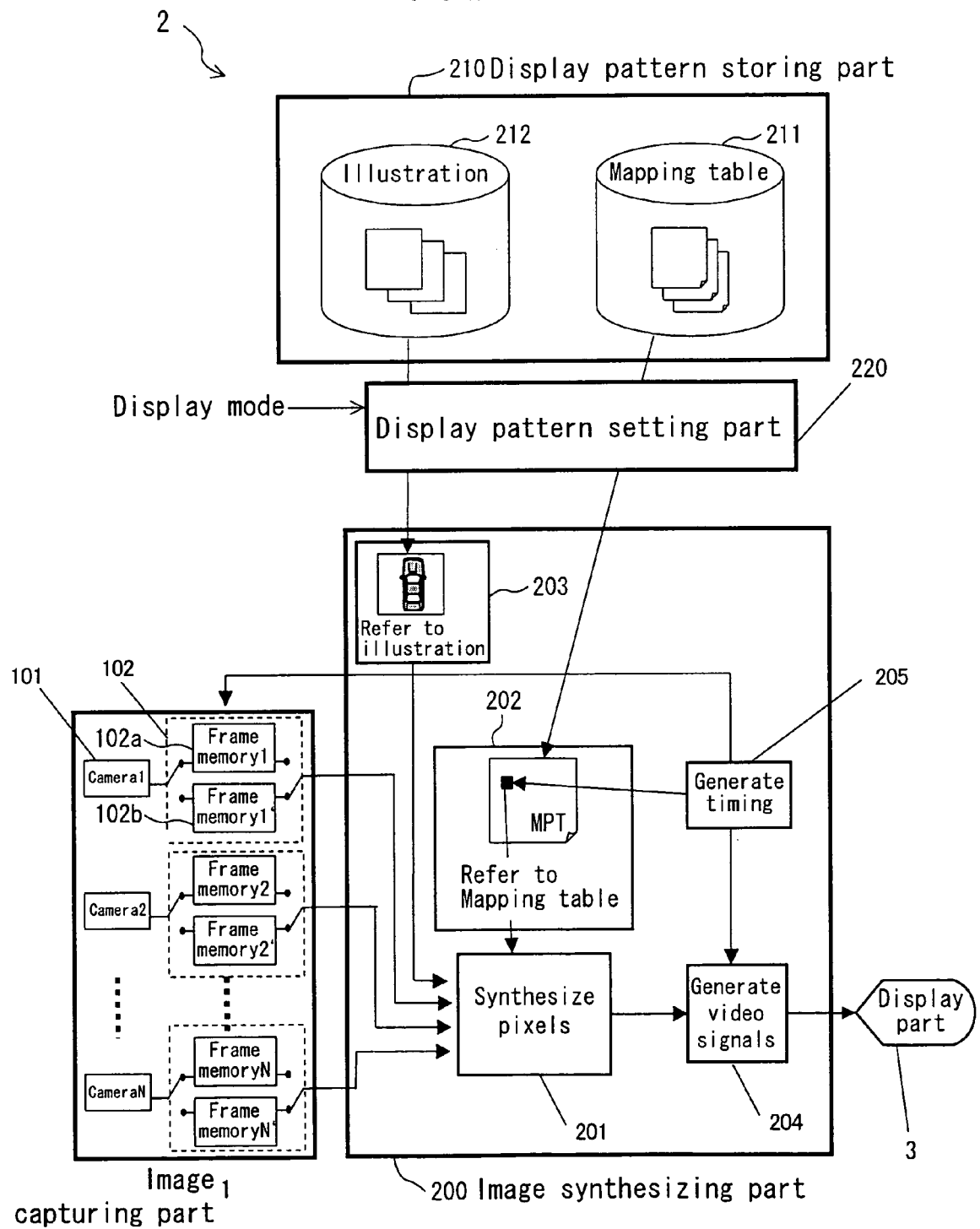
FIG. 7 is an example of a structure of a monitoring system of an embodiment of the present invention.

FIG. 7 is a diagram showing an example of a structure of a monitoring system of this embodiment. In FIG. 7, the image processing part 2 includes an image synthesizing part 200, a display pattern storing part 210 and a display pattern setting part 220. The displaying storing part 210 includes a mapping table storing part 211 for storing a plurality of mapping tables as described above. The display pattern setting part 220 selects one mapping table MPT in accordance with the display pattern of a synthetic image to be generated from the mapping tables stored in the mapping table storing part 211, and sets it to a mapping table reference part 202 of the image synthesizing part 200.

Furthermore, the display pattern storing part 210 includes an illustration storing part 212 for storing various illustration images. The display pattern setting part 220 reads out an illustration image necessary for generation of a synthetic image from the illustration image storing part 212, and sets the illustration image to an illustration reference part 203 of the image synthesizing part 200. Here, the illustration image showing the vehicle is set.

The image synthesizing part 200 generates a synthetic image using a camera image output from the image capturing part 1 in accordance with the mapping table MPT set in the mapping table reference part 202. A timing generating part 205 generates timing signals for generating an animation sequence of the synthetic image.

Each camera 101 is provided with a pair of frame memories 102a and 102b. Each camera 101 is of a CCD type in this example. When the camera is of a CMOS type, the camera can be provided with a frame memory function. In this case, the frame memories can be omitted.

Figure 8:
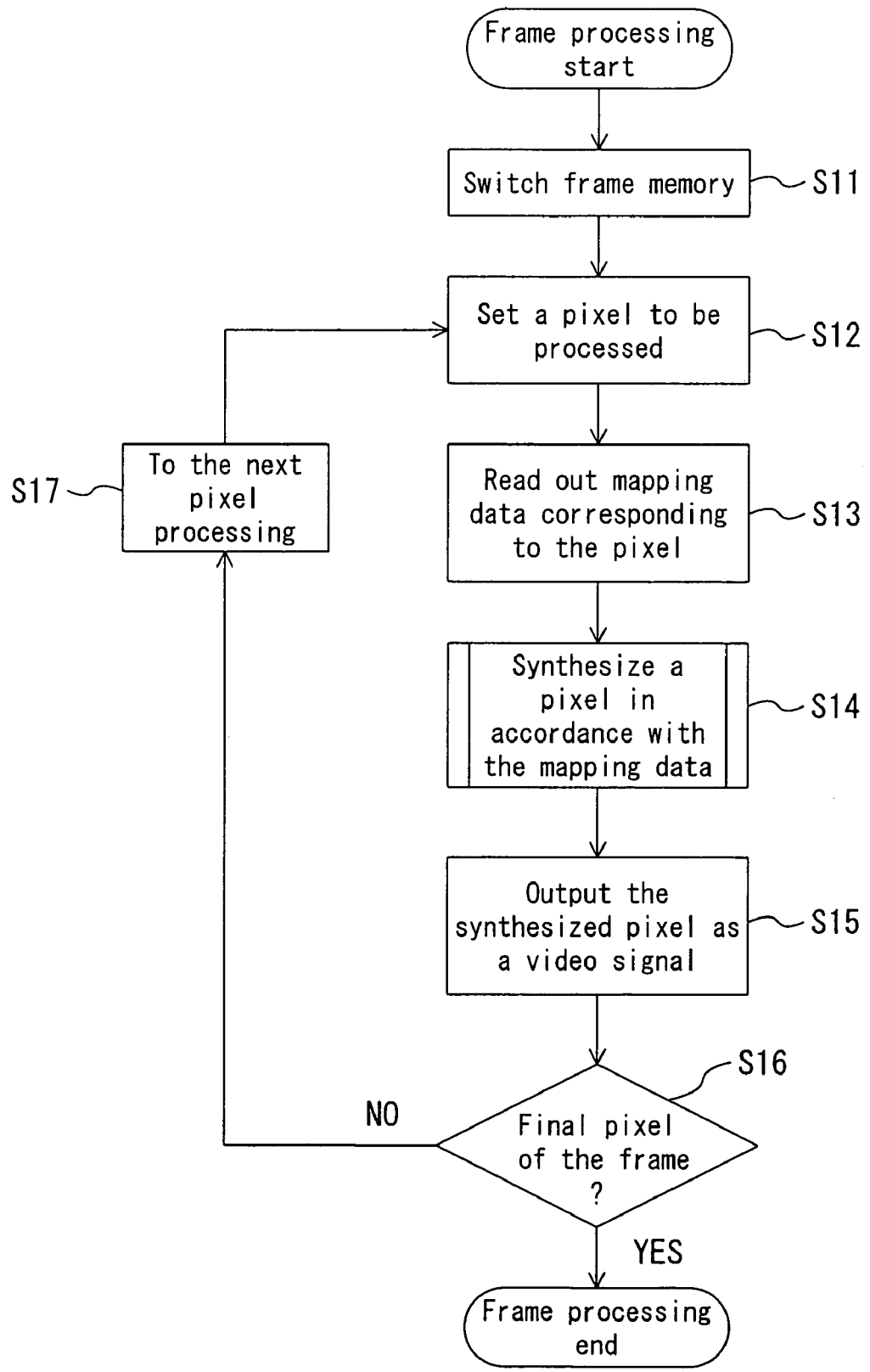
FIG. 8 is a flowchart showing an operation of an image synthesis part of FIG. 7.

FIG. 8 is a flowchart showing an operation of the image synthesizing part 200 for generation of one frame of a synthetic image.

First, the image capturing part 1 switches between the frame memory 102a in which images captured by each camera 101 are written and the frame memory 102b referred to by the image synthesizing part 200, in accordance with the timing signal for frame start output from the timing generation part 205 (step S11). The two frame memories are provided in each camera 101 and switched in order to prevent the writing and the reference from interfering with each other, because the image synthesizing part 200 refers to pixel data of the camera image here and there in accordance with the mapping table MPT, regardless of the order of writing from the camera 101, as described later.

Next, the timing generating part 205 generates a timing signal for designating a pixel for synthesis processing to the mapping table reference 202 (step S12). The mapping table reference part 202 reads out mapping data corresponding to the designated pixel from the mapping table MPT and outputs the data to the pixel synthesizing part 201 (step S13).

The pixel synthesizing part 201 generates a value of the pixel of the designated image in accordance with the content of the input mapping data, using the pixel data of each camera image stored in the frame memory 102, the pixel data of the illustration images stored in the illustration reference part 203 and the like, and outputs the value to a video signal generating part 204 (step S14). The processing of step S14 will be described later.

The video signal generating part 204 converts the input pixel value of the synthetic image to a video signal in accordance with the timing signal output from the timing generating part 205, and outputs the video signal to a displaying part 3 (step S15).

The image synthesizing part 200 executes the processing of steps S12 to S15 with respect to all the pixels of the frame (steps S16, S17). When processing for the final pixel of the frame is completed, the timing generating part 205 starts the processing for the next frame.

The same processing can be executed by field unit.

Figure 9:
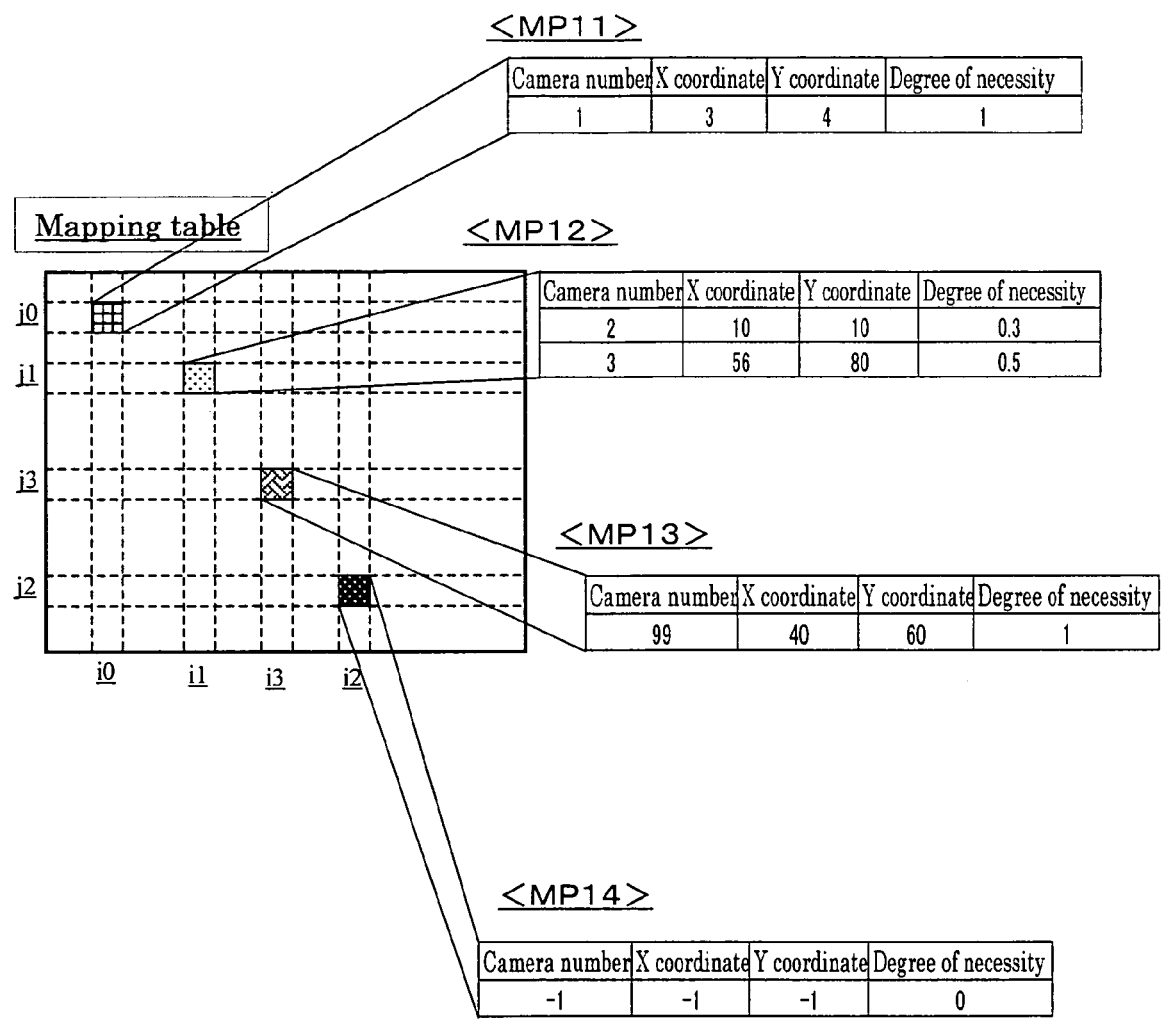
FIG. 9 is an example of a structure of a mapping table.

FIG. 9 is a diagram showing an example of the structure of the mapping table. The mapping table shown in FIG. 9 has four types of mapping data MP11 to MP14. The structure of each mapping data is basically the same as those shown in FIG. 6, except that the rate of necessity of the pixel value is described, in addition to the camera number and the x, y coordinates. Herein, "the rate of necessity" is represented by values from 0 to 1, and the larger the value is, the higher the necessity is.

The mapping data MP11 describes the correspondence relationship between the pixel of the synthetic image and the pixel data of one camera image. In this case, the rate of necessity is "1". The mapping data MP12 describes the correspondence relationship between the pixel of the synthetic image and the pixel data of a plurality of camera images. In this case, the pixel data of the camera image are weighted in accordance with the rate of necessity to generate the pixel value of the synthetic image.

The mapping data MP13 is used to attach the pixel data of the illustration image to the pixel of the synthetic image. More specifically, the number that does not correspond to any actual cameras ("99" in this example) is assigned to the illustration reference part 203 as the camera number so that an illustration image stored in the illustration reference part 203 can be identified.

The mapping data MP14 indicates that the pixel of the synthetic image is in a so-called blind spot region. More specifically, when generating the mapping table, as a result of calculating the coordinate values of the pixel of the camera image that is referred to for generation of the pixel of the synthetic image, when the pixel of the coordinate values represent, for example, the vehicle itself, the pixel of the synthetic image fall on a region obtained by combining the vehicle region and the blind spot region. The blind spot region is a region obtained by subtracting the vehicle region from the combined region. For this reason, the blind spot region can be represented by assigning values that do not exist as the camera numbers or the x, y coordinates. In this example, "−1" is assigned as the camera number.

Figure 10:
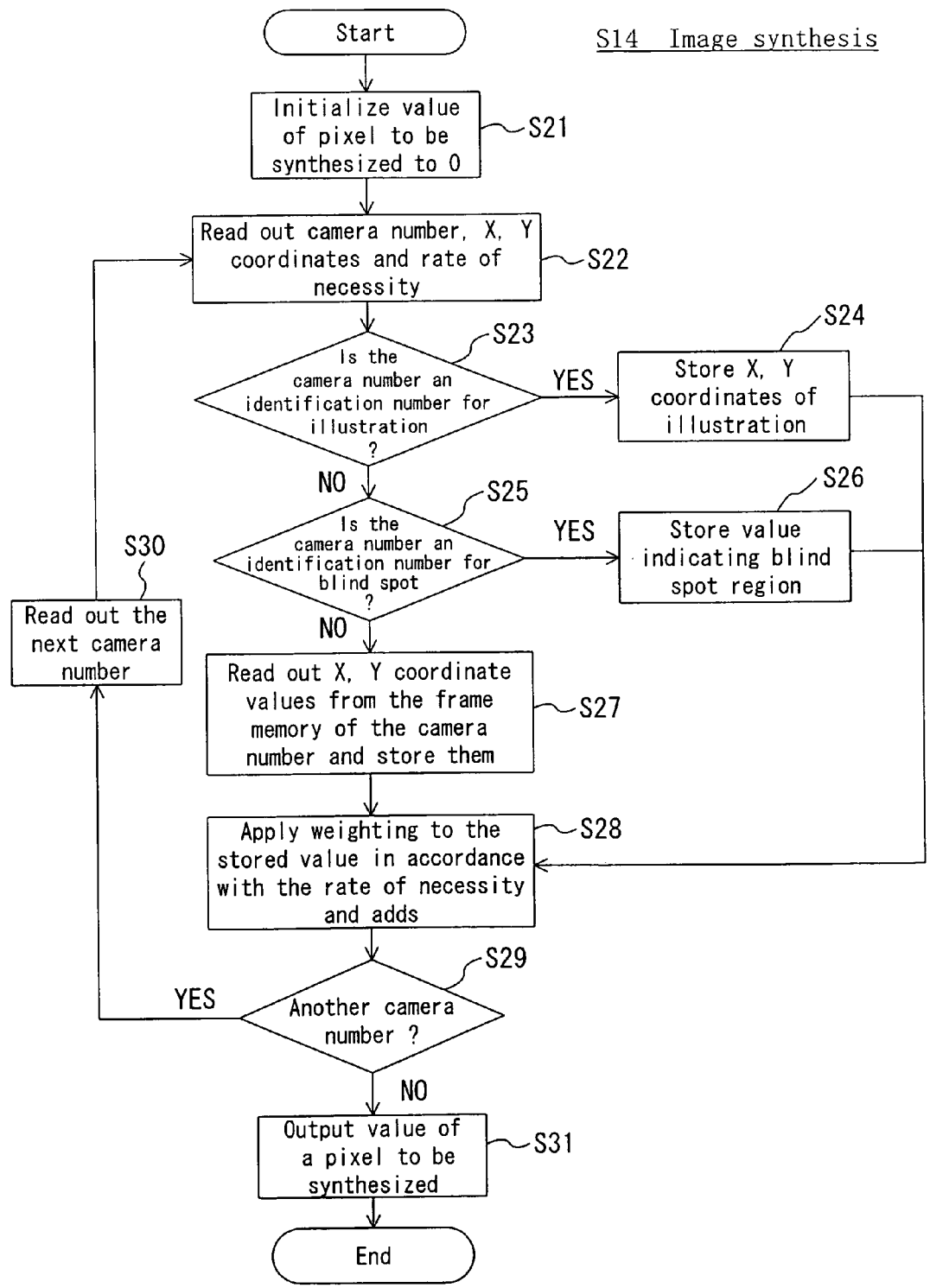
FIG. 10 is a flowchart showing the detail of the pixel synthesis step S14 of FIG. 8.

FIG. 10 is a flowchart showing the flow of the detailed process of the pixel synthesis step S14.

First, a value of the pixel for synthesis is initialized to "0" (step S21).

Next, the camera number, the x, y coordinates and the rate of necessity are read out from the mapping data corresponding to the pixel for synthesis (step S22).

In step S22, when the camera number that has been read out is an identification number "99" indicating an illustration image (that is, the case of the mapping data MP13), the procedure goes to step S24, where the pixel data of the designated x, y coordinates of the illustration image stored in the illustration reference part 203 are read out and stored. Then, the procedure goes to step S28. On the other hand, when the camera number is not "99", the procedure goes to step S25.

In step S25, when the camera number that has been read out is an identification number "−1" indicating a blind spot region (that is, the case of the mapping data MP14), the procedure goes to step S26, where the pixel data representing the blind spot region that has been previously set are stored. Then, the procedure goes to step S28. On the other hand, when the camera number is not "−1", the procedure goes to step S27.

In step S27, when the camera number is not "99" or "−1", that is, when it is determined that the pixel for synthesis is not in a region on which an illustration image is attached nor the blind spot region, the camera number represents the number of an actual camera, so that the pixel data of the designated x, y coordinates are read out from the camera images stored in the frame memory 102 of the corresponding camera number.

In step S28, the stored pixel data are weighted in accordance with the rate of necessity and added to the pixel value of the synthetic image. With respect to all the camera numbers described in the mapping data, steps S22 to S28 are repeated (steps S29, S30). When the processing is completed with respect to all the camera numbers, the image synthesizing part 201 outputs the values of the pixels (step S31).

For example, in the case of the mapping data MP12 shown in FIG. 9, the pixel value of the synthetic image can be obtained by the following equation.

The pixel value of the synthetic image=(the pixel value of the coordinates (10,10) of the camera 2×0.3+the pixel value of the coordinates (56,80) of the camera 3×0.5)/(0.3+0.5)

Herein, division by the sum of the degrees of necessity (0.3+0.5) is performed to normalize the pixel value.

The above-described operation easily can generate a synthetic image obtained by combining a plurality of camera images or a synthetic image including an illustration image. Furthermore, a synthetic image obtained by displaying a semi-transparent illustration image on an actual image can be generated by weighting the camera image and the illustration image in accordance with the rate of necessity. Moreover, a synthetic image obtained by displaying semi-transparent illustration images can be generated by weighting the pixel data other than the camera image in accordance with the rate of necessity.

Furthermore, as the illustration image, illustration images other than illustrations or images of the vehicle, such as those having a fixed shape on a screen such as a scale or an index of images, can be used.

In the description of this example, the camera number ("99") for referring to the illustration images and the camera number ("−1") for indicating the blind spot region are set independently. However, if the images representing the blind spot region are stored in the illustration reference part 203, the same camera number ("99") can be used for referring to the illustration images and for indicating the blind spot. In this case, for example, it is possible to store the illustration images representing the vehicle in combination with the images representing the blind spot region in the illustration reference part 203.

Furthermore, when the display pattern is changed in response to the designation of the display mode, it is sufficient for the display pattern setting part 220 to read out a mapping table corresponding to a new display pattern from the mapping table storing part 211, and to set it in the mapping table reference part 202. Alternatively, a plurality of mapping tables may be synthesized so that a new mapping table can be generated.

In this example, as the mapping data MP13 shown in FIG. 9, the X, Y coordinate values of the illustration reference part 203 are described to display the illustration image. However, the pixel data itself of the illustration image can be described in the mapping data instead.

FIG. 11 is an example of the mapping data in this case. In the mapping data MP15 of FIG. 11, when the camera number is "99", that is, an illustration image is displayed, the pixel data itself of the illustration image are stored in the form of the values of red (R), green (G) and blue (B) in the region where the x coordinate and the y coordinate are stored.

For example, if the X coordinate and the Y coordinate are represented with 16 bits, the size of the region is 32 bits. On the other hand, if the image data of the illustration image are represented with 8 bits each for R, G and B, the data are constituted with 24 bits in total. 8 bits "0" are added as the upper bits to make it 32 bit data, and the data are stored in the coordinate region. In this case, in the step S24 of FIG. 10, the R, G and B values described in the mapping data MP15 are read out and stored, instead of referring to the illustration reference part 203.

In this case, the mapping table and the illustration image are combined, so that the illustration reference part 203 can be eliminated. Furthermore, since the R, G and B values are read out directly from the mapping data, instead of reading out the x, y coordinate values from the mapping data and then reading out the pixel data of the corresponding illustration image, one procedure of the process can be eliminated.

Furthermore, to display the illustration image of the vehicle, in general, a value 1.0 is often assigned as the rate of necessity. However, as in the example of FIG. 11, the rate of necessity of the illustration image is a value smaller than 1.0 and the illustration image is synthesized with another camera image so that a scale or an index can be displayed in a semi-transparent manner on the synthetic image.

<Example of Basic Synthetic Image>

The mapping table can be classified roughly into two groups of a single map and a composite map. "Single map" refers to a map where camera images and images from a virtual point of view are correlated by the pixel level, using a predetermined space model (which will be described in detail later). "Composite map" will be described later.

The display mode of the image processing part 2 is determined by the type of the mapping table set in the image synthesizing part 200. This display mode can be switched manually or automatically.

A typical single map and an example of a synthetic image using the single map will be described below.

Figure 12:
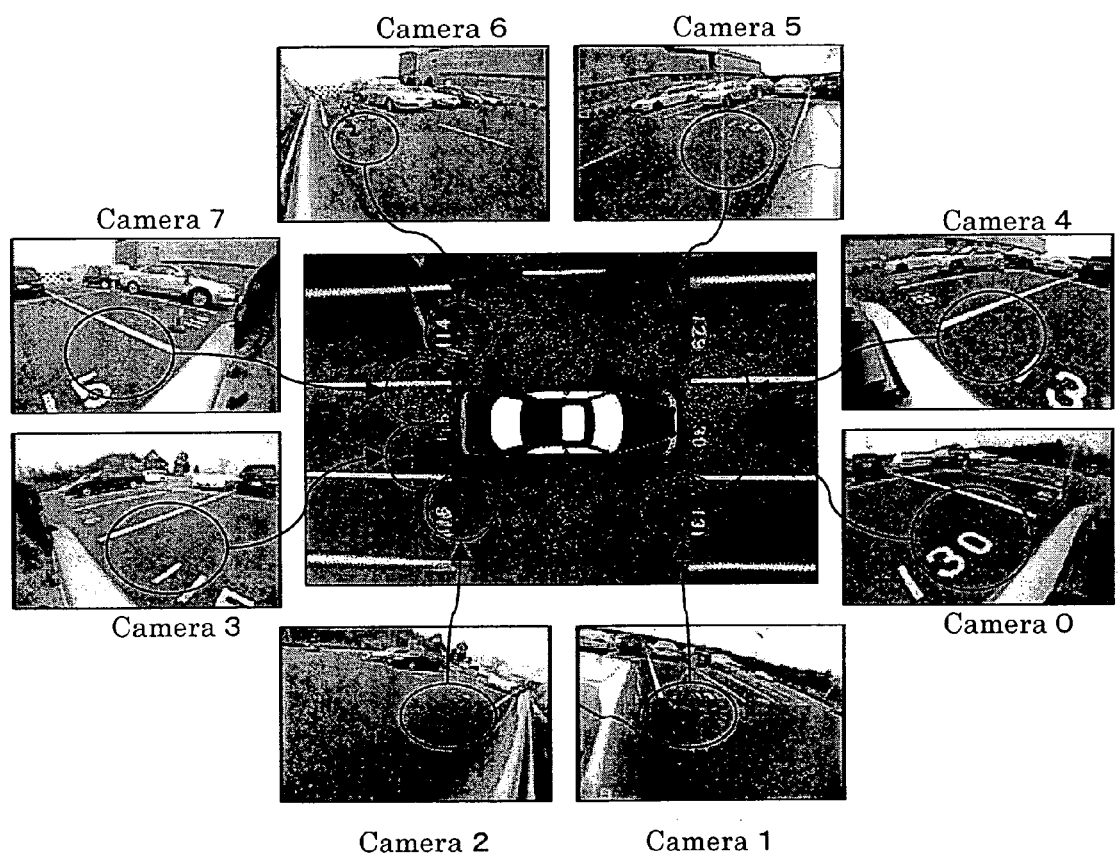
FIG. 12 is an example of a vertically downward view image utilizing images from eight cameras.
Figure 13:
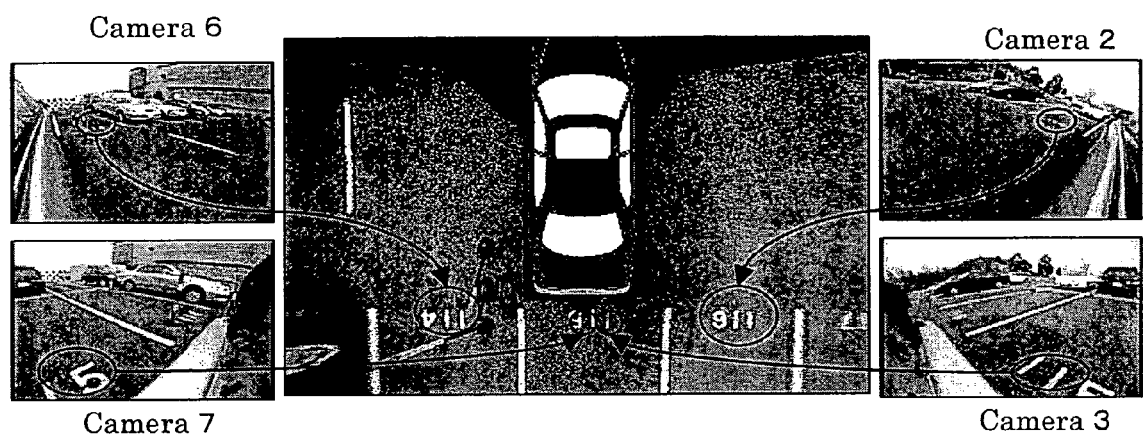
FIG. 13 is an example of a vertically downward view image utilizing images from four cameras.
Figure 14:
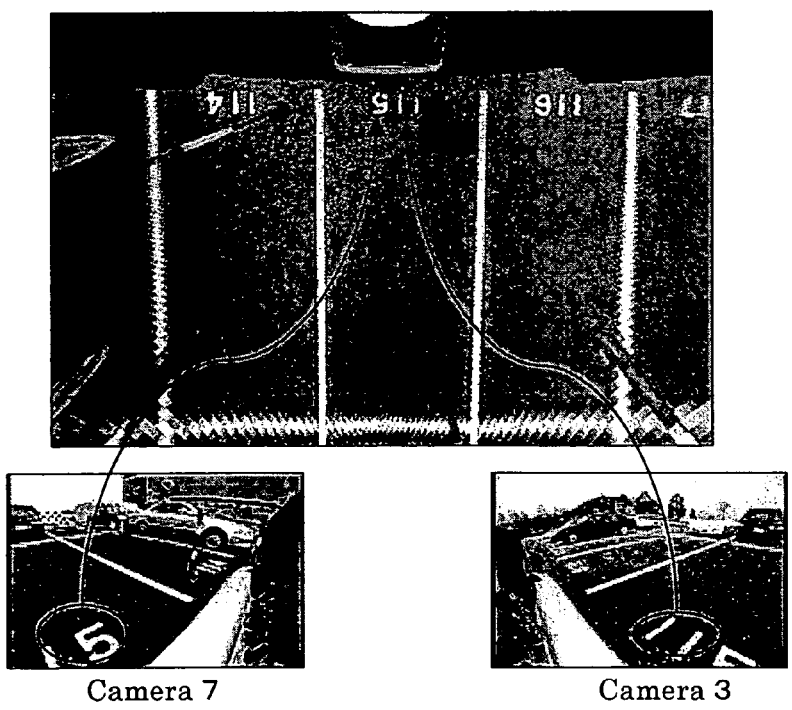
FIG. 14 is an example of a vertically downward view image utilizing images from two cameras.

Vertical Downward View (FIGS. 12 to 14)

A road surface plane model is used as the space model. The position of the virtual point of view is above the vehicle, and the direction of the line of sight is directed straight downward. This example is characterized in that the distance can be perceived easily and this example can be used advantageously for parking (perpendicular or parallel parking) or the like. FIG. 12 shows an image utilizing images from eight cameras. FIG. 13 shows an image utilizing images from four cameras. FIG. 14 shows an image utilizing images from two cameras.

Figure 15:
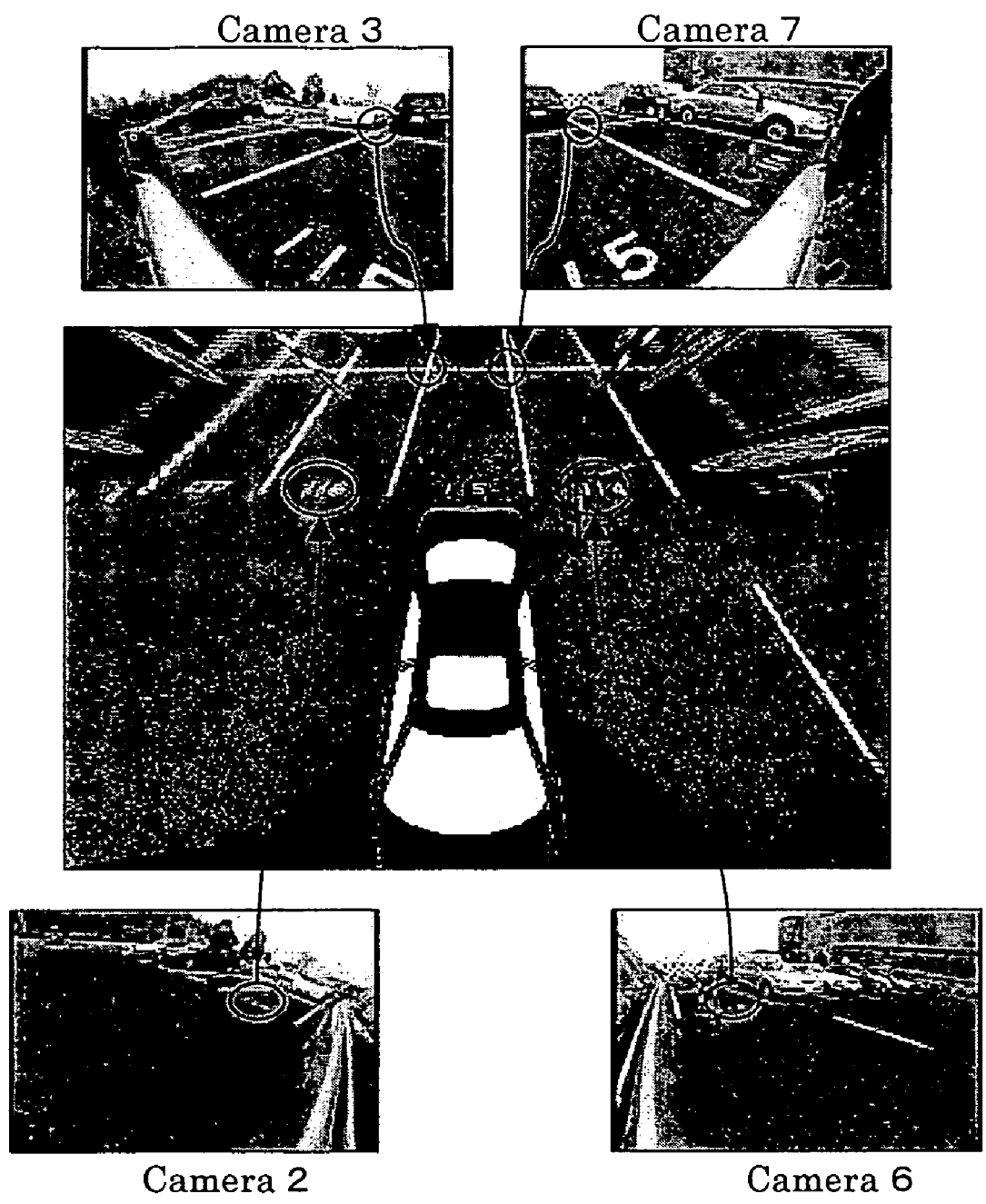
FIG. 15 is an example of an obliquely downward view image.

Obliquely Downward View (FIG. 15)

A road surface plane model is used as the space model. The position of the virtual point of view is above the vehicle, and the direction of the line of sight is directed obliquely backward. The range of view can be changed freely by adjusting the angle of the line of sight. In this mode, the backward of the vehicle can be looked out extensively in the right position relationship. This mode can be used advantageously as a rear view monitor at regular running, or to confirm safety at a low speed back-up such as the start of an operation for parking. At a low speed running, the range of view or the direction can be switched depending on the speed.

Figure 16:
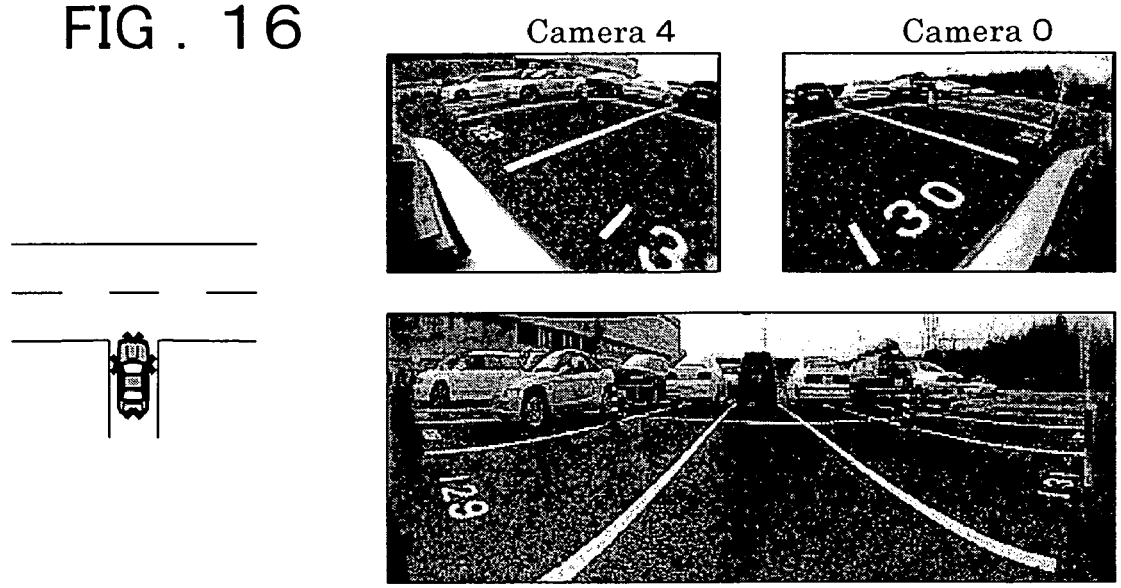
FIG. 16 is an example of a panorama image in forward panorama mode.
Figure 17:
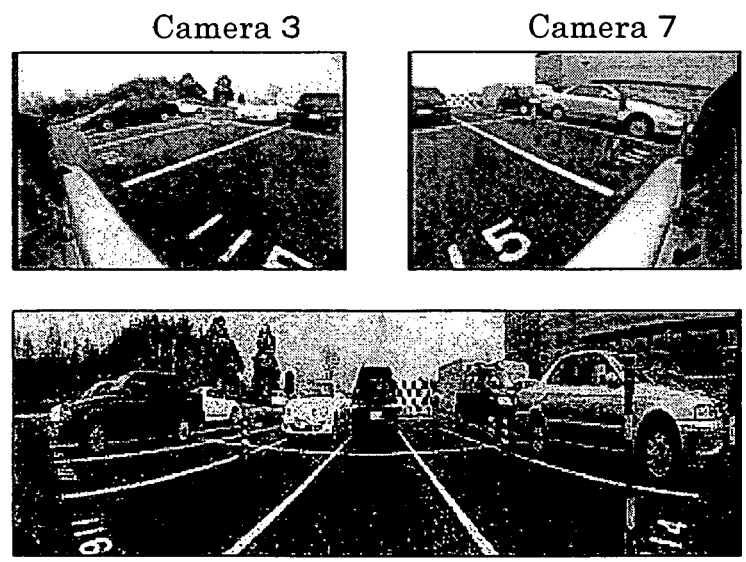
FIG. 17 is an example of a panorama image in backward panorama mode.

Panorama (FIGS. 16 and 17)

A cylindrical model is used as the space model. FIG. 16 is a forward panorama mode. The position of the virtual point of view is at the front edge of the vehicle, and the direction of the line of sight is straight ahead. In this mode, the state of the forward of the running direction can be seen, so that this mode can be utilized as a blind corner view monitor. More specifically, when the vehicle goes into a large street from a narrow lane, this mode allows the state of the large street to be recognized at once.

FIG. 17 is a backward panorama mode. The position of the virtual point of view is at the rear edge of the vehicle, and the direction of the line of sight is straight backward. In this mode, the backward portion of the vehicle can be looked out extensively as a 180 degree-panorama image. This mode can be used as a rear view monitor at running (especially, at high speed running).

Figure 18:
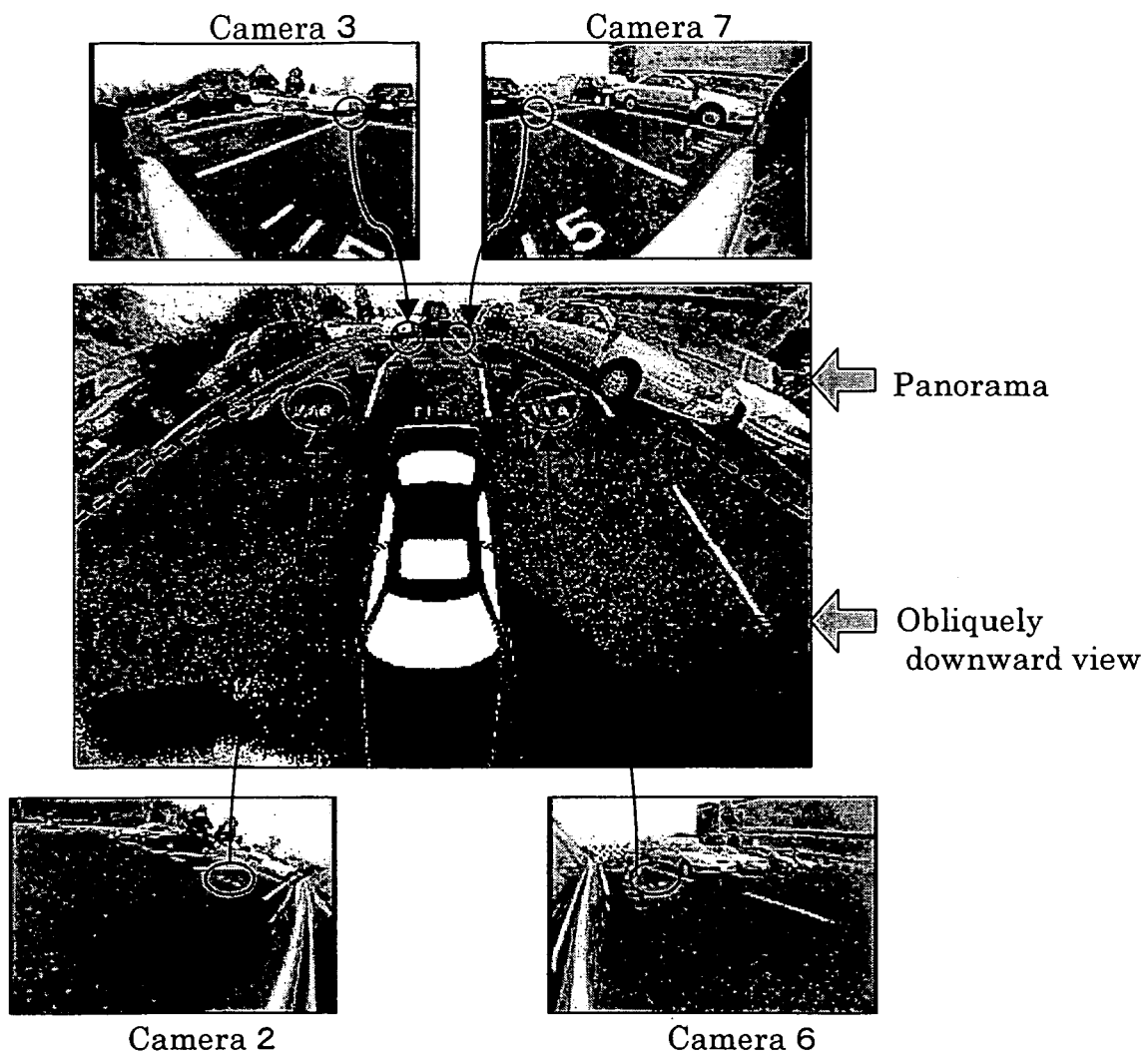
FIG. 18 is an example of a combination of an obliquely downward view image and a panorama image.
Figure 19A:
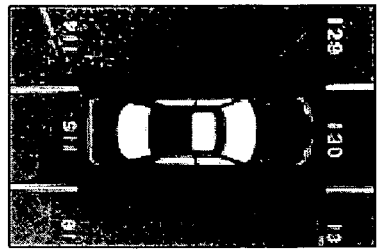
FIGS. 19(a) to 19(f) show an example of synthetic images when the height of the virtual point of view is changed in accordance with the running state of the vehicle.
Figure 19B:
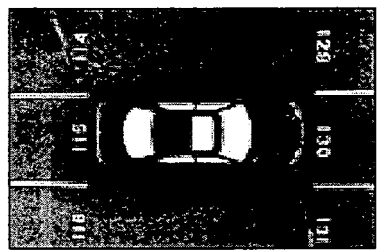
Figure 19C:
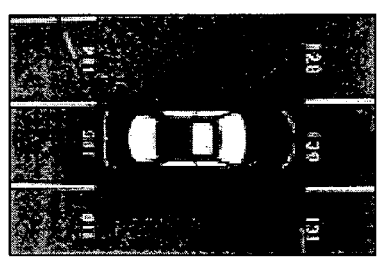
Figure 19D:
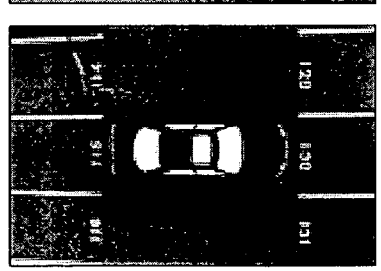
Figure 19E:
Figure 19F:
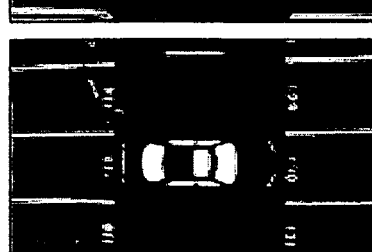

Obliquely Downward View+Panorama (FIG. 18)

A road surface plane model and a cylindrical model are used as the space models. More specifically, as shown in FIG. 18, an image of a place near the rear of the vehicle is displayed in the obliquely downward view mode using the road surface plane model, and an image of a place far from the rear of the vehicle is displayed in the panorama mode using the cylindrical model. Thus, this mode can be used advantageously in applications both in the obliquely downward view mode and the panorama mode.

<Display Automatic Switching>

In the monitoring system of the present invention, more safe and comfortable driving can be supported by switching the mapping table described above in accordance with various driving scenes, as appropriated. Furthermore, in one driving operation, it is essential for the driver to switch the mapping table in accordance with the ever-changing circumstances of the surrounding of the vehicle.

In other words, at least one of the position, the direction of the line of sight and the focal length of the virtual point of view of the synthetic image is changed in accordance with the running state of the vehicle, so that the convenience for the driver can be improved.

FIGS. 19(a) to 19(f) are views showing an example in which the height of the virtual point of view of the synthetic image is changed. In the images shown in FIGS. 19(a) to 19(f), the height of the virtual point of view is increased in descending order, and the display region including the vehicle becomes gradually wider. In other words, zoom-up is realized by lowering the height of the virtual point of view, and zoom-down is realized by raising the height of the virtual point of view. Even if the focal length of the virtual point of view is changed, the synthetic image can be changed in the same manner as in FIGS. 19(a) to 19(f).

A first example of a trigger for switching the height of the virtual point of view can be a running speed of the vehicle. For example, the virtual point of view can be raised as the running speed of the vehicle is increased, so that a wider area can be displayed. On the other hand, the virtual point of view can be lowered as the running speed of the vehicle is reduced, so that a narrower area can be displayed. Alternatively, when the vehicle is provided with an object detecting sensor for measuring the distance between the vehicle and an obstacle, output signals from the object detecting sensor can be used as the trigger for switching. For example, the virtual point of view can be lowered as the distance between the vehicle and the detected obstacle is reduced, so that a narrower area can be displayed. On the other hand, the virtual point of view can be raised as the distance is increased, so that a wider area can be displayed. Furthermore, a switching switch may be provided so that the driver or another passenger can designate enlargement or contraction of the image via the switch.

FIGS. 20(a) to 20(d) are views showing an example in which the direction of the line of sight of the virtual point of view of the synthetic image is changed. In the images shown in FIGS. 20(a) to 20(d), the direction of the line of sight of the virtual point of view is changed gradually from oblique backward to vertical downward. With the change in the direction of the line of sight, the model for generating the synthetic image is also changed. In other words, the region for the synthetic image of a quasi-cylindrical model is larger as the direction of the line of sight is inclined more obliquely, so that a farther place can be seen easily.

In FIGS. 20(a) to 20(d), it can be said that with the change in the direction of the line of sight of the virtual point of view, capturing an image outside of the view range of the changed virtual point of view is controlled. In other words, using the quasi-cylindrical model, the image that is outside of the view range of the virtual point of view can be captured. Then, the presence or the absence of the capturing of the image that is outside of the view range of the virtual point of view, the size thereof, and the image capturing range are controlled in accordance with the running state of the vehicle.

An example of a trigger for switching the direction of the line of sight of the virtual point of view can be the running speed of the vehicle, input with a switch or the like, as in the case of switching the height of the virtual point of view. For example, when the running speed of the vehicle is low, the line of sight is oriented straight downward. As the running speed is increased, the direction of the line of sight is inclined so that more backward can be displayed.

Figure 21A:
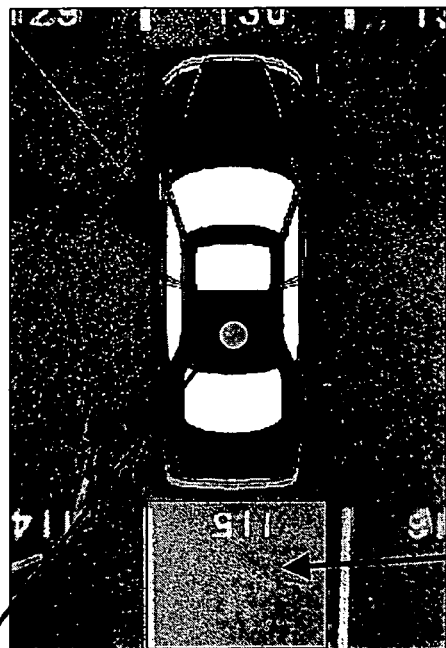
FIGS. 21(a) and 21(b) show an example of synthetic images when the direction of the line of sight of the virtual point of view is changed in accordance with the steering angle of the vehicle.
Figure 21B:
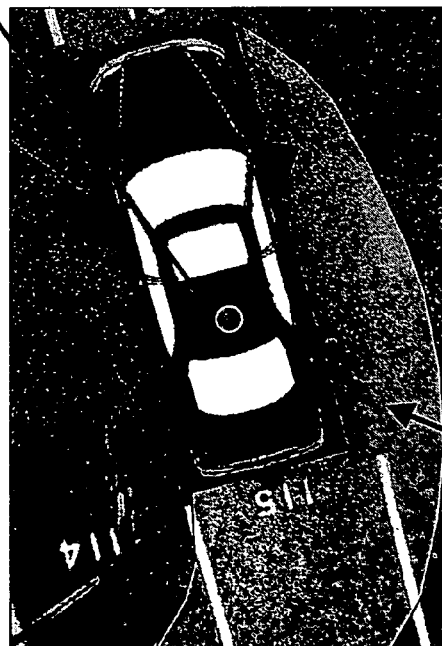

FIGS. 21(a) and 21(b) are views showing an example where the direction of the line of sight of the virtual point of view of the synthetic image is changed in accordance with the steering angle of the vehicle. In the example of FIGS. 21(a) and 21(b), the virtual point of view is rotated about the optical axis in accordance with the steering angle. FIG. 21(a) is a synthetic image when the gear is in reverse and the steering wheel is straight. In this case, the vehicle moves straight backward, and therefore the virtual point of view is set in such a manner that the vehicle in the synthetic image is straight, and the regions on the right and the left of the vehicle are equally displayed, so that the area behind the vehicle can be seen easily. On the other hand, FIG. 21(b) is a synthetic image when the gear is in back and the steering wheel is rotated left. In this case, the vehicle moves left backward, and therefore the virtual point of view is rotated about the optical axis so that the area to which the vehicle moves, that is, the right side, the right backward and the backward of the vehicle can been seen easily. Thus, safety is ensured further.

Figure 22A:
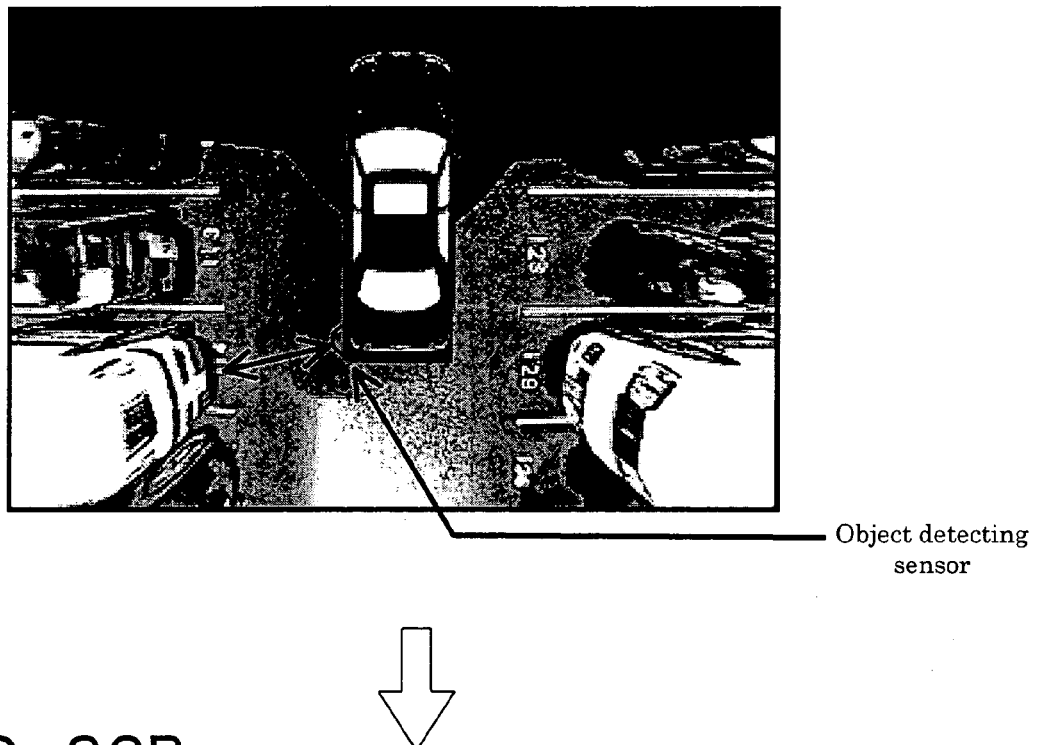
FIGS. 22(a) and 22(b) are views showing an example of image switching in accordance with output signals from an object detecting sensor.
Figure 22B:
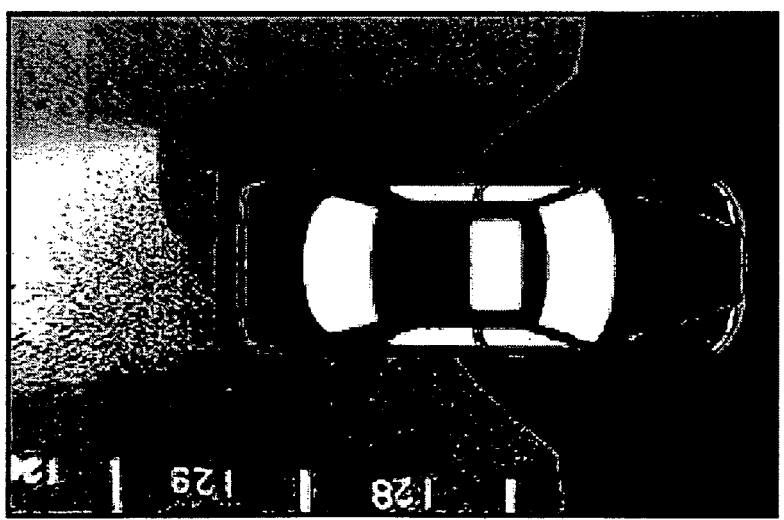

FIGS. 22(a) and 22(b) are views showing an example of image switching in response to output signals from the object detecting sensor. FIG. 22(a) is a scene before the object detecting sensor detects an obstacle approaching the vehicle. When the object detecting sensor detects an obstacle approaching the vehicle, the image on the screen is switched to the image shown in FIG. 22(b). In other words, the image is enlarged on the display so that the distance between the vehicle and the detected obstacle is recognized more easily.

Thus, when the object detecting sensor detects an obstacle, the image is displayed with enlargement/contraction/rotation, etc., that is effected step by step or continuously in accordance with the distance to the obstacle, so that the obstacle can draw the attention of the driver or the passenger. Furthermore, the position of the virtual point of view can be changed in accordance with the position in which the obstacle is located.

Figure 23:
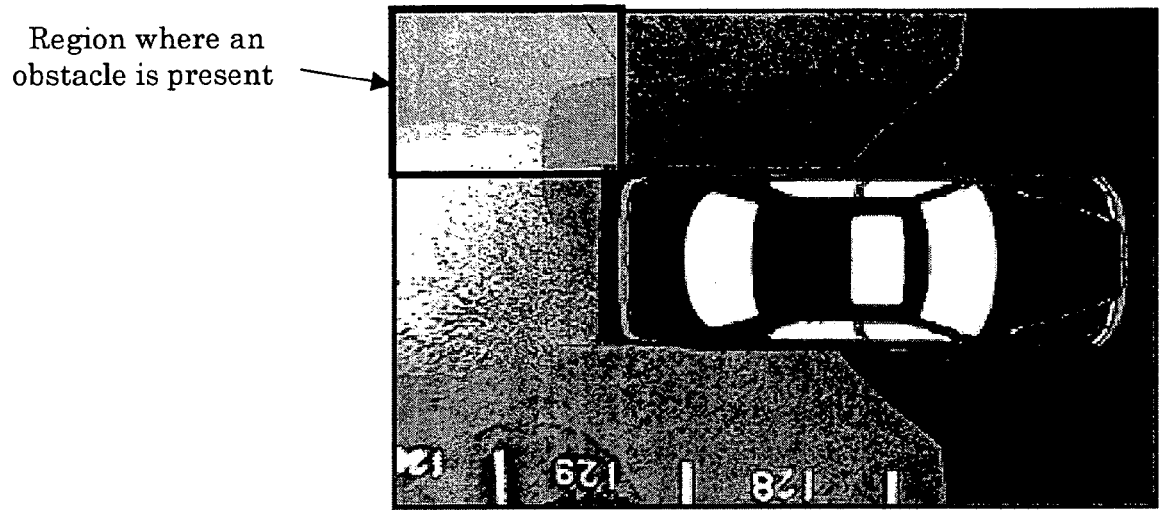
FIG. 23 is a view showing an example of image switching in accordance with output signals of an object detecting sensor.

Furthermore, as shown in FIG. 23, the region in which the obstacle is located can be enlarged and displayed, and the region can be enclosed with a frame and displayed. Alternatively, the frame can be flashed, or the color inside the frame can be reversed. This ensures further that the attention of the driver or the passenger can be drawn. Display only with enclosure with a frame without enlarging the image makes it possible to draw the attention of the driver or the passenger. Furthermore, a warning sound can be produced together with the change in the screen display so that the presence of an obstacle can be informed of.

Figure 24:
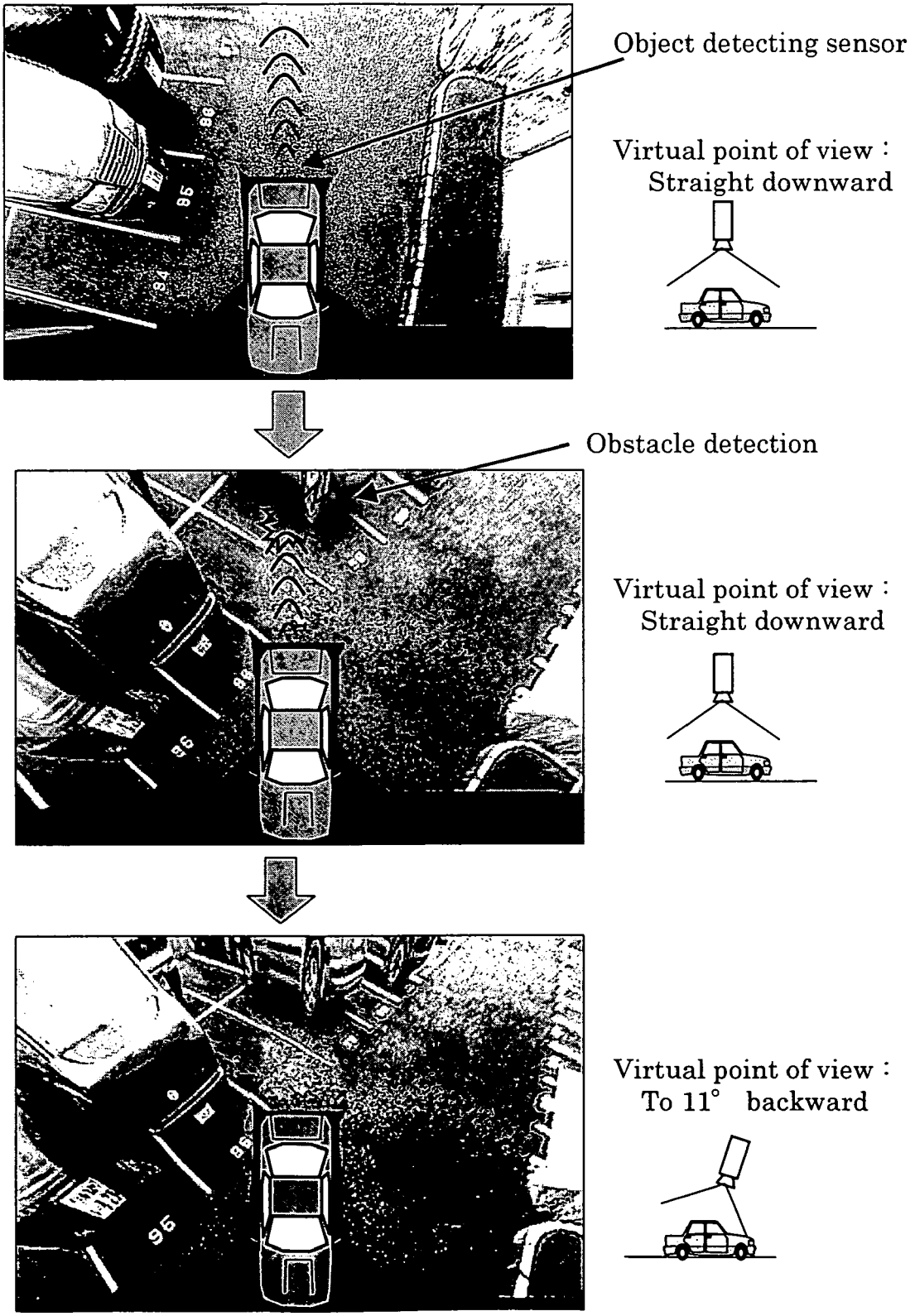
FIG. 24 shows views showing an example of image switching in accordance with output signals of an object detecting sensor.

FIG. 24 shows another example of image switching in accordance with the results of detection of the object detecting sensor. In FIG. 24, when an obstacle is detected backward of the vehicle, the direction of the line of sight of the virtual point of view is changed from straight downward to slightly backward. This change makes it possible to watch the obstacle located backward of the vehicle more easily. Furthermore, the virtual point of view can be displaced in parallel so that the detected obstacle is in the center of the synthetic image.

In FIGS. 19 to 24, the synthetic images in the case where the virtual point of view is above the vehicle have been described. However, even if the virtual point of view is located in another position, the convenience of the driver can be improved by changing at least one of the position, the direction of the line of sight and the focal length of the virtual point of view in accordance with the running state of the vehicle. As other examples of the position of the virtual point of view, the position of the rear trunk or the position of the head of the driver can be used.

In FIGS. 20(a) to 20(d), with change in the direction of the line of sight of the virtual point of view, capturing an image outside of the view range is controlled. However, with the change in the position or the focal length of the virtual point of view, capturing an image that is outside of the view range can be controlled. Furthermore, an image that is outside of the view range of the virtual point of view can be captured without using the models. Moreover, control of capturing an image that is outside of the view range of the virtual point of view may be only performed in accordance with the running state of the vehicle without changing the virtual point of view.

(Second Example of an Operation for Generating a Synthetic Image)

Display image easily can be switched by changing the mapping table to be used, as appropriate. However, in this case, to switch display image continuously, it is necessary to prepare a large number of mapping tables. For this reason, it is necessary to provide a storing part having a large storage capacity, which is unfavorable.

In this example, an original mapping table larger than a synthetic image is provided, and a mapping table that is cut out from this original mapping table is used to synthesize the synthetic image. In this case, continuous switching of display image easily can be realized by changing the mapping table to be cut out, as appropriate.

Figure 25:
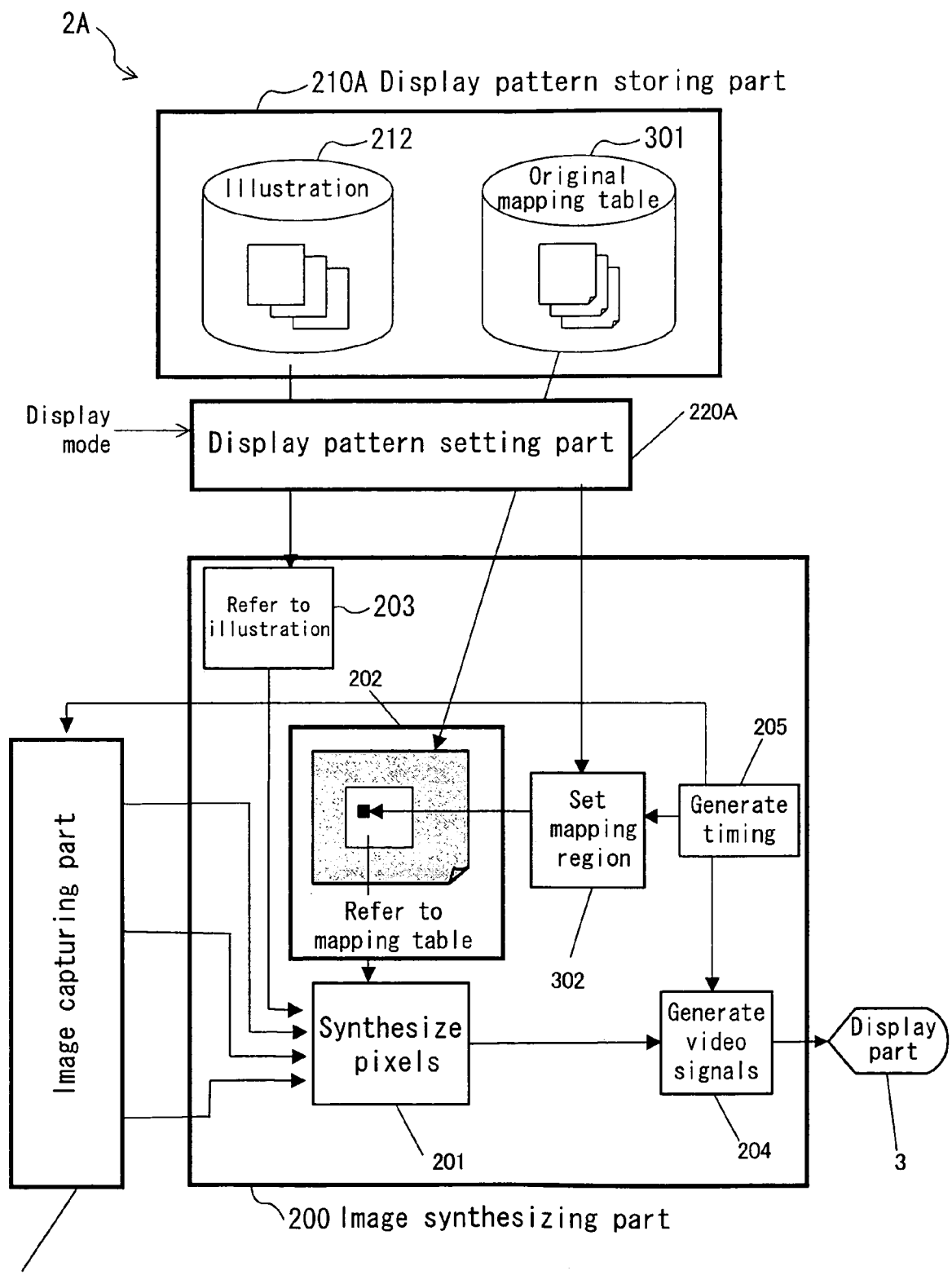
FIG. 25 is an example of a structure of a monitoring system of an embodiment of the present invention.

FIG. 25 is a diagram showing the configuration of a monitoring system of this example. This configuration is different from that shown in FIG. 7 in that based on the coordinates of the pixel of the synthetic image output from a timing generating part 205 and the region designation information of the mapping table set by a display pattern setting part 220A, a map region setting part 302 generates an element of the corresponding mapping table and outputs the element to a mapping table reference part 202. In the mapping table reference part 202, the original mapping table stored in an original mapping table storing part 301 included in the display pattern storing part 210A is set by the display pattern setting part 220A.

More specifically, in the first example described above, in the step S13 shown in FIG. 8, the mapping data in the same position as the pixel of the synthetic image to be output at present that is set by the timing generating part 205 is read out. In this example, after setting the region of the mapping table to be utilized on the original mapping table, the mapping table corresponding to the pixel of the synthetic image is read out.

The method for reading out the mapping data in this example will be described below. FIGS. 26(a) to 26(d) and FIGS. 27(a) to 27(g) schematically show the relationship between the synthetic image and the original mapping table in this example. In the example of FIGS. 26(a) to 26(d), parallel displacement of the synthetic image can be realized by fixing the size of the region to be cut out from the original table to the same size as that of the synthetic image and changing the offset value. In the example of FIGS. 27(a) to 27(d), enlargement and contraction of the synthetic image can be realized by changing the size of the region to be cut out from the original table and the read-out step of the element.

First, the case where parallel displacement of the synthetic image will be described with reference to FIGS. 26(a) to 26(d).

The synthetic image shown in FIG. 26(a) has the size of a width of W_DISP and a height of H_DISP, and the original mapping table shown in FIG. 26(b) has the size of a width of W_MAP and a height of H_MAP. The original mapping table in this example is a table for creating an image in which a wide range of the surrounding of the vehicle is overlooked from the virtual point of view in the sky above the vehicle. In the first example described above, if the focal length is constant, this corresponds to enlargement of the size of a projection plane from (W_DISP, H_DISP) to (W_MAP, H_MAP) with a constant distance between the virtual point of view and the projection plane. The original mapping table can be constructed in this manner. By enlarging the projection plane, the original mapping table can contain information on a wider range of areas. FIG. 26(d) is an image obtained by replacing the elements of the mapping table by the corresponding camera images and the illustration images.

Next, the display pattern setting part 220A designates a region to be used as the mapping table for generating the synthetic image by an offset (off_x, off_y) from the origin (0, 0) on the original mapping table. A region MPT of a size of (W_DISP, H_DISP) with the point (off_x, off_y) as the start point is used as the mapping table for image synthesis. The mapping data at the position obtained by adding this offset (off_x, off_y) to the X, Y coordinates of the pixel obtained by raster scanning of the synthetic image is read out from the mapping table reference part 202 and is output to the image synthesizing part 201. The synthesis processing of the pixel is performed according to the flowchart of FIG. 10 as in the first example. FIG. 26(c) is a synthetic image obtained with the mapping table MPT shown in FIG. 26(b).

In the case where the coordinates added with the offset exceeds the range of the original mapping table, the pixel synthesizing part 201 is notified and display is performed in such a manner that a predetermined color (e.g., black) is used as the value for the pixel so that the region can be recognized.

This example makes it possible to generate a synthetic image when the virtual point of view is displaced in parallel to the road surface without increasing the number of the mapping tables, in the case where the virtual point of view is positioned so that it overlooks vertically from the above of the vehicle to the road surface, and a road surface plane model is used. In order words, in the first example described above, each of the virtual points of view displaced in parallel needs a corresponding mapping table. However, in this example, one original mapping table is sufficient. For example, when displacing the virtual point of view for each pixel for smooth displacement of the point of view, in the first example, a large number of mapping tables corresponding to all the movement steps are required. However, in this example, moving the virtual point of view for each pixel can be realized simply by changing the start position (off_x, off_y) at which the mapping table is cut out in one wide range original mapping table. Moreover, in this example, for example, when changing the position of the virtual point of view by dialing or changing the position of the virtual point of view toward the direction of an obstacle in proportion to the magnitude of the output of the obstacle detecting sensor, the position of the virtual point of view can be changed in a large number of steps, so that a synthetic image easily can be generated in accordance with the circumstances.

In this example, the virtual point of view is displaced in parallel in a large number of steps, so that there is no need of using a large number of mapping tables. Therefore, the memory for storing the mapping tables only has to have a capacity for storing one original mapping table Furthermore, in the first example, it takes time to switch or set the mapping tables, whereas in this example, setting offset is only required. Thus, high speed processing can be achieved.

Next, the case where the synthetic image is enlarged or contracted in the same manner will be described with reference to FIGS. 27(a) to 27(g).

In FIGS. 27(a) to 27(g), the timing generating part 205 is assumed to designate the coordinates (x, y) of a pixel P1 of a synthetic image shown in FIG. 27(a). The display pattern setting part 220A designates a read-out step (step_x, step_y) of an element as well as a start position (off_x, off_y) of a region. In this case, if the coordinates of the mapping data MD corresponding to the pixel P1 is (u, v), the coordinates (u, v) can be obtained by the following equation.

$$u = \text{step\_}x * x + \text{off\_}x$$

$$v = \text{step\_}y * y + \text{off\_}y$$

The synthetic image can be enlarged or contracted smoothly by changing the value of the read-out step (step_x, step_y). When the region of the mapping table that is cut out from the original mapping table changes to MPT1, MPT2, MPT3, and MPT4 in accordance with the read-out step (step_x, step_y), the synthetic image is changed to the images shown in FIGS. 27(d), 27(e), 27(f) and 27(g).

When the coordinates (u, v) exceed the range of the original mapping table, for example, a designated color is output in the same manner as in the case of the parallel displacement described above. Values other than integers can be used as the value of the read-out step (step_x, step_y). In this case, the values of (u, v) as a result of calculation are converted to integers.

According to the method for enlargement and contraction of this example, the same synthetic image as in the case where the range of view is enlarged or contracted by changing the height or the focal length of the virtual point of view can be generated, when the virtual point of view is positioned so that it overlooks vertically from the above of the vehicle to the road surface, and a road surface plane model is used.

For example, when a part of the original image is enlarged for display in response to an instruction or of the driver or a sensor input, an enlarged image is not abruptly output, but the image is enlarged smoothly by using the method of this example. As a result, it is easily recognized as to which part of the region of the original image the enlarged image corresponds to.

Furthermore, parallel displacement as well as enlargement and contraction of an image can be realized by changing the offset value as well as changing the read-out step.

In general, there is no need of restricting the region of the mapping table to a square. In other words, the display pattern setting part 220A can designate the region of a mapping table by the coordinates of four vertices of a quadrangle.

In FIG. 28, the region of a mapping table has a shape of a convex quadrangle, and is designated by four points n1, n2, n3, and n4. In this case, the coordinates (u, v) of the mapping data MD corresponding to a pixel P1 of the coordinates (x, y) of the synthetic image can be obtained in the following manner.

First, the coordinates of a point na that divides the line segment connecting vertices n1 and n2 in a ratio of (y/H_DISP: 1−y/H_DISP) are obtained. Similarly, the coordinates of a point nb that divides the line segment connecting vertices n3 and n4 in a ratio of (y/H_DISP: 1−y/H_DISP) are obtained. Then, when the coordinates of a point that divides the line segment connecting vertices na and nb in a ratio of (x/W_DISP: 1−x/W_DISP) are obtained, they are the coordinates (u, v) of the corresponding mapping data MD.

This manner of designation makes it possible to designate regions of arbitrary mapping tables, including parallel displacement, enlargement, contraction and rotation.

According to the method of this example, a synthetic image that matches precisely with the change of the virtual point of view such as parallel displacement of the virtual point of view, enlargement and contraction of the range of view or rotation parallel to the road surface can be generated, when a road surface plane model is used, and the virtual point of view is positioned so that it overlooks vertically from the above of the vehicle to the road surface. When the model or the direction of the virtual point of view is different, it is not necessarily possible to generate a synthetic image that matches precisely with the change of the virtual point of view. However, in this case as well, it is possible to generate a synthetic image approximate to the change of the virtual point of view, so that this method is significantly advantageous.

<A Plurality Types of Image Display>

The convenience of the driver can be improved by displaying a plurality of types of synthetic images on one screen, or displaying synthetic images and camera images on one screen at the same time. For example, the driver can recognize precisely the circumstances surrounding the vehicle without switching the screen display by displaying a place near the vehicle and a place far from the vehicle at the same time; displaying images in different directions at the same time; or displaying the entire body of the vehicle and a part of the enlarged vehicle at the same time.

Such display of a plurality of types of images easily can be realized with a composite map. A "composite map" refers to a mapping table obtained by cutting out necessary portions in the single map for appropriate transformation, attaching the cut-outs, or attaching camera images to the single map. The image display described below can be realized easily with a composite map. However, with respect to image display other than that, composite maps corresponding to various driving scenes can be created by combining at least two single maps, or a single map and a camera image.

Figure 29:
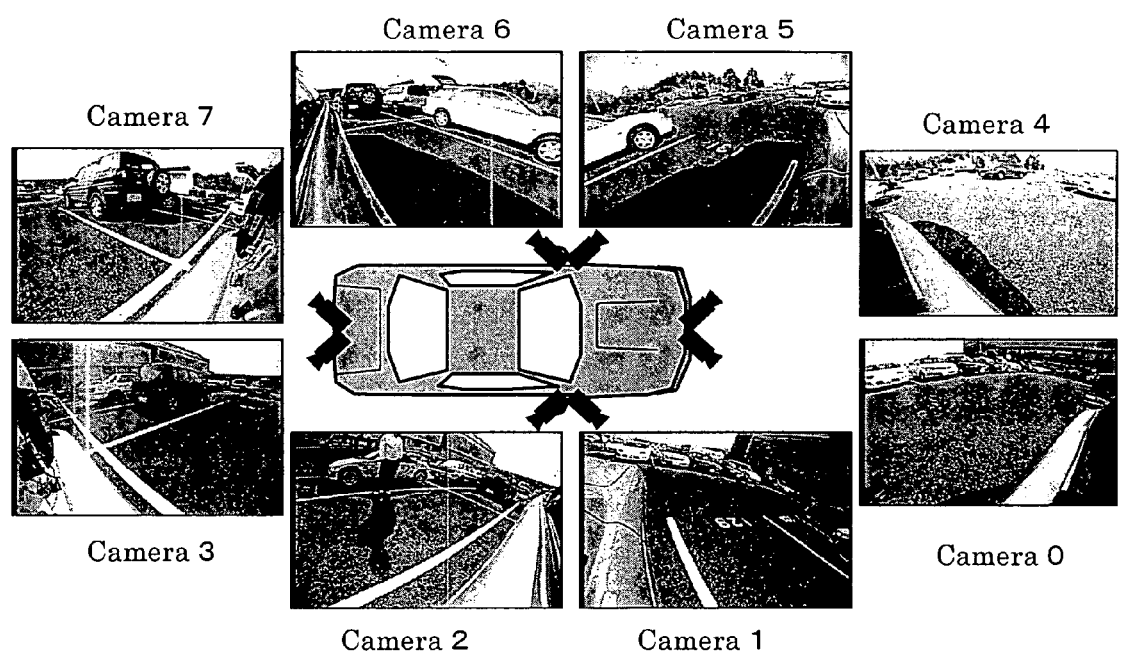
FIG. 29 is an example of camera images.

Herein, an example of displaying an image including a downward view image viewed from the virtual point of view set above the vehicle as a close view image showing the vehicle and the surroundings thereof, using a road surface plane model, and a distant view image showing areas farther than the surrounding areas of the vehicle showing this downward view image will be described. FIG. 29 shows camera images that constitute the base of the description herein.

Figure 30:
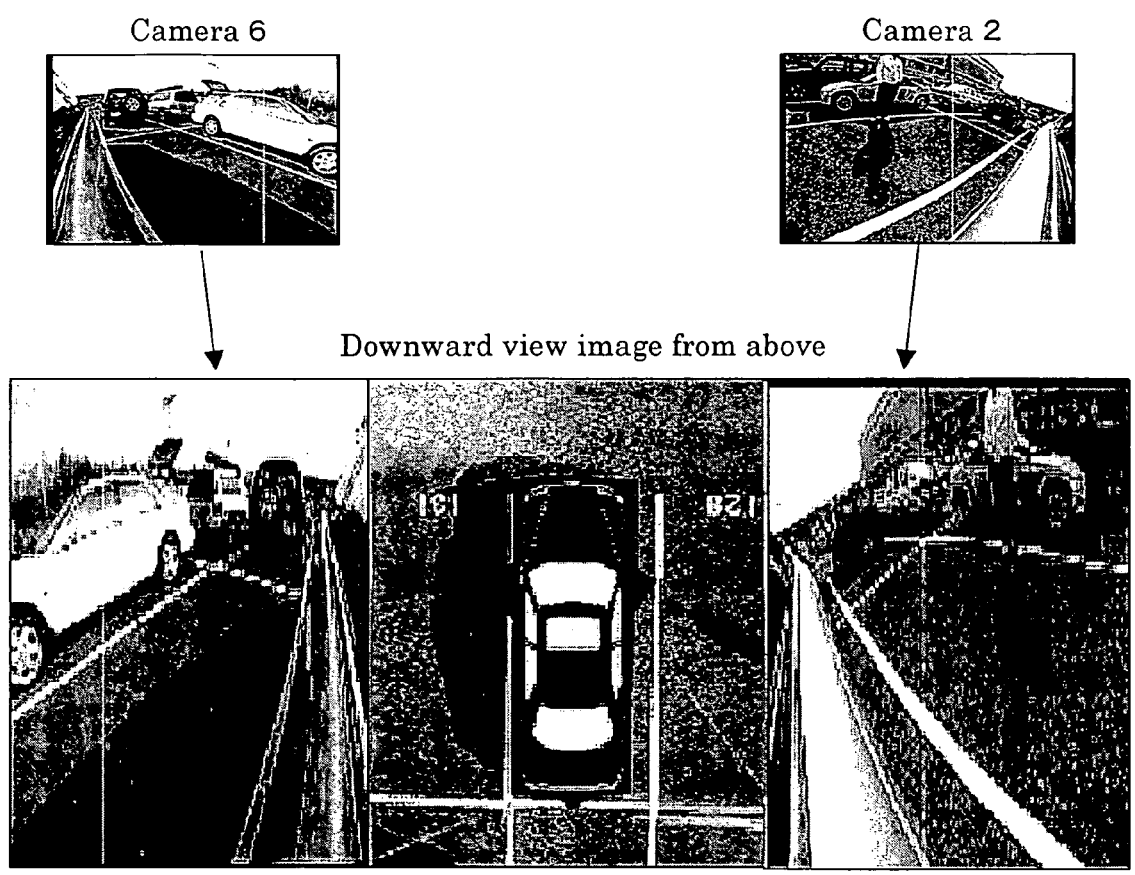
FIG. 30 is an example of a synthetic image where camera images showing an obliquely backward view is attached on the right and the left of a downward view image.

FIG. 30 is an example where camera images showing oblique backward as second images are attached on the right and the left of the downward view image as the first image. In this example, the point of view of the second image is different from the virtual point of view of the first image in the position, the direction of the line of sight and the focal length. In the image of FIG. 30, the image of a camera 2 shooting the scenery obliquely backward on the right is arranged on the right side of the downward view image with left-right reversal. The image of a camera 6 shooting the scenery obliquely backward on the left is arranged on the left side of the downward view image with left-right reversal. In other words, the images of cameras 2 and 6 installed in the vicinity of the right and left door mirrors are arranged with left-right reversal so that the images are displayed as if they were seen on the door mirrors. Therefore, the driver can grasp the circumstances surrounding the vehicle intuitionally with the same sense as looking at the door mirror. The images can be displayed without left-right reversal.

Figure 31:
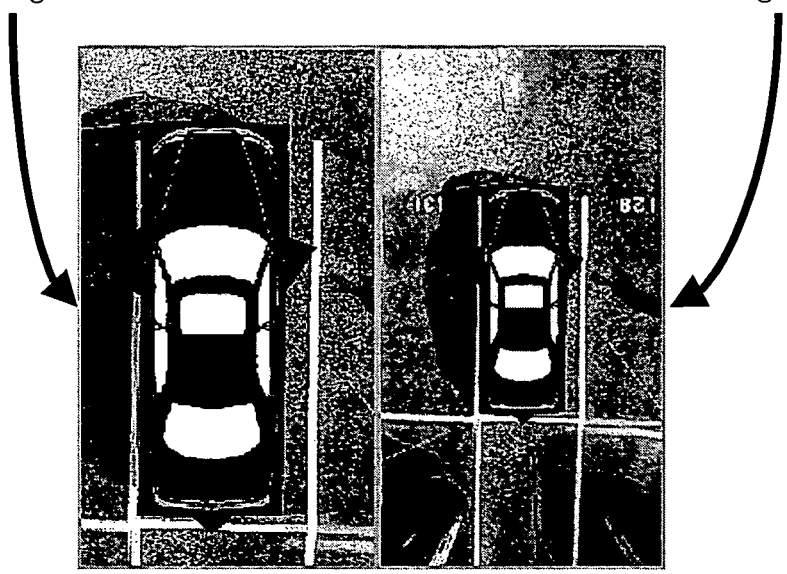
FIG. 31 is an example displaying a downward view image in a narrow range and a downward view image in a wide range side by side.

FIG. 31 is an example where a downward view image showing a narrow range as the first image and a downward view image showing a wide range as the second image are displayed side by side. In this example, the virtual point of view of the second image is different from that of the first image in the height or the focal length. The image of FIG. 31 allows immediate grasp of both a place near the vehicle in detail and a wider range in the thumbnail manner.

Figure 32:
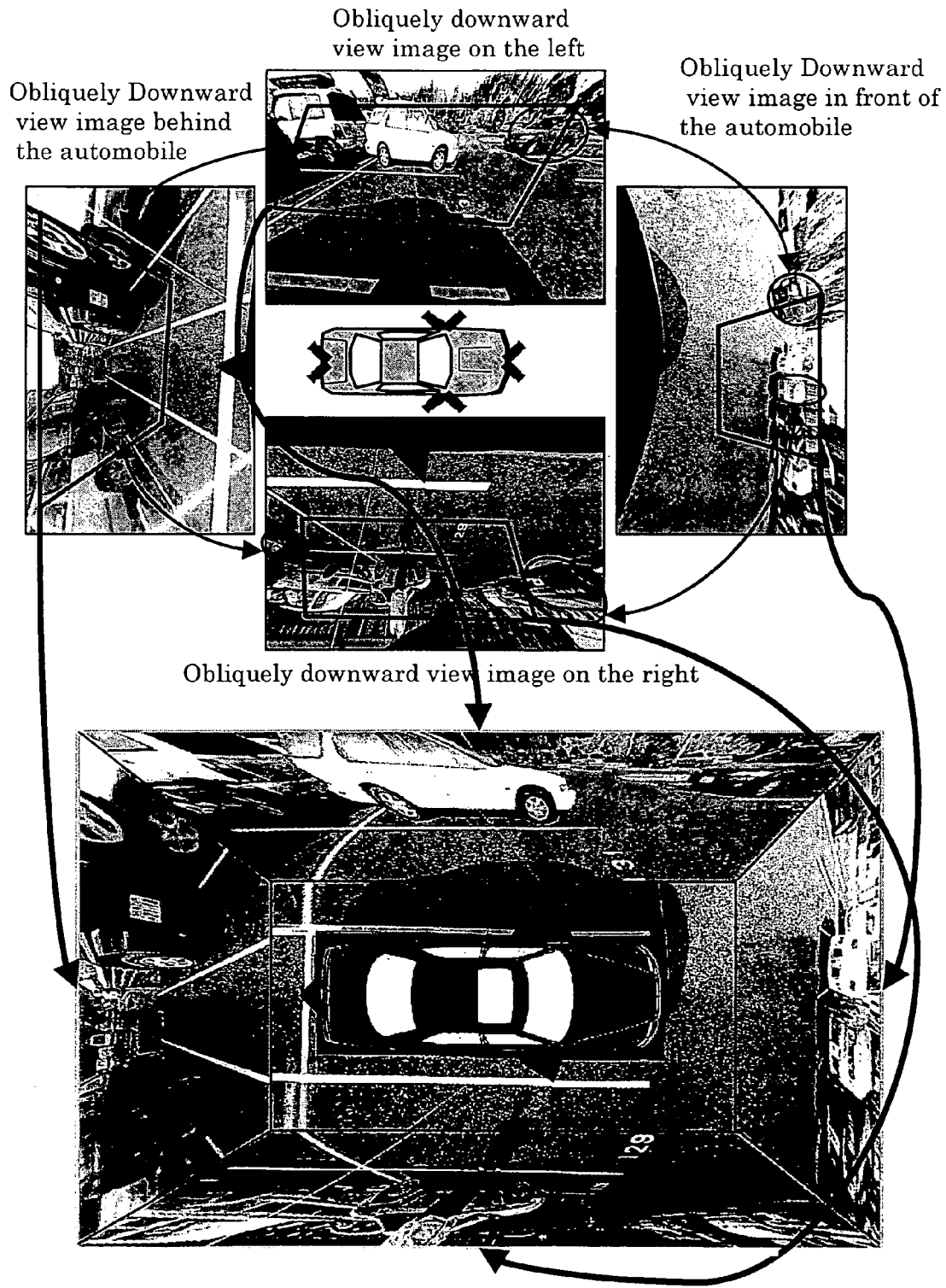
FIG. 32 is an example where obliquely downward view images are attached around the downward view image.
Figure 33:
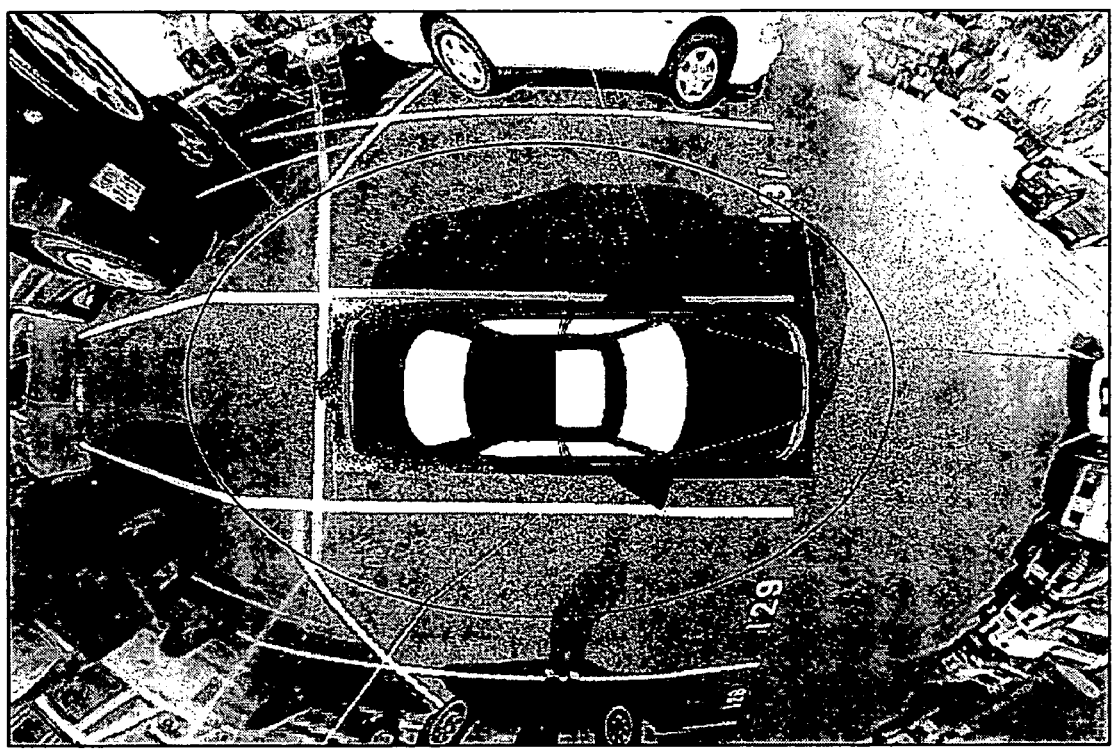
FIG. 33 is an example where an image utilizing a quasi-cylindrical model is attached around the downward view image.

FIG. 32 is an example where obliquely downward view images of the forward, the backward, the right, and the left of the vehicle as the second images are attached around the downward view image as the first image. In this example, the virtual point of view of the second image is different from that of the first image in the direction of the line of sight. FIG. 33 is an example where images that might be obtained through a fisheye lens with a quasi-cylindrical model as the second images are attached around the downward view image as the first image. In this example, the second images are different from the first image in the model. FIG. 34 is an example where panorama images of the forward, the backward, the right, and the left of the vehicle as the second images are attached around the downward view image as the first image. In this example, the second images are different from the first image in the position of the virtual point of view and the model. The images of FIGS. 32 to 34 allow the driver to grasp the distance with respect to the place near the vehicle and to look out extensively with respect to the place far from the vehicle.

It is not necessary to attach the distant view image on all the sides of the forward, backward, right and left of the downward view. A distant view image can be displayed only on the side that is desired to be seen, for example, only on the right side, or the backward.

Figure 35:
FIG. 35 is an example where obliquely downward view images are attached around the downward view image with blank portions at the four corners.

As shown in FIG. 35, when the obliquely downward view images are attached around the downward view image on the forward, backward, right and left thereof, blank portions are provided at the four corners of the display region, so that no continuity of the obliquely downward view images can be emphasized.

When image display as shown in FIGS. 32 to 35 is performed, display can be blurred by subjecting the surrounding distant images to filter processing. This allows the driver to concentrate his/her attention on the surroundings of the vehicle. Furthermore, distortion in the surrounding distant images does not stand out.

Such partial blur processing is advantageous in the case of image display with a single map as well. For example, in the case of the downward view image as shown in FIG. 5, the same effect can be obtained by performing blur processing to the surrounding areas in which other parked vehicles are displayed without performing blur processing to the vehicle and the surroundings thereof. It is preferable to set an area within 10 m from the vehicle as the region that is not subjected to blur processing. It is also possible to increase the intensity of blur with increasing the distance from the vehicle.

The image of FIG. 31 can be a synthetic image including a first image showing the surroundings of the vehicle and a second image obtained by enlarging at least a part of the region shown in the first image. The first image can show a part of the vehicle instead of the whole body of the vehicle, or can show a part of the surroundings of the vehicle.

Furthermore, the display screen can be a multiwindow display, and the synthetic image as described above, camera images, images showing the position of the virtual point of view, letter information or the like can be displayed in subwindows. This achieves easier grasp of the circumstances of the surroundings of the vehicle, and thus the convenience of the driver can be improved.

Figure 36:
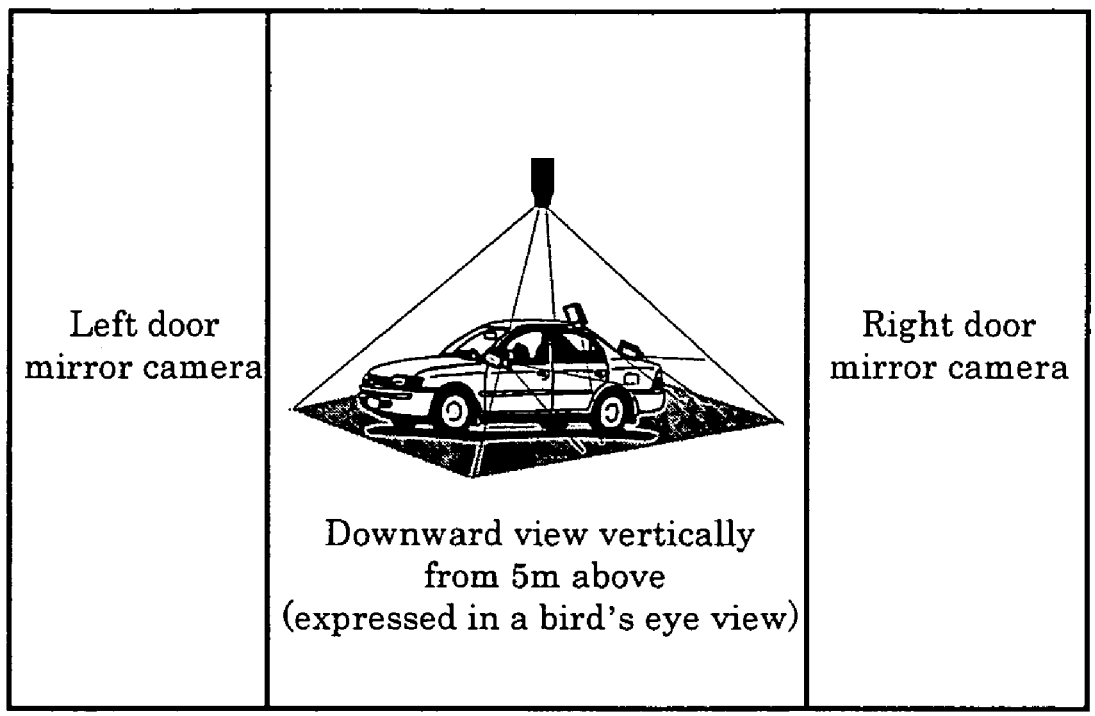
FIG. 36 is an example displaying an image showing the position of a virtual point of view together with a camera image.

There may be many methods for display on a multiscreen. For example, as shown in FIG. 36, the image showing the position of the virtual point of view can be displayed on a subwindow together with a camera image or a synthetic image. Thus, the position of the virtual point of view easily can be grasped.

Furthermore, for example, when an object detecting sensor detects an obstacle, a warning mark showing the position of the obstacle can be displayed on the camera image or the synthetic image on each subwindow. In addition, the position of the obstacle can be displayed with letters on another subwindow.

<Display of a Blind Spot Region and a Region of the Vehicle>

EXAMPLE 1

Figure 37:
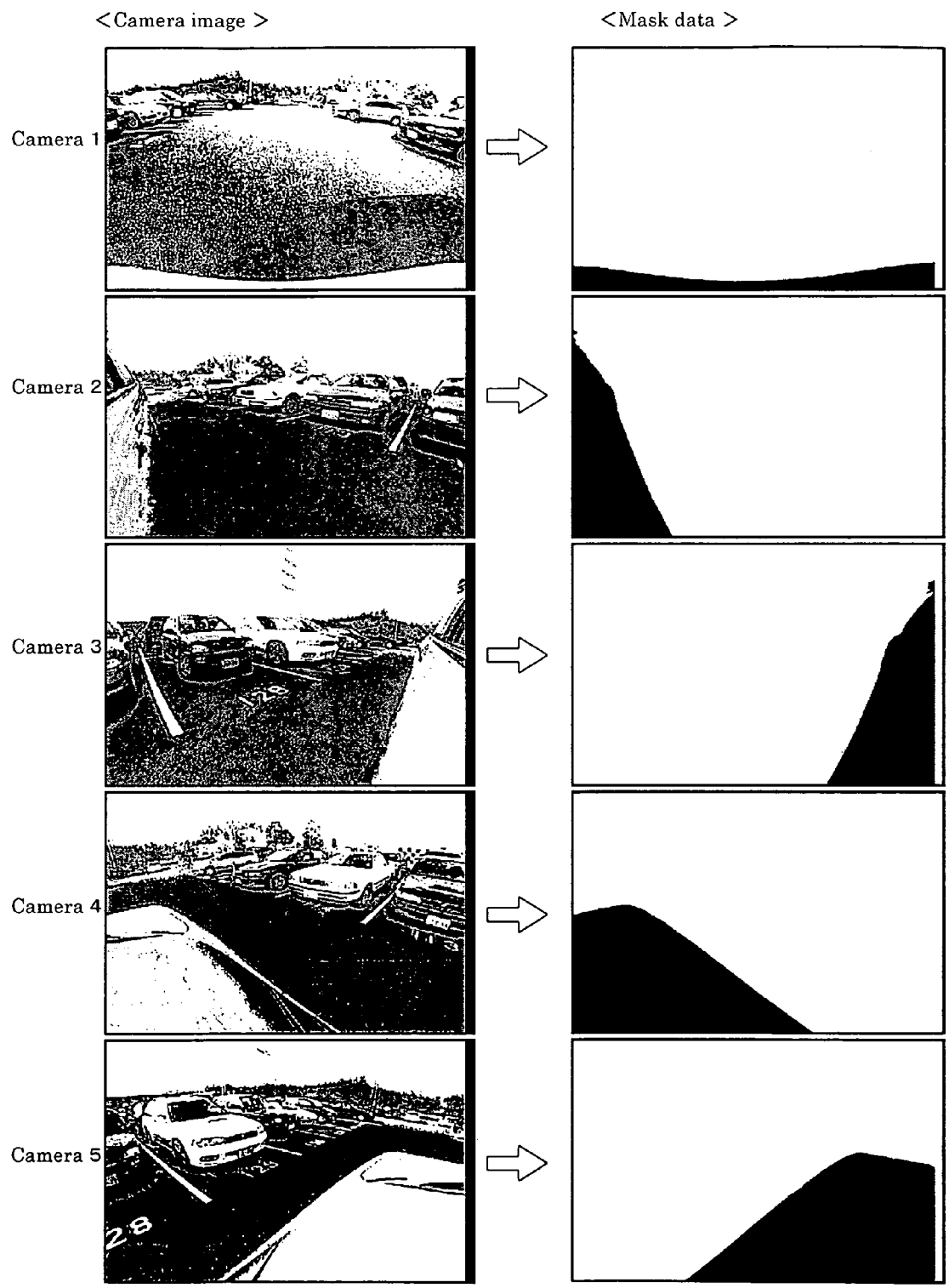
FIG. 37 shows views showing an example of camera images and mask data showing projection regions of the vehicle.

FIG. 37 is an example of mask data as region data indicating camera images and projection regions of the vehicle in the camera images. As shown in FIG. 37, the portion where the vehicle is projected in each camera image is identified and mask data showing the identified projection region of the vehicle are previously stored in the image processing part 2. The black portion in the mask data shown in FIG. 37 is the projection region of the vehicle. The projection region of the vehicle previously can be determined uniquely, if the specification and the directions of the cameras, and the shape of the vehicle are determined.

Figure 38A:
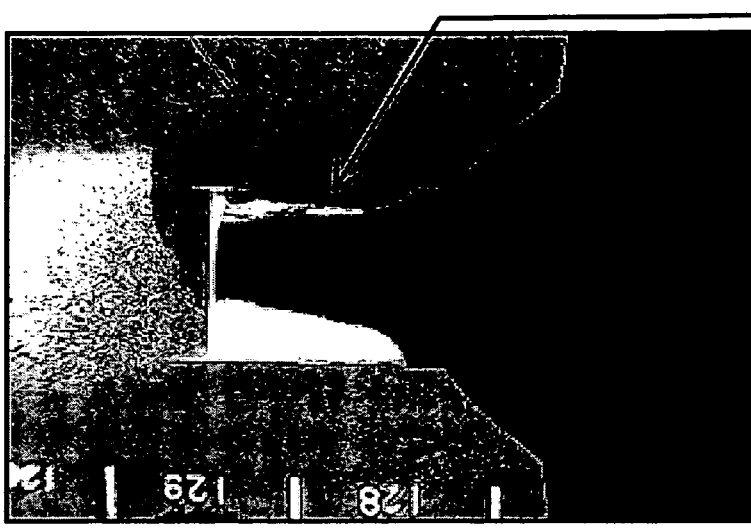
FIGS. 38(a) to 38(c) are views showing an example where an image of the vehicle is superimposed.

FIG. 38(a) is a vertically downward view image synthesized with the camera images of FIG. 37. In the synthetic image shown in FIG. 38(a), the vehicle is projected white in the center of the image, which makes the image unclear.

Figure 38B:
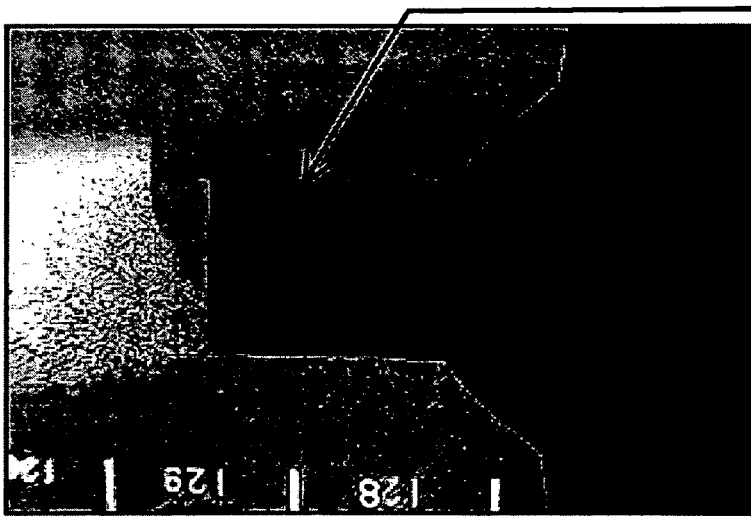

Therefore, the mask data of each camera image are converted to the images viewed from the virtual point of view, and in the synthetic image, the projection region of the vehicle is blacked out. As a result, the image as shown in FIG. 38(b) can be obtained, which makes the image better.

Figure 38C:
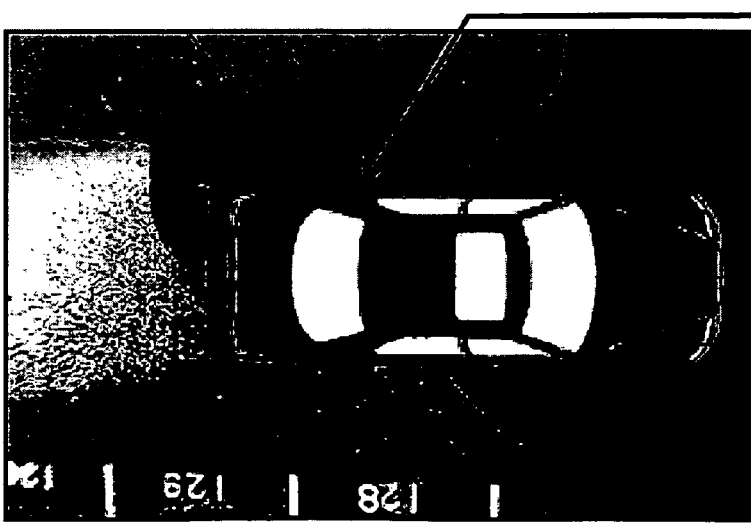

In FIG. 38(a), the vehicle is projected in the center of the image, which makes the image unclear. In addition, an actual place in which the vehicle is located is unclear. This makes driving difficult. Therefore, the illustration image or the actual image of the vehicle is superimposed on the position on which the vehicle is actually located. For example, the image processing part 2 previously stores the illustration image or the actual image of the vehicle that is presupposed to be viewed from the standard virtual point of view, and this image is converted to an image viewed from the virtual point of view of the synthetic image to be displayed. Then, the converted image can be superimposed. As a result, the image shown in FIG. 38(*c*) can be obtained, and the size of the vehicle or the position relationship relative to the objects surrounding the vehicle can be recognized at once. Conversion of the image of the vehicle easily can be realized with the above-described mapping table.

In this case, for example, the virtual point of view provided above the vehicle, the virtual point of view positioned on the side, the virtual point of view provided forward or backward of the vehicle can be used as the standard virtual point of view. Furthermore, a plurality of standard virtual points of view can be provided and an image can be prepared with respect to each of the plurality of standard virtual points of view. When the position of the virtual point of view for generating the synthetic image is determined, the standard virtual point of view that provides the smallest distortion in the image during conversion of the image may be selected based on the position relationship of the virtual point of view and each standard virtual point of view.

Instead of attaching the illustration or the actual image of the vehicle, a three-dimensional model with a surface model or a solid model that are known in the field of CAD/CAM or CG can be attached to the synthetic image. Also in this case, images showing three-dimensional models viewed from the standard virtual point of view are previously prepared, and this image is converted to an image viewed from the virtual point of view of the synthetic image to be displayed. Then, the converted image can be superimposed. This conversion easily can be realized with the above-described mapping table.

Furthermore, as the image showing the region in which the vehicle is actually located, the synthetic image generated from the camera image itself may be utilized. Furthermore, a part of the vehicle, for example, only the bumper portion may be displayed in the synthetic image, and for other portions, illustrations or actual images may be attached.

EXAMPLE 2

The synthetic image viewed from the virtual point of view may include a region that does not belong to any camera coverage, and may include a region that cannot be captured by the camera because of interruption of the vehicle.

In order to solve this problem, in Example 1 described above, the synthetic image can be more clear by assigning predetermined pixel data to the projection region of the vehicle and blacking out the region.

Figure 39:
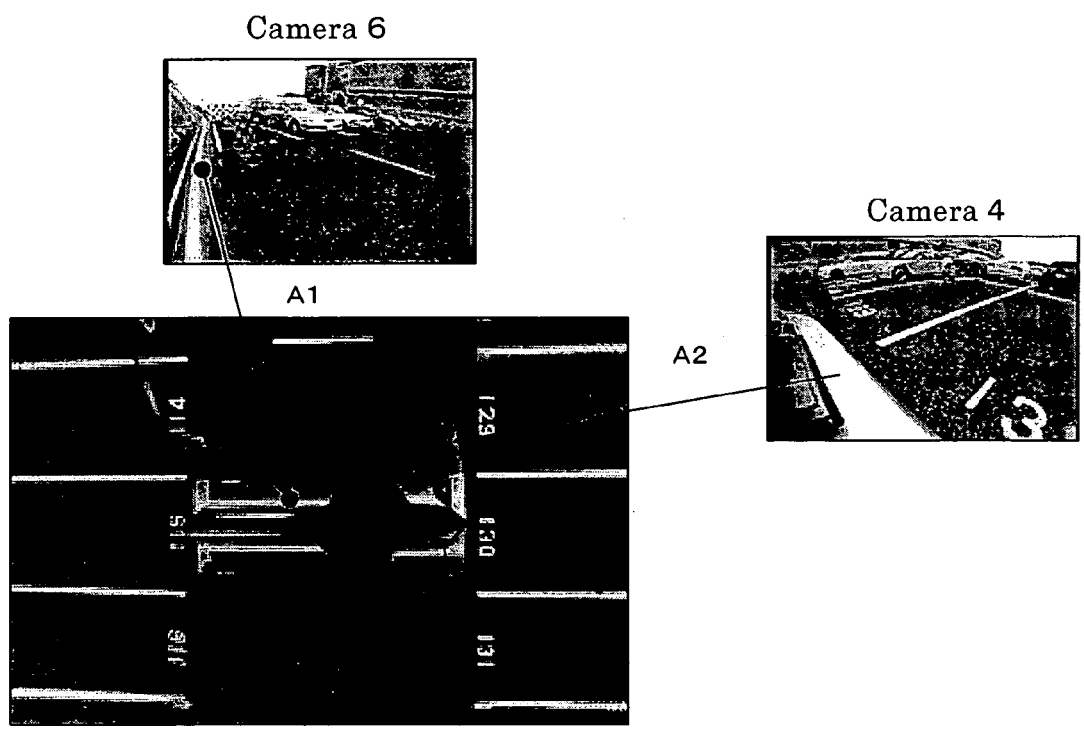
FIG. 39 shows views showing an example of synthetic images when a projection of the vehicle is converted as it is.

In this example, as shown in FIG. 39, when the camera image on which the vehicle is shown is converted to an image from the virtual point of view without any additional processing, the converted image of the vehicle is included in the synthetic image, which make the image unclear (A1). In this case, the image can be clear by blacking out the region where the vehicle is shown.

However, in the image from the virtual point of view, a part of the vehicle may be shown in a portion where the vehicle does not exist (A2). In this case, it is not preferable to black out the portion of the vehicle in the image from the virtual point of view, because the portion that should be seen is also eliminated. This problem can arise when the space model used for conversion of the original camera image to an image from the virtual point of view is different from that in the actual world that is shown on the camera (simplified in most cases). Therefore, in order to solve this problem with respect to its principle, it is necessary to calculate information on the depth of the actual world in realtime, which requires high speed operation ability in the apparatus. Therefore, it is difficult to carry this out.

Therefore, this problem can be solved by the following method.

Whether or not the pixel of the synthetic image is included in the projection region of the vehicle is determined by referring to the mask data that makes a pair with the original camera image. Generation of this pixel is switched depending on whether or not the pixel is included in the projection region of the vehicle. More specifically, the mask data is not converted to an image from the virtual point of view, but the mask data in the form of the original camera image is used.

Figure 40:
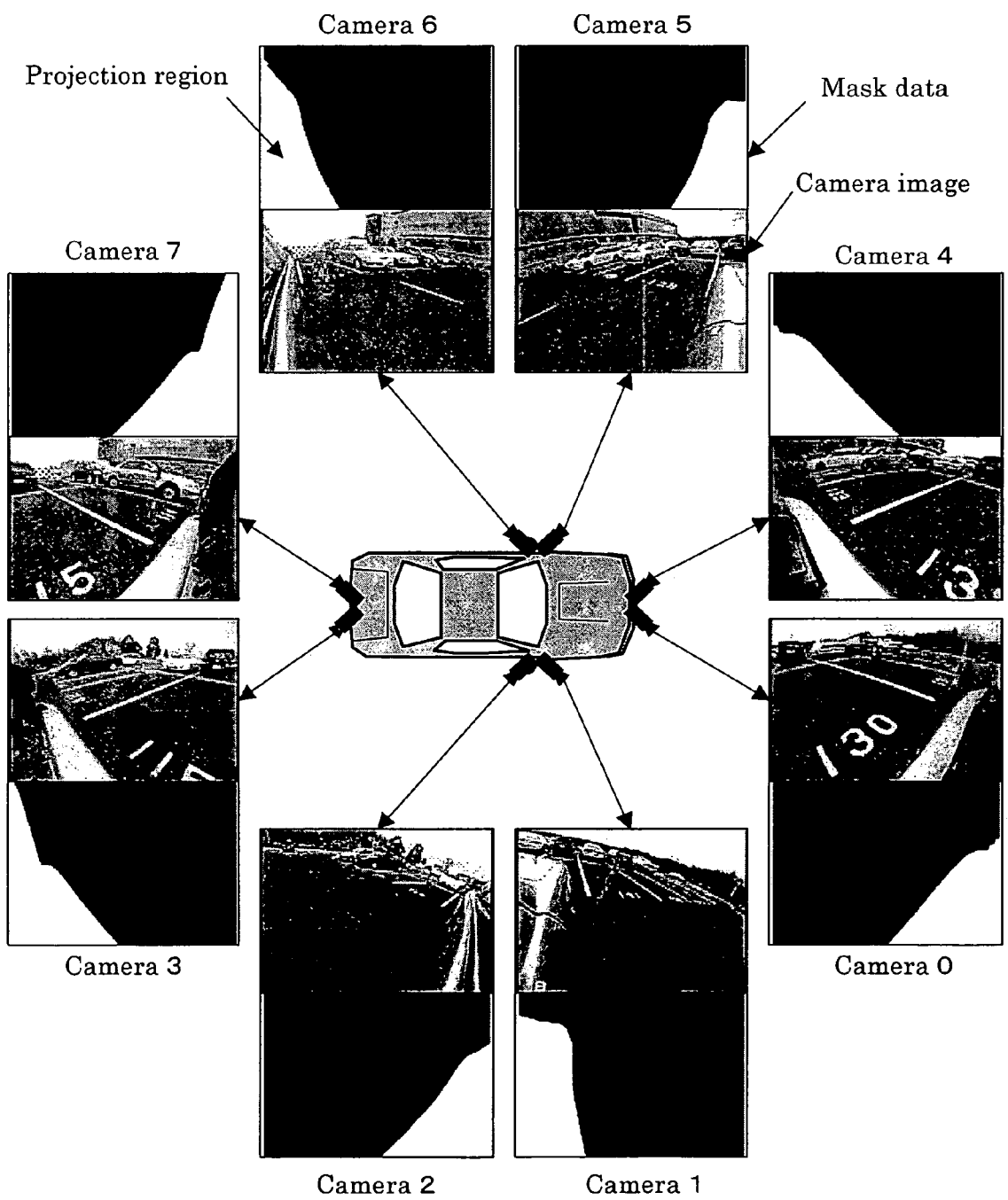
FIG. 40 shows views showing a part of the mask data.

FIG. 40 shows an example of the mask data. As shown in FIG. 40, mask data indicating a region that is not used for synthesis of an image from the virtual point of view such as the projection portion of the vehicle is provided with respect to each camera image.

In this case, for example, when the pixel data of a camera image for generation of a synthetic image is referred to, mask data corresponding to this camera image is also referred to. When the pixel is included in the projection region of the vehicle, generation of the pixel is not performed, and a process such as assigning a specific color that can indicate that the region is a blind spot region can be performed.

As the mapping data MP14 described above, the mapping table itself can have information as to whether or not the pixel of a synthetic image is included in a blind spot region. In this case, in synthesis of an image from the virtual point of view, there is no need of referring to the mask data for every frame, so that high speed processing can be realized. Furthermore, this provides the advantage that there is no need of providing a storage part for storing the mask data.

Figure 41:
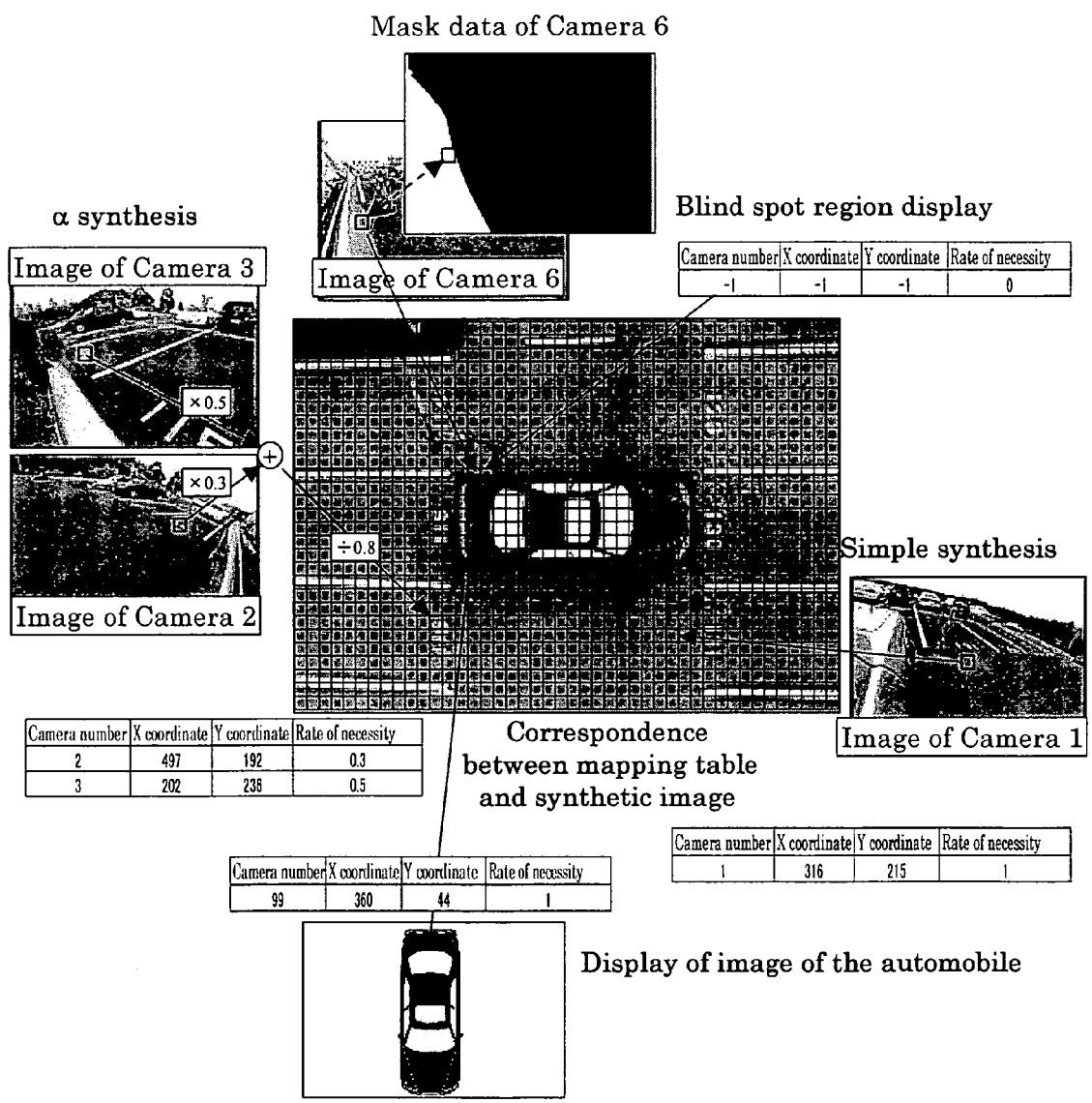
FIG. 41 is an example of a synthetic image showing a vehicle region and a blind spot region.

FIG. 41 shows an example of the results of image synthesis. In the synthetic image shown in FIG. 41, a vehicle region where the vehicle is located and a blind spot region around the vehicle are shown. Indicating the vehicle region makes it easy for the driver to grasp the position relationship or the distance between the vehicle and the circumstances of the surroundings. Furthermore, the area that is hardly seen directly from the driver's seat can be confirmed by the synthetic image. Moreover, indicating the blind spot region makes it possible for the driver to recognize the area that is not shot by any of the cameras, so that safety can be improved.

It is not necessary to indicate the entire vehicle region where the vehicle is located, and a part of the vehicle region may be indicated. For example, when the number of cameras to be installed is limited so that only the vehicle or a part thereof can be captured, only the captured part of the vehicle region and the surrounding blind spot regions are indicated. Alternatively, when a specific part around the vehicle is enlarged for display, a part of the vehicle to be displayed and the surrounding blind spot region are indicated.

Furthermore, instead of the blind spot region, an attention drawing region for drawing the attention of the driver or the passengers of the vehicle may be indicated. This attention drawing region may be a region including a blind spot region around the vehicle that is not shot by any of the cameras, or may be a region corresponding to the blind spot region itself. The attention drawing region may be a region indicating a part of the surrounding of the vehicle.

The attention drawing region can be previously set by using the position relationship with the vehicle region, regardless of the camera shooting coverage. Therefore, synthesis can be performed by simple processing. When the attention drawing region includes the blind spot region, a portion captured by a camera that is not in a blind spot region can be hidden as the attention drawing region. However, for example, the attention drawing region can be made semi-transparent for display in combination with the blind spot region.

Figure 42:
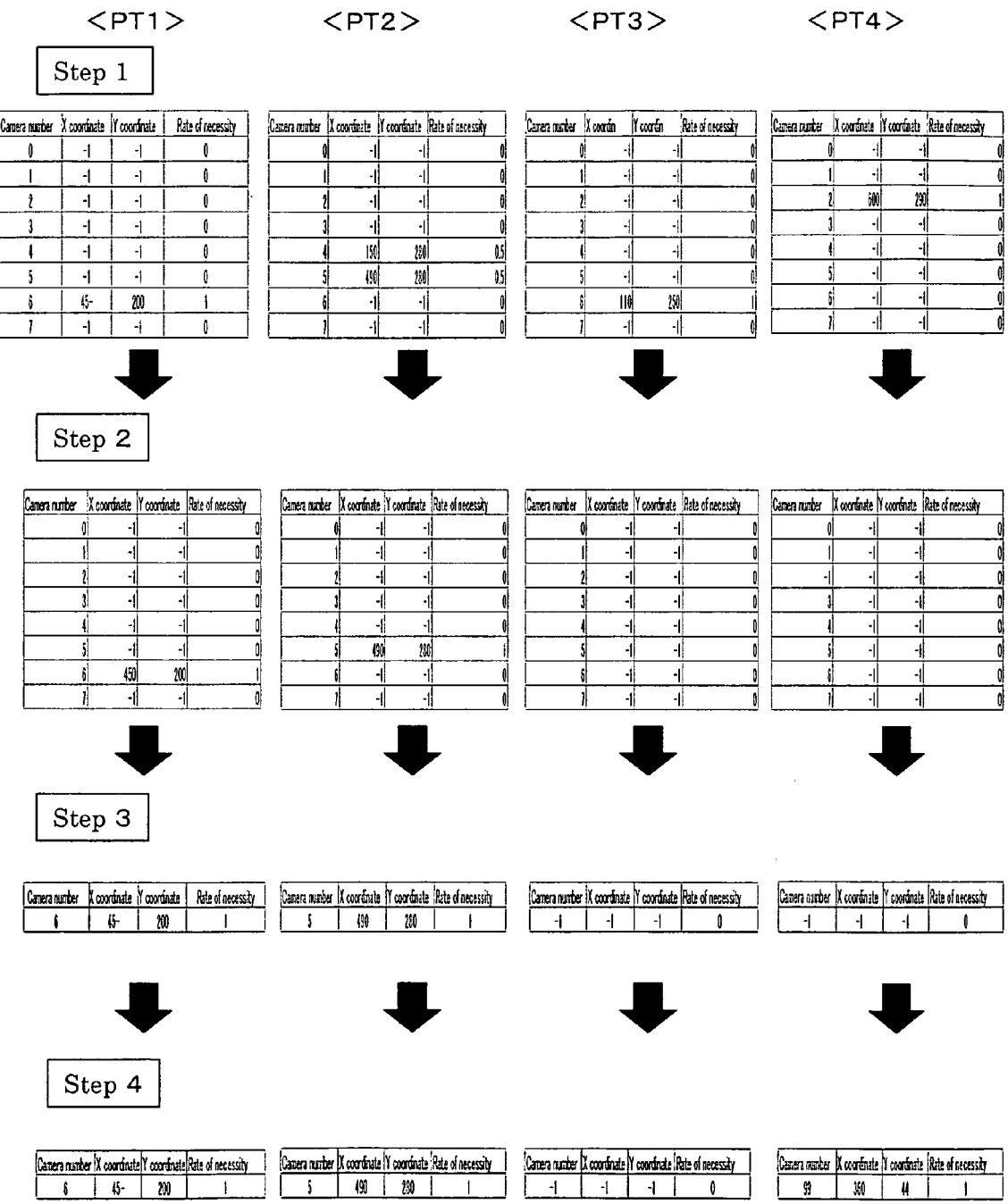
FIG. 42 is a diagram showing a procedure for generating mapping data for obtaining the blind spot region and attaching images of a vehicle.

FIG. 42 is a diagram showing the procedure of generating mapping data in the case where the blind spot region is obtained with mask data, and illustration images are attached. In FIG. 42, <PT1> is a pixel of a synthetic image that is generated from one camera image. <PT2> is a pixel of a synthetic image for which two camera images are referred to, but one of the camera images is removed for projection of the vehicle, and the synthetic image is generated from the remaining one camera. <PT3> is a pixel of a synthetic image for which one camera image is referred to, and the camera image is removed for projection of the vehicle. <PT4> is a pixel of a synthetic image for which one camera image is referred to, but the camera image is removed for projection of the vehicle, and an illustration image of the vehicle is attached.

First, in a step 1, the reference coordinates and the rate of necessity are calculated. With respect to the pixels of the synthetic image, the reference coordinates are calculated, regarding all the camera images. This calculation is performed by geometric operation, which will be described later. In this case, when the obtained reference coordinates are outside the shooting coverage of the camera image (that is, a blind spot), (−1, −1) is described as the coordinates. Also here, the number of cameras that are referred to is obtained, and the inverse of that number is assigned as the rate of necessity. The rate of necessity can be assigned in another method or assigned by manual input. In the step 1, the results show that <PT1> refers to camera 6, <PT2> refers to camera 4 and 5, <PT3> refers to camera 6, and <PT4> refers to camera 2.

Next, in a step 2, processing of the blind spot is performed by referring to the mask data indicating the projection region of the vehicle. In the mask data corresponding to cameras other than the camera whose coordinate values are (−1, −1), it is determined whether or not the point indicated by the coordinate value belongs to the projection region of the vehicle. When it belong to the projection region of the vehicle, the coordinate values are converted to (−1, −1). With this conversion, the value of the rate of necessity is calculated again when the number of cameras to be referred to is reduced.

Figure 43A:
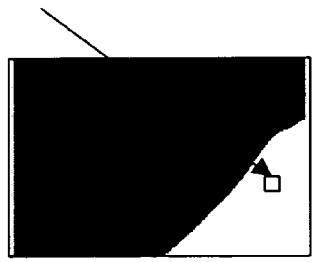
FIGS. 43(a) to 43(d) are diagrams showing the relationship between the mask data and the pixels of the synthetic images.
Figure 43B:
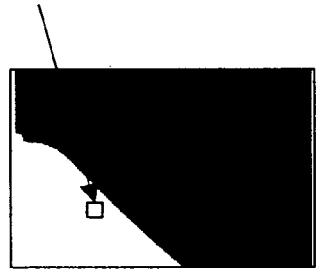
Figure 43C:
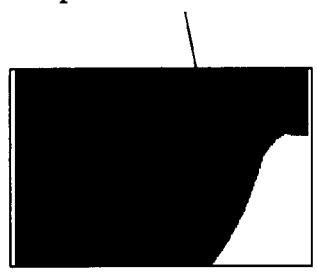
Figure 43D:
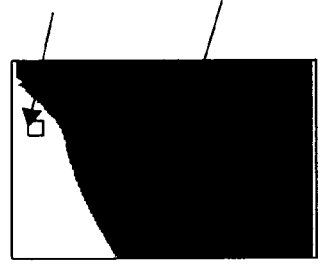

With respect to <PT1>, a point (450, 200) in the mask data of the camera 6 does not belong to the projection region of the vehicle, as shown in FIG. 43(d), so that the coordinate values are not converted. With respect to <PT2>, a point (150, 280) in the mask data of the camera 4 belongs to the projection region of the vehicle, as shown in FIG. 43(b), so that the coordinate values of the camera 4 are converted to (−1, −1). On the other hand, a point (490, 280) in the mask data of the camera 5 does not belong to the projection region of the vehicle, as shown in FIG. 43(c), so that the coordinate values of the camera 5 are not converted. Then, the rate of necessity thereof is converted to "1". With respect to <PT3>, a point (110, 250) in the mask data of the camera 6 belongs to the projection region of the vehicle, as shown in FIG. 43(d), so that the coordinate values of the camera 6 are converted to (−1, −1). With respect to <PT4>, a point (600, 290) in the mask data of the camera 2 belongs to the projection region of the vehicle, so that the coordinate values of the camera 4 are converted to (−1, −1).

Next, in a step 3, redundant data is organized to obtain the minimum necessary data for image synthesis. First, all the camera numbers having coordinate values of (−1, −1) are changed to "−1". Then, when all the camera numbers are "−1", these data are integrated to one (<PT3>, <PT4>). When camera numbers other than "−1" are present, data having a camera number of −1 are removed (<PT1>, <PT2>).

In a step 4, an illustration image of the vehicle is attached. With respect to the pixel of the synthetic image for attaching the illustration image of vehicle, the camera number of the mapping data is converted to "99", and the reference coordinates of the illustration image are set. In this example, <PT4> is the pixel for attaching the illustration image of vehicle, and therefore the camera number is converted to "99", and the coordinate values are converted to the reference coordinate values (360, 44) of the illustration image.

Figure 44A:
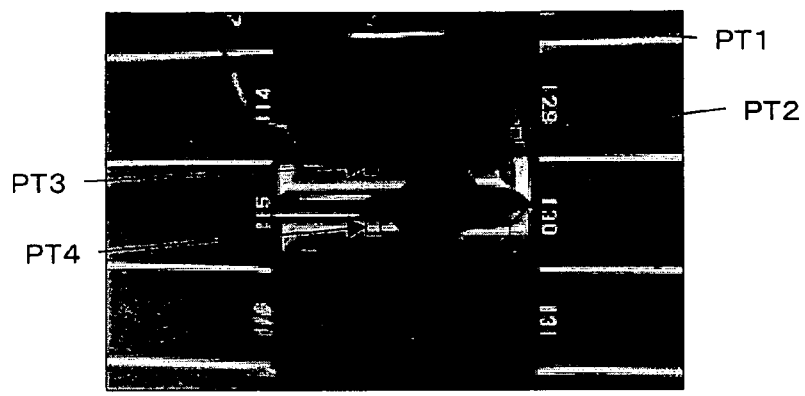
FIGS. 44(a) to 44(c) show an example of synthetic images when mapping data obtained as a result of the procedure of FIG. 42 are used.
Figure 44B:
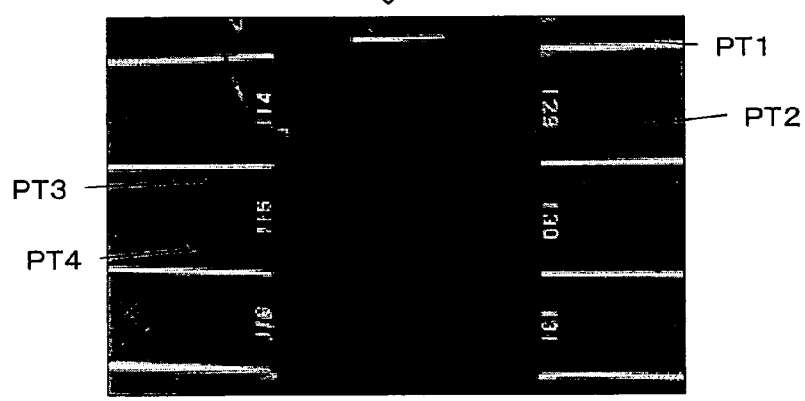
Figure 44C:
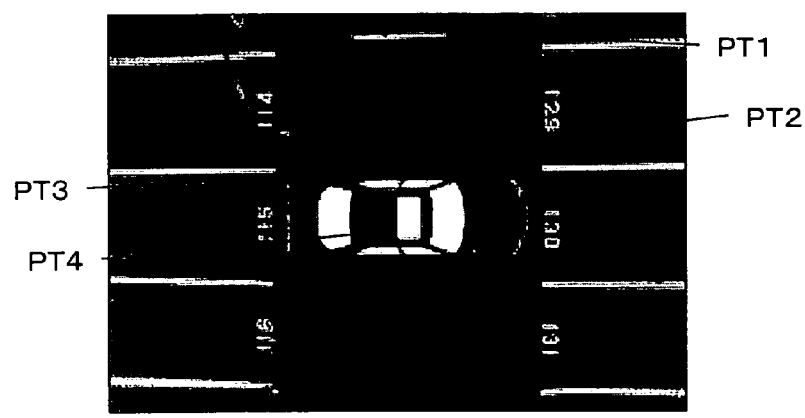

FIG. 44(a) is an example of a synthetic image in the case where the mapping data at the end of the step 1 is used. FIG. 44(b) is an example of a synthetic image in the case where the mapping data at the end of the step 3 is used. FIG. 44(c) is an example of a synthetic image in the case where the mapping data at the end of the step 4 is used.

Figure 45:
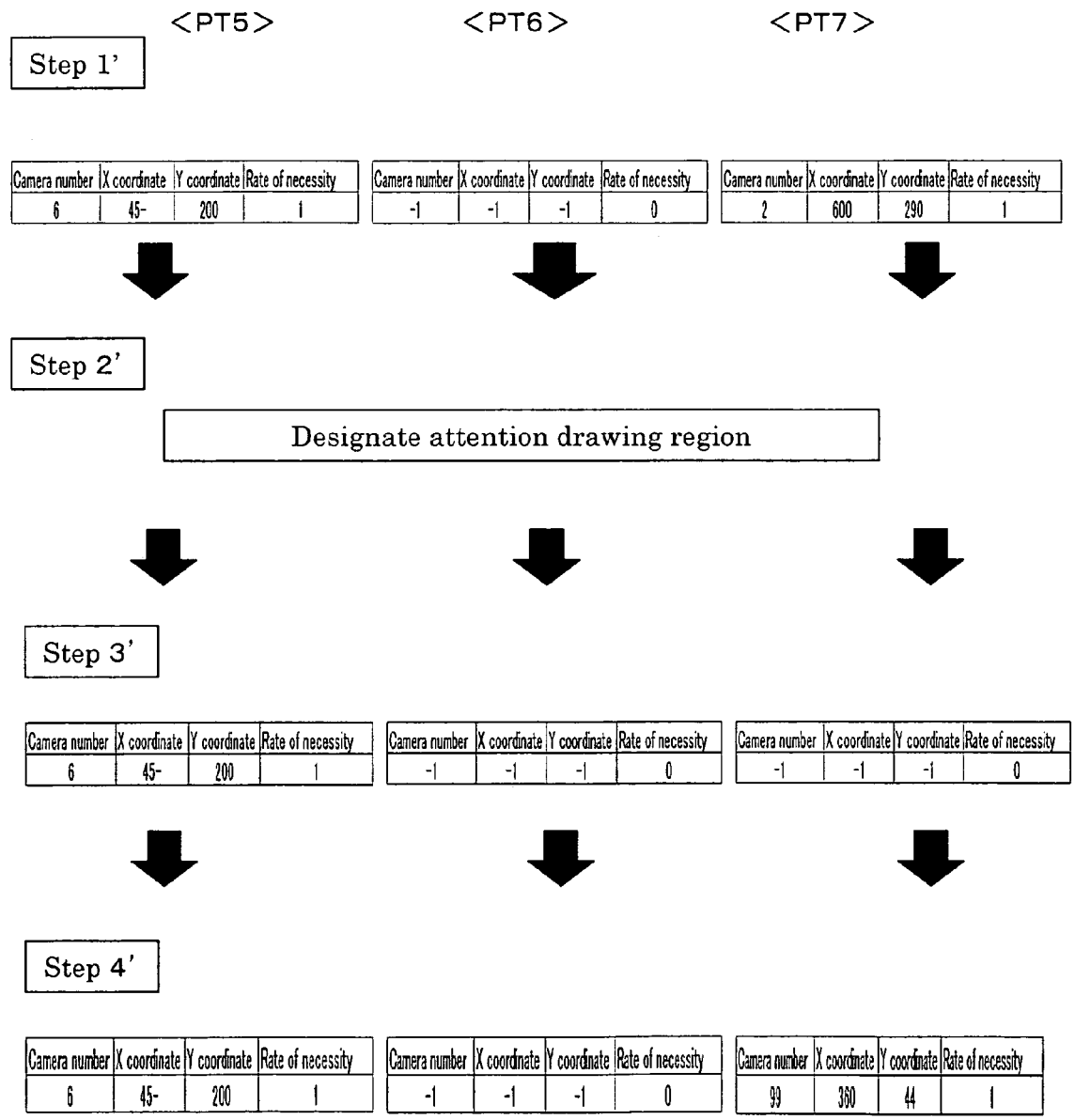
FIG. 45 is a diagram showing a procedure for generating mapping data for designating an attention drawing region.

FIG. 45 is a diagram showing a procedure of generating mapping data in the case where an attention drawing region is designated without using the mask data. In FIG. 45, <PT5> is a pixel in a synthetic image generated from one camera image. <PT6> is a pixel in a synthetic image on which an attention drawing region is designated. <PT7> is a pixel in a synthetic image on which an attention drawing region is designated, but an illustration image is attached.

First, in a step 1', an initial mapping table is generated. This is performed by the processing of the steps 1 and 3 shown in FIG. 42.

Next, in a step 2', an attention drawing region is designated. A synthetic image is created using the initial mapping table generated in the step 1', and an attention drawing region is designated in this synthetic image.

Next, in a step 3', the mapping data corresponding to the attention drawing region is rewritten. In the mapping data corresponding to the attention drawing region designated in the step 2', the camera number is converted to "−1" and the coordinates are converted to (−1, −1). Then, when the number of the cameras that are referred to is reduced, the value of the rate of necessity is calculated again.

Then, in a step 4', an illustration image of the vehicle is attached. In this example, since <PT7> is a pixel for attaching an illustration image, the camera number is converted to "99" and the coordinate values are converted to the reference coordinates value (360, 44).

Figure 46A:
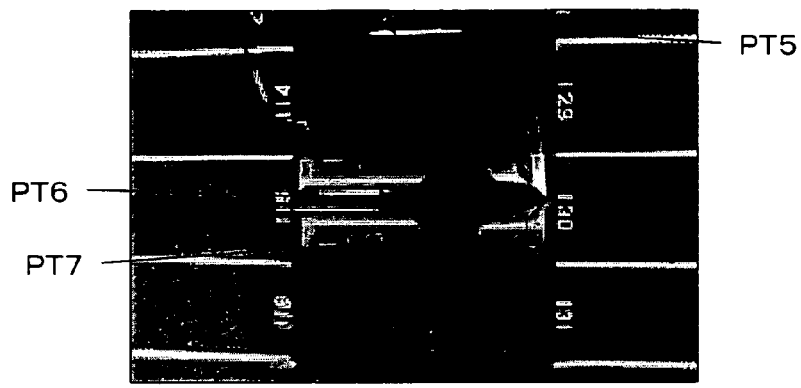
FIGS. 46(a) to 46(c) show an example of synthetic images when mapping data obtained as a result of the procedure of FIG. 45 are used.
Figure 46B:
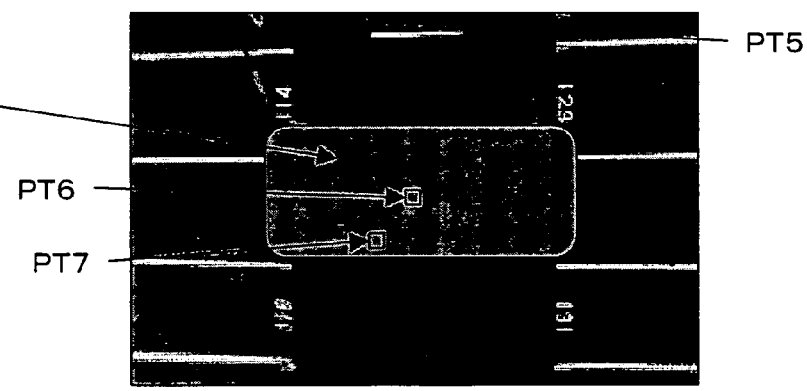
Figure 46C:
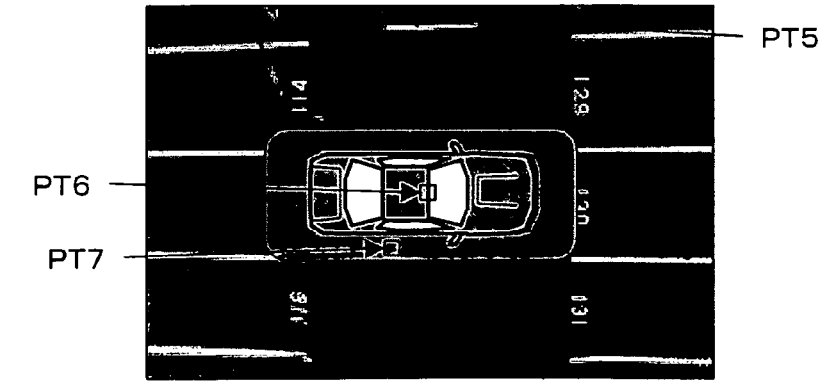

FIG. 46(a) is an example of a synthetic image in the case where the mapping data at the end of the step 1' is used. FIG. 46(b) is an example of a synthetic image in the case where the mapping data at the end of the step 3' is used. FIG. 46(c) is an example of a synthetic image in the case where the mapping data at the end of the step 4' is used.

In this manner, a process such as superimposing the image of the vehicle on the synthetic image, assigning a specific color to the entire blind spot region or the entire attention drawing region can be performed easily. When setting an attention drawing region, a predetermined attention drawing region is synthesized without referring to the mask data with respect to the cameras, so that a synthetic image can be generated more simply. On the other hand, when setting a blind spot region, the mask data with respect to the cameras are referred to, so that all the circumstances of the surroundings of the vehicle captured by the cameras can be reflected on the synthetic image.

In the above description, the monitoring system and the image processing apparatus of the present invention are applied to vehicles. However, the present invention also can be applied easily to movable bodies other than vehicles such as airplanes or ships. Moreover, the cameras can be installed in places to be monitored other than movable bodies, such as stores, houses, and showrooms.

The positions or the number of the plurality of cameras are not limited to those shown in this specification.

All or part of the functions of the image processing apparatus of the present invention may be realized with a dedicated hardware or may be realized with software. Moreover, recording media or transmission media storing programs for executing all or part of the functions of the image processing apparatus of the present invention on a computer can be utilized.

<Geometric Transformation>

In order to create a mapping table for synthetic images, it is necessary to determine the coordinates of a pixel of each camera image corresponding to each pixel of a synthetic image viewed from a virtual point of view.

For this purpose, first, a world coordinate system (Xw, Yw, Zw) corresponding to each pixel of a synthetic image from a virtual point of view is obtained. Then, the coordinates of pixels of a camera image corresponding to three-dimensional coordinates of the world coordinate system is obtained. This manner of using the two steps is convenient.

The ultimately required relationship is only a relationship between each pixel of a synthetic image from a virtual point of view and a pixel of each camera, and there is no reason for limiting to the mapping table obtained via the world coordinate system. However, the mapping table obtained via the world coordinate system clarifies the significance of the synthetic image in the world coordinate system, which is a coordinate system in the actual world, so that this is important in that the synthetic image that easily can be correlated with the circumstances of the surroundings with the actual distance or the position relationship can be generated.

The world coordinates (Xw, Yw, Zw) corresponding to the coordinates (Vxe, Vye, Vze) of the point of view of the synthetic image can be obtained by Equation (1):

$$\begin{pmatrix} X_w \\ Y_w \\ Z_w \end{pmatrix} = R_v \begin{pmatrix} Vx_e \\ Vy_e \\ Vz_e \end{pmatrix} + T_v \quad (1)$$

$$\text{where } R_v = \begin{pmatrix} r_{v11} & r_{v12} & r_{v13} \\ r_{v21} & r_{v22} & r_{v23} \\ r_{v31} & r_{v32} & r_{v33} \end{pmatrix} T_v = \begin{pmatrix} T_{xv} \\ T_{yv} \\ T_{zv} \end{pmatrix}$$

where as the parameters indicating the position and the direction of a virtual point of view, the coordinates in the world coordinate system of the point of view is represented by the position vector Tv=(Txv, Tyv, Tzv), and the direction of the line of sight is indicated by a rotating matrix Rv having three rows and three columns indicating rotation to match the view plane coordinate system to the orientation of the world coordinate system.

Figure 47:
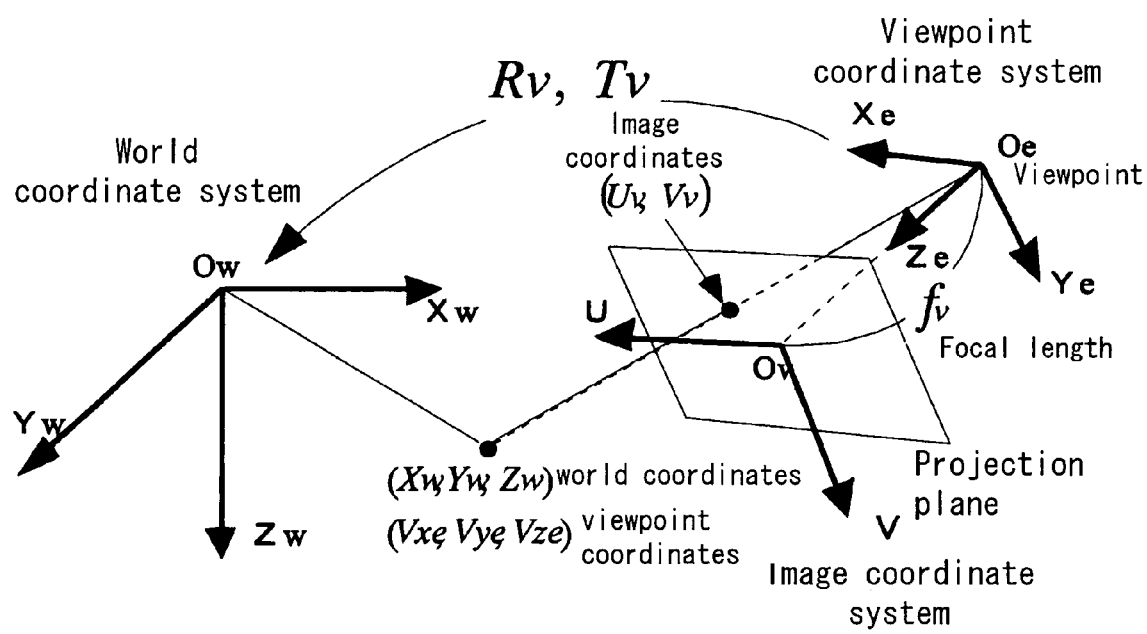
FIG. 47 is a diagram for illustrating geometric transformation.

FIG. 47 is a schematic view illustrating the relationship between the viewpoint coordinate system and the world coordinate system.

Figure 48:
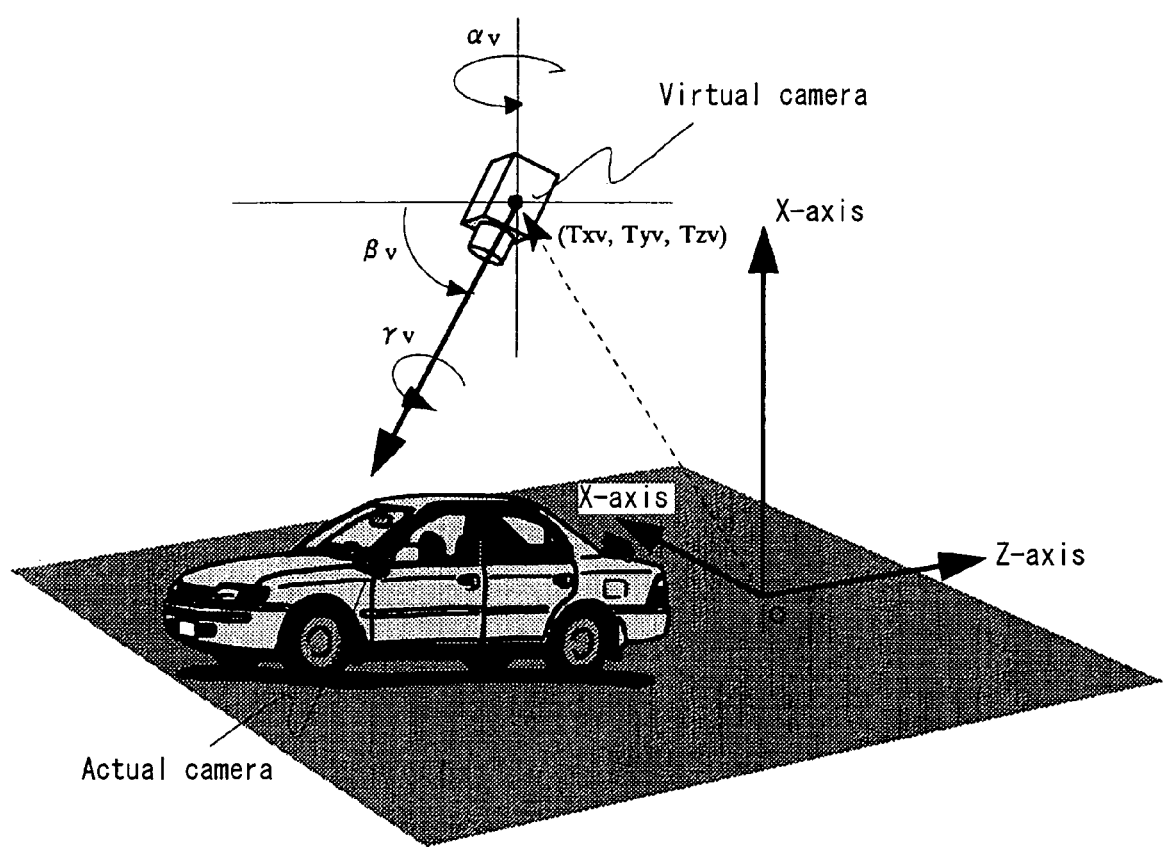
FIG. 48 is a diagram for illustrating geometric transformation.

As shown in FIG. 48, the rotating matrix Rv is as follows:

$$R_v = \begin{bmatrix} \cos\alpha_v & 0 & -\sin\alpha_v \\ 0 & 1 & 0 \\ \sin\alpha_v & 0 & \cos\alpha_v \end{bmatrix} \begin{bmatrix} 1 & 0 & 0 \\ 0 & \cos\beta_v & -\sin\beta_v \\ 0 & \sin\beta_v & \cos\beta_v \end{bmatrix} \begin{bmatrix} \cos\gamma_v & \sin\gamma_v & 0 \\ -\sin\gamma_v & \cos\gamma_v & 0 \\ 0 & 0 & 1 \end{bmatrix} \quad (2)$$

where the angle of horizontal rotation (azimuth) of the line of sight with respect to the Y-Z plane of the world coordinate system is αv, the inclination angle (elevation angle) of the line of sight with respect to the X-Z plane is βv, and the rotation (twist) around the optical axis of the camera is γv.

On the other hand, the relationship between the Vxe and Vye of the viewpoint coordinate system (Vxe, Vye, Vze) of the virtual point of view and the two-dimensional coordinate Uv and Vv on the projection plane can be represented by Equation (3) using the focal length fv from perspective projection transformation.

$$u_v = \frac{f_v}{V_{Ze}} V_{xe} \quad (3)$$

$$v_v = \frac{f_v}{V_{Ze}} y_{ye}$$

The focal length may be represented by the unit of mm or inch corresponding to the size, assuming that the projection plane is a film or a CCD, or may be represented by the pixels corresponding to the size of the synthetic image. In this example, the projection plane is normalized to have a width of 2 and a height of 2 with the projection center as its center, and the focal length corresponding thereto is used.

Therefore, as for the relationship between the coordinates on the projection plane and the pixels of the synthetic image, if the horizontal width of the image is Wv pixels, and the vertical width is Hv pixels, the coordinates (Uv, Vv) on the projection plane corresponding to the pixel positioned (Sv, Tv) from the upper right of the image can be obtained by:

$$Uv=2\times Sv/Wv-1$$

$$Vv=2\times Tv/Hv-1 \quad (4)$$

As a result, the three-dimensional coordinates (Xw, Yw, Zw) of the world coordinate system corresponding to an arbitrary pixel (Sv, Tv) of the synthetic image can be obtained from Equations (1) to (4), the position of the camera Txv, Tyv, Tzv, the direction of the camera αv, βv, γv, and the focal length fv by Equation (5).

$$\begin{pmatrix} x_w \\ y_w \\ z_w \end{pmatrix} = R_v \begin{pmatrix} \frac{V_{ze}}{f_v} u_v \\ \frac{V_{ze}}{f_v} v_v \\ V_{ze} \end{pmatrix} + \quad (5)$$

-continued $$T_v = \begin{pmatrix} \left(\dfrac{2S_v - W_v}{f_v \cdot W_v} r_{v11} + \dfrac{2T_v - H_v}{f_v \cdot H_v} r_{v12} + r_{v13}\right) V_{ze} + T_{xv} \\ \left(\dfrac{2S_v - W_v}{f_v \cdot W_v} r_{v21} + \dfrac{2T_v - H_v}{f_v \cdot H_v} r_{v22} + r_{v13}\right) V_{ze} + T_{yv} \\ \left(\dfrac{2S_v - W_v}{f_v \cdot W_v} r_{v31} + \dfrac{2T_v - H_v}{f_v \cdot H_v} r_{v32} + r_{v33}\right) V_{ze} + T_{zv} \end{pmatrix}$$

However, in Equation (5), the depth Vze corresponding to the coordinates (Sv, Tv) of the synthetic image is undetermined. In other words, it is necessary to determine the depth value from each pixel to the object to be captured in the synthetic image.

If the three-dimensional shape of the object viewed from the virtual point of view can be known, the depth of each pixel can be obtained. However, this is difficult in general. Therefore, a model for the shape of the object viewed from the virtual point of view is assumed to obtain Vze, and the relationship between the coordinates of the synthetic image and the three-dimensional coordinates of the world coordinate system is obtained.

-Road Surface Plane Model-

As one example thereof, the case where an object is on the road surface plane in contact with the vehicle will be described.

If it is assumed that all objects are present on a plane (road surface) of the world coordinate system, the three-dimensional coordinates (Xw, Yw, Zw) of the world coordinate system satisfies the following equation of a plane.

$$ax_w + by_w + cz_w + d = 0 \qquad (6)$$

Therefore, Vze can be obtained by substituting Equation (6) in Equation (5) as follows.

$$V_{ze} = -f_v \frac{aT_{xv} + bT_{yv} + cT_{zv} + d}{aQ_1 + bQ_2 + cQ_3} \qquad (7)$$

where $Q_1 = r_{v11}\dfrac{2S_v - W_v}{W_v} + r_{v12}\dfrac{2T_v - H_v}{H_v} + r_{v13}f_v$ $Q_2 = r_{v21}\dfrac{2S_v - W_v}{W_v} + r_{v22}\dfrac{2T_v - H_v}{H_v} + r_{v23}f_v$ $Q_3 = r_{v31}\dfrac{2S_v - W_v}{W_v} + r_{v32}\dfrac{2T_v - H_v}{H_v} + r_{v33}f_v$ Therefore, from the coordinates (Sv, Tv) of the pixel of the synthetic image from the virtual point of view, the corresponding three-dimensional coordinates (Xw, Yw, Zw) of a plane of the world coordinate system can be obtained by substituting Equation (7) in Equation (5).

The coordinates of each pixel of each camera image corresponding to the three-dimensional coordinate system (Xw, Yw, Zw) in the world coordinate system can be obtained by substituting the parameters of Tx, Ty, Tz, α, β, and γ corresponding to the position and the direction of each camera in the relative equation similar to Equation (1).

For example, if the position of the camera 1 is Tx1, Ty1, and Tz1, and the direction thereof is α1, β1, and γ1, the camera coordinate system Xe1, Ye1, and Ze1 of the camera 1 corresponding to the pixel (Sv, Tv) of the synthetic image can be calculated with Equation (8).

$$\begin{pmatrix} X_{e1} \\ Y_{e1} \\ Z_{e1} \end{pmatrix} = R_1^{-1}\left(\begin{bmatrix} X_w \\ Y_w \\ Z_w \end{bmatrix} - \begin{bmatrix} T_{x1} \\ T_{y1} \\ T_{z1} \end{bmatrix}\right) \text{ where,} \qquad (8)$$

$$R_1^{-1} = \begin{bmatrix} \cos\gamma_1 & -\sin\gamma_1 & 0 \\ \sin\gamma_1 & \cos\gamma_1 & 0 \\ 0 & 0 & 1 \end{bmatrix}\begin{bmatrix} 1 & 0 & 0 \\ 0 & \cos\beta_1 & \sin\beta_1 \\ 0 & -\sin\beta_1 & \cos\beta_1 \end{bmatrix}\begin{bmatrix} \cos\alpha_1 & 0 & \sin\alpha_1 \\ 0 & 1 & 0 \\ -\sin\alpha_1 & 0 & \cos\alpha_1 \end{bmatrix}$$

The relationship between this camera coordinate system and the coordinate system (U1, V1) of the camera image can be calculated with Equation (3) as follows.

$$U1 = f1/Ze1 \times Xe1$$

$$V1 = f1/Ze1 \times Ye1 \qquad (9)$$

where the focal length of the camera 1 is f1. The pixel of the corresponding camera image can be calculated with Equation (10), assuming that the size of the camera image is H1 pixels in the vertical length and W1 pixels in the horizontal width, the aspect ratio is 1:1, and the center of the camera is the center of the image.

$$S1 = W1/2 \times (Uv + 1)$$

$$T1 = H1/2 \times (Vv + 1) \qquad (10)$$

With the above procedure, the pixel (S1, T1) of the image of the camera 1 corresponding to the pixel (Sv, Tv) of the image from the virtual point of view can be obtained. The pixel coordinates (Sn, Tn) corresponding to (Sv, Tv) with respect to a general camera n other than the camera 1 can be calculated in the same manner. In the parameter table, the camera number n and its coordinates (Sn, Tn) are written by selecting one or a plurality of optimal coordinates among them, depending on various conditions, for example, whether or not (Sn, Tn) is within the range of an actual camera image, or whether or not enlargement ratio or contraction ratio of the pixel is large or the like.

-Cylindrical Model-

In the above-described road surface model, an object located above the horizon on a camera image is never on the plane of the road surface, even if the plane of the road surface is extended infinitely, so that the object cannot be viewed from the virtual point of view.

Figure 49:
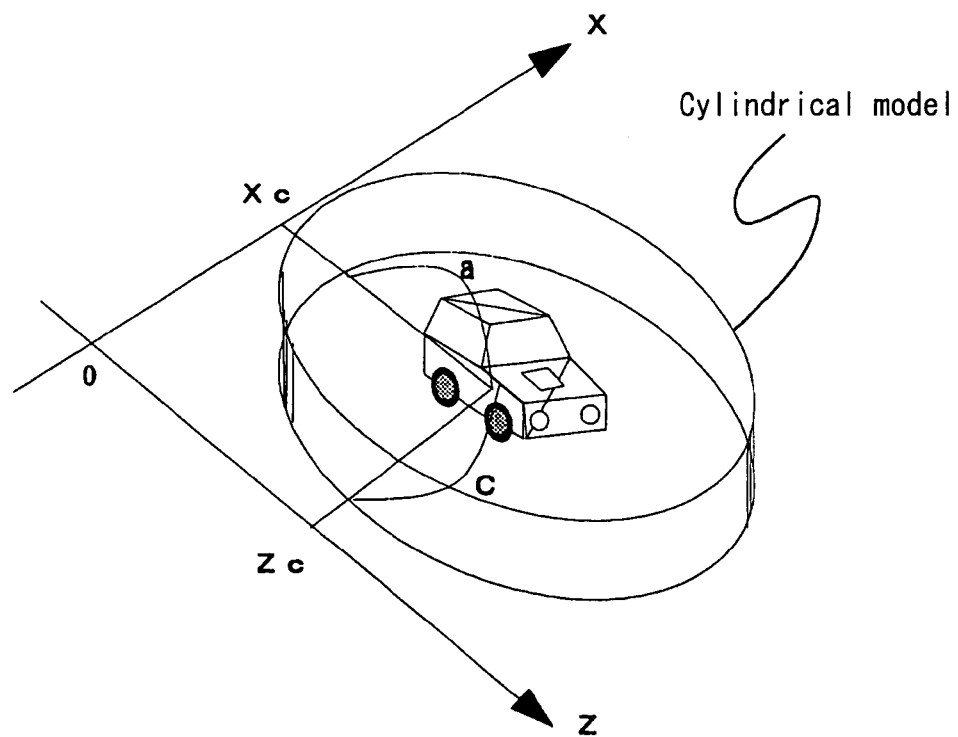
FIG. 49 is a diagram for illustrating geometric transformation.

In order to reflect this object on the synthetic image from the virtual point of view, a cylindrical model as shown in FIG. 49 is used as a three-dimensional shape of the object. This model is advantageous, for example, when the direction of the virtual point of view is nearly parallel to the road surface.

For simplicity, a cylindrical model having its axes in the X-axis and the Z-axis is used. This model is represented by Equation (11) with (Xc, Zc) as the center of an elliptic cylinder, using a parameter (a, c) of the ellipse. This also easily applies to models having their axes in the axes other than the X-axis and the Z-axis by rotation on the XZ plane.

$$\frac{(Xw - Xc)^2}{a^2} + \frac{(Zw - Zc)^2}{c^2} = 1 \qquad (11)$$

The three-dimensional coordinates (Xw, Yw, Zw) of the world coordinate system corresponding to the coordinates (Sv, Tv) of the synthetic image from the virtual point of view can be obtained by eliminating Vze from Equation (5) using Equation (11). From these coordinates, as in the case of the road surface plane model, the pixel corresponding to each camera image is calculated, so that the relationship between the pixel (Sv, Tv) of the image from the virtual point of view and the pixel (Sn, Tn) of the camera image is obtained and the mapping table is created.

Furthermore, a combination of the road surface plane model and the cylindrical model is possible. First, the three-dimensional coordinates of the world coordinate are obtained with the road surface plane model. When the three-dimensional coordinates are outside the cylindrical model, or are not intersected with the plane, so that there is no solution, then the three-dimensional coordinates are obtained with the cylindrical model. Thus, synthesis can be performed in combination of the road surface plane model and the cylindrical model.

-Quasi-Cylindrical Model-

Figure 50:
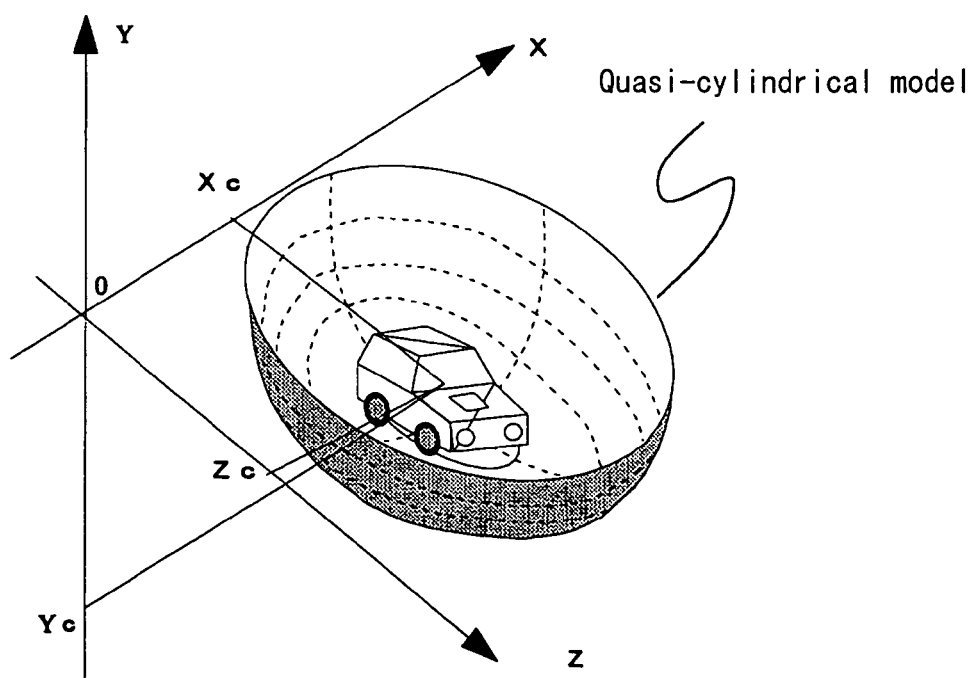
FIG. 50 is a diagram for illustrating geometric transformation.

In order to facilitate grasp of the circumstances in distant places in the periphery of the road surface plane model, a bowl-shaped quasi-cylindrical model is introduced in the periphery. FIG. 50 shows the shape of the model. The portion of a distant place is compressed for synthesis so that a wider range can be displayed. The shape of this quasi-cylinder is represented by Equation (12).

$$\frac{(Xw-Xc)^2}{a^2} + \frac{(Yw-Yc)^2}{b^2} + \frac{(Zw-Zc)^2}{c^2} = 1 \tag{12}$$

The center of the bowl is (Xc, Yc, Zc), and it has a length of (a, b, c) in the X-axis, the Y-axis and the Z-axis directions. As in the above cylindrical model, the three-dimensional coordinates (Xw, Yw, Zw) of the world coordinate system corresponding to the coordinates of the synthetic image from the virtual point of view are calculated, and the relationship between each pixel of the synthetic image and the pixel of each camera image can be obtained.

As in the case of the cylindrical model, a composite model in a combination with the road surface plane model can be used for synthesis.

-Processing for Lens Distortion Correction-

Next, a method for correcting lens distortion by the mapping table will be described. When there is distortion due to lens distortion in actual camera images, the pixel coordinates corrected with respect to this distortion are calculated when an actual pixel (S1, T1) is obtained from Uv and Vv as described above. Thus, the effect of lens distortion can be removed from the synthetic image. This distortion correction is incorporated into the relationship between the synthetic image (Sv, Tv) of the mapping table and the camera image (Sn, Tn). Therefore, if the mapping table corrected with respect to distortion is created first, at the actual synthesis, calculation for correction is not required. Also when distortion is not formalized, for example, in the case of the function of the distance from the lens center that is used for conventional lens distortion correction, distortion correction can be achieved, provided that a pattern of lattice or the like is imaged and information on how each pixel moves because of lens distortion is obtained.

The invention claimed is:

1. An image processing apparatus provided with a vehicle, said image processing apparatus comprising:
an image processing part operable to receive images captured by a plurality of cameras shooting surroundings of the vehicle and operable to generate a synthetic image using the received images captured by the plurality of cameras, the synthetic image including the vehicle and its surroundings arranged in a manner as looked down from a virtual viewpoint,
wherein the image processing part changes at least one selected from a position of the virtual viewpoint, a direction of a line of sight, and a focal length of the synthetic image in accordance with a running state of the vehicle.

2. The image processing apparatus of claim 1, wherein the image processing part changes at least one selected from a position of the virtual viewpoint, a direction of a line of sight, and a focal length of the synthetic image in accordance with a running speed of the vehicle.

3. The image processing apparatus of claim 1, wherein the image processing part changes at least one selected from a position of the virtual viewpoint, a direction of a line of sight, and a focal length of the synthetic image, and controls capturing of an image outside a view range of the changed synthetic image.

4. The image processing apparatus of claim 3, wherein the image processing part controls the capturing of an image outside a view range of the changed synthetic image by changing a model for image synthesis.

5. The image processing apparatus of claim 1 wherein the image processing part changes at least one selected from a position of the virtual viewpoint, a direction of a line of sight, and a focal length of the synthetic image in accordance with a steering angle of the vehicle.

6. The image processing apparatus of claim 1, wherein the vehicle includes an object detecting sensor operable to detect an obstacle, and
the image processing part changes at least one of selected from a position of the virtual viewpoint, a direction of a line of sight, and a focal length of the synthetic image in accordance with results of detection by the object detecting sensor.

7. The image processing apparatus of claim 1, wherein the image processing part includes an original mapping table and generates a synthetic image using a mapping table that is cut out from the original mapping table, and
the image processing part changes at least one selected from a position of the virtual viewpoint, a direction of a line of sight, and a focal length of the synthetic image by changing the mapping table to be cut out from the original mapping table.

8. The image processing apparatus of claim 1, wherein the virtual viewpoint is set outside of the vehicle.

9. The image processing apparatus of claim 1, wherein the virtual viewpoint is set above the vehicle.

10. The image processing apparatus according to claim 1, wherein the synthetic image including a roof shape of the vehicle.

11. The image processing apparatus according to claim 1, wherein the synthetic image including a whole shape of the vehicle.

12. The image processing apparatus according to claim 1, wherein the image processing part changes the position of the virtual viewpoint in vertical direction.

13. The image processing apparatus according to claim 1, wherein the image processing part changes the direction of a line of site in pitch angle.

14. An image processing apparatus provided with a vehicle,
said image processing apparatus comprising:
an image processing part operable to receive images captured by a plurality of cameras shooting surroundings of the vehicle and operable to generate a synthetic image using the received images captured by the plurality of cameras, the synthetic image including the vehicle and its surroundings arranged in a manner as looked down from a virtual viewpoint,
wherein the image processing part controls capturing of an image outside a view range of the synthetic image in accordance with a running state of the vehicle.

15. A monitoring system provided with a vehicle,
said monitoring system comprising:
a plurality of cameras operable to shoot surroundings of the vehicle;
an image processing part operable to receive images captured by the plurality of cameras and operable to generate a synthetic image using the received images captured by the plurality of cameras, the synthetic image including the vehicle and its surroundings arranged in a manner as looked down from a virtual viewpoint; and
a display part operable to display the synthetic image,
wherein the image processing part changes at least one selected from a position of the virtual viewpoint, a direction of a line of sight, and a focal length of the synthetic image in accordance with a running state of the vehicle.

16. An image processing apparatus provided with a vehicle,
said image processing apparatus comprising:
an image processing part operable to receive images captured by a plurality of cameras shooting surroundings of the vehicle and operable to generate a synthetic image using the received images captured by the plurality of cameras,
wherein the image processing part generates an image including a first image and a second image as the synthetic image,
the first image including the vehicle and its surroundings arranged in a manner as looked down from a virtual viewpoint,
the second image being viewed from a viewpoint that is different from the virtual viewpoint of the first image in at least one selected from a position of the virtual viewpoint, a direction of a line of sight and a focal length of the synthetic image, or
the second image being different from the first image in a model.

17. The image processing apparatus of claim 16,
wherein the second image is at least one of the camera images.

18. The image processing apparatus of claim 16,
wherein the first image is a close view image showing the vehicle and surroundings thereof, and
the second image is a distant view image showing an area distant from the surrounding area of the vehicle that is shown by the close view image.

19. The image processing apparatus of claim 18,
wherein the image processing part arranges the distant view image around the close view image in the synthetic image.

20. The image processing apparatus of claim 19,
wherein the distant view image is an image having continuity with the close view image.

21. The image processing apparatus of claim 16, wherein
the first image shows at least a part of the vehicle and at least a part of the surroundings of the vehicle, and
the second image is obtained by enlarging at least a part of the region shown by the first image.

22. A monitoring system provided with a vehicle,
said monitoring system comprising:
a plurality of cameras operable to shoot surroundings of the vehicle;
an image processing part operable to receive images captured by the plurality of cameras to generate a synthetic image using the received images captured by the plurality of cameras; and
a display part operable to display the synthetic image,
wherein the image processing part generates an image including a first image and a second image as the synthetic image,
the first image including the vehicle and its surroundings arranged in a manner as looked down from a virtual viewpoint,
the second image being viewed from a viewpoint that is different from the virtual viewpoint of the first image in at least one selected from a position of the virtual viewpoint, a direction of a line of sight and a focal length of the synthetic image, or
the second image being different from the first image in a model.

23. An image processing apparatus provided with a vehicle,
said image processing apparatus comprising:
an image processing part operable to receive images captured by a plurality of cameras shooting surroundings of the vehicle and operable to generate a synthetic image using the received images captured by the plurality of cameras, the synthetic image including the vehicle and its surroundings arranged in a manner as looked down from a virtual viewpoint,
wherein in the synthetic image, the image processing part displays at least a part of a vehicle region where the vehicle is present, and an attention drawing region for drawing attention in which at least a part of the surroundings of the vehicle is shown and which corresponds to at least a part of a blind spot region around the vehicle that is not shot by any of the cameras.

24. The image processing apparatus of claim 23,
wherein the virtual viewpoint is set above the vehicle.

25. The image processing apparatus of claim 23,
wherein the image processing part displays an illustration image or an actual image of the vehicle on the vehicle region.

26. The image processing apparatus of claim 23,
wherein the image processing part determines a range of a region obtained by combining the blind spot region and the vehicle region, using region data showing a projection region of the vehicle in each camera image.

27. The image processing apparatus of claim 23, wherein the virtual viewpoint is set outside of the vehicle.

28. A monitoring system provided with a vehicle,
said image processing apparatus comprising:
a plurality of cameras operable to shoot surroundings of the vehicle;
an image processing part operable to receive images captured by the plurality of cameras and operable to generate a synthetic image using the received images captured by the plurality of cameras, the synthetic image including the vehicle and its surroundings arranged in a manner as looked down from a virtual viewpoint; and a display part operable to display the synthetic image, wherein in the synthetic image, the image processing part displays at least a part of a vehicle region where the vehicle is present, and an attention drawing region for drawing attention in which at least a part of the surroundings of the vehicle is shown and which corresponds to at least a part of a blind spot region around the vehicle that is not shot by any of the cameras.

29. An image processing apparatus provided with a vehicle, said image processing apparatus comprising:

an image processing part operable to receive images captured by a plurality of cameras shooting surroundings of the vehicle and operable to generate a synthetic image using the received images captured by the plurality of cameras, the synthetic image including the vehicle and its surroundings arranged in a manner as looked down from a virtual viewpoint, wherein the image processing part generates the synthetic image, using a mapping table including first mapping data describing a relationship between pixels of the synthetic image and pixels of the camera images, and second mapping data describing an identifier showing that a pixel of the synthetic image corresponds to pixel data other than the camera images, and wherein the pixel data other than the camera images show the vehicle or a blind spot region that is present in at least a part of the surroundings of the vehicle.

30. The image processing apparatus of claim 29, wherein the image processing part stores a predetermined image other than the camera images, and with respect to the pixel of the synthetic image, the second mapping data describe coordinate values corresponding to the pixel in the stored predetermined image.

31. The image processing apparatus of claim 29, wherein the second mapping data describe pixel data corresponding to the pixel of the synthetic image.

32. An image processing apparatus provided with a vehicle, said image processing apparatus comprising:

an image processing part operable to receive images captured by a plurality of cameras shooting surroundings of the vehicle and operable to generate a synthetic image using the received images captured by the plurality of cameras, the synthetic image including the vehicle and its surroundings arranged in a manner as looked down from a virtual viewpoint, wherein the image processing part uses mapping data describing a relationship between pixels of the synthetic image and a plurality of pixel data including one or both of pixel data of the camera images and pixel data other than the camera images, and describing a rate of necessity with respect to each of the pixel data, and weights each pixel data in accordance with the rate of necessity, thereby generating the pixel data of the pixels of the synthetic image.

33. An image processing apparatus provided with a vehicle, said image processing apparatus comprising:

an image processing part operable to receive images captured by a plurality of cameras shooting surroundings of the vehicle and operable to generate a synthetic image using the received images captured by the plurality of cameras, the synthetic image including the vehicle and its surroundings arranged in a manner as looked down from a virtual viewpoint, wherein the image processing part includes an original mapping table, cuts out a mapping table describing a correspondence relationship between pixels of the synthetic image and pixels of the camera images, and generates the synthetic image, using the cut-out mapping table.

* * * * *